(12) United States Patent
Fargano et al.

(10) Patent No.: US 9,998,320 B2
(45) Date of Patent: *Jun. 12, 2018

(54) CUSTOMER ENVIRONMENT NETWORK FUNCTIONS VIRTUALIZATION (NFV)

(71) Applicant: CenturyLink Intellectual Property LLC, Denver, CO (US)

(72) Inventors: Michael J. Fargano, Louisville, CO (US); Charles I. Cook, Louisville, CO (US); Kevin M. McBride, Lone Tree, CO (US); William O'Brien, Jr., Aurora, CO (US); John McManus, Englewood, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/678,309

(22) Filed: Apr. 3, 2015

(65) Prior Publication Data

US 2015/0288622 A1    Oct. 8, 2015

Related U.S. Application Data

(60) Provisional application No. 61/974,927, filed on Apr. 3, 2014, provisional application No. 61/974,930, filed
(Continued)

(51) Int. Cl.
*H04L 29/06* (2006.01)
*H04L 12/26* (2006.01)
(Continued)

(52) U.S. Cl.
CPC .... *H04L 29/06224* (2013.01); *G06F 9/45558* (2013.01); *H04L 12/4625* (2013.01);
(Continued)

(58) Field of Classification Search
None
See application file for complete search history.

(56) References Cited

U.S. PATENT DOCUMENTS 6,182,275 B1   1/2001   Beelitz et al.
6,427,150 B1   7/2002   Oashi
(Continued)

FOREIGN PATENT DOCUMENTS

EP           2017711 A2    1/2008
KR   10-2012-0060014 A    6/2012
(Continued)

OTHER PUBLICATIONS

International Application No. PCT/US2016/044882; International Search Report and Written Opinion dated Nov. 7, 2016; 11 pages.
(Continued)

*Primary Examiner* — Robert M Morlan
(74) *Attorney, Agent, or Firm* — Swanson & Bratschun, L.L.C.

(57) ABSTRACT

Novel tools and techniques might provide for implementing interconnection gateway and/or hub functionalities. In some embodiments, a network functions virtualization ("NFV") interconnection gateway or hub ("NFVIG" or "NFVIH") might receive a set of network interconnection information from each of one or more sets of NFV entities and/or one or more sets of NFV-based customer devices, each set being located within a network separate from the networks in which the other sets are located. The NFVIG or NFVIH might be located within one of these networks or within a separate external network. The NFVIG or NFVIH might abstract each set of network interconnection information, and might establish one or more links among the sets of NFV entities and/or the sets of NFV-based customer devices based on such abstraction. The NFVIG or NFVIH might (Continued)

provide access to one or more virtualized network functions ("VNFs") via the one or more links.

42 Claims, 25 Drawing Sheets

Related U.S. Application Data on Apr. 3, 2014, provisional application No. 61/976,896, filed on Apr. 8, 2014, provisional application No. 61/977,820, filed on Apr. 10, 2014.

(51) Int. Cl.
| | | |
|---|---|---|
| *H04L 12/931* | (2013.01) | |
| *G06F 9/455* | (2018.01) | |
| *H04L 29/08* | (2006.01) | |
| *H04L 12/46* | (2006.01) | |
| *H04L 12/24* | (2006.01) | |

(52) U.S. Cl.
CPC ...... *H04L 12/4641* (2013.01); *H04L 41/0823* (2013.01); *H04L 41/0896* (2013.01); *H04L 41/5054* (2013.01); *H04L 43/08* (2013.01); *H04L 49/354* (2013.01); *H04L 65/103* (2013.01); *H04L 67/141* (2013.01); *G06F 2009/45595* (2013.01); *H04L 41/5096* (2013.01); *Y04S 40/162* (2013.01); *Y04S 40/168* (2013.01)

(56) References Cited

U.S. PATENT DOCUMENTS

| | | |
|---|---|---|
| 6,560,641 B1 | 5/2003 | Powderly et al. |
| 6,577,327 B1 | 6/2003 | Rochford et al. |
| 7,672,923 B1 | 3/2010 | Reed |
| 7,953,865 B1 | 5/2011 | Miller et al. |
| 8,051,382 B1 | 11/2011 | Kingdom et al. |
| 8,103,480 B2 | 1/2012 | Korn et al. |
| 9,141,416 B2 | 9/2015 | Bugenhagen |
| 9,185,170 B1 | 11/2015 | Grammel |
| 9,356,883 B1 | 5/2016 | Borthakur |
| 9,386,001 B1 | 7/2016 | Marquardt et al. |
| 9,417,902 B1 | 8/2016 | Noonan |
| 9,430,259 B2 | 8/2016 | Bugenhagen |
| 9,628,294 B1 | 4/2017 | Brandwine |
| 9,658,868 B2 | 5/2017 | Hill |
| 2002/0152305 A1 | 10/2002 | Jackson et al. |
| 2003/0055919 A1 | 3/2003 | Fong |
| 2005/0144288 A1 | 6/2005 | Liao |
| 2006/0233144 A1 | 10/2006 | Matsumoto |
| 2006/0235973 A1 | 10/2006 | McBride et al. |
| 2007/0094085 A1 | 4/2007 | Redmond et al. |
| 2007/0230358 A1 | 10/2007 | Narayanan et al. |
| 2008/0049639 A1 | 2/2008 | Wiley et al. |
| 2008/0052387 A1 | 2/2008 | Heinz et al. |
| 2008/0259794 A1 | 10/2008 | Zou et al. |
| 2009/0187654 A1 | 7/2009 | Raja et al. |
| 2009/0204965 A1 | 8/2009 | Tanaka et al. |
| 2010/0027552 A1 | 2/2010 | Hill |
| 2010/0043068 A1 | 2/2010 | Varadhan et al. |
| 2010/0100640 A1 | 4/2010 | Nakao |
| 2010/0217837 A1 | 8/2010 | Ansari |
| 2010/0235580 A1 | 9/2010 | Bouvier |
| 2010/0306763 A1 | 12/2010 | Lambert et al. |
| 2011/0134930 A1 | 6/2011 | McLaren |
| 2011/0310899 A1 | 12/2011 | Alkhatib et al. |
| 2012/0042040 A1 | 2/2012 | Bailey et al. |
| 2012/0089845 A1 | 4/2012 | Raleigh |
| 2012/0151087 A1 | 6/2012 | Azam |
| 2012/0151277 A1 | 6/2012 | Jung et al. |
| 2012/0307684 A1 | 12/2012 | Biswas et al. |
| 2013/0061297 A1 | 3/2013 | Larsen et al. |
| 2013/0139165 A1 | 5/2013 | Doukhvalov |
| 2013/0147906 A1 | 6/2013 | Weiser et al. |
| 2013/0191850 A1 | 7/2013 | Fischer et al. |
| 2013/0204971 A1 | 8/2013 | Brandywine et al. |
| 2013/0227670 A1 | 8/2013 | Ahmad et al. |
| 2013/0262652 A1 | 10/2013 | Vuyk et al. |
| 2014/0189050 A1 | 7/2014 | Rijsman et al. |
| 2014/0201374 A1 | 7/2014 | Ashwood-Smith et al. |
| 2014/0280499 A1 | 9/2014 | Basavaiah et al. |
| 2014/0282944 A1 | 9/2014 | Li |
| 2014/0307744 A1 | 10/2014 | Dunbar et al. |
| 2014/0313984 A1 | 10/2014 | Diamond |
| 2015/0074793 A1 | 3/2015 | Dalvi et al. |
| 2015/0088825 A1 | 3/2015 | Bloom et al. |
| 2015/0089331 A1 | 3/2015 | Skerry et al. |
| 2015/0143368 A1 | 5/2015 | Bugenhagen |
| 2015/0150020 A1 | 5/2015 | Duttagupta et al. |
| 2015/0207683 A1 | 7/2015 | Adogla |
| 2015/0263946 A1 | 9/2015 | Tubaltsev |
| 2015/0288541 A1 | 10/2015 | Fargano et al. |
| 2015/0288767 A1 | 10/2015 | Fargano et al. |
| 2016/0006696 A1 | 1/2016 | Donley et al. |
| 2016/0050159 A1 | 2/2016 | Cook et al. |
| 2016/0301668 A1 | 10/2016 | Marquardt et al. |
| 2016/0337206 A1 | 11/2016 | Bugenhagen et al. |
| 2016/0337270 A1 | 11/2016 | Heinonen et al. |
| 2017/0093750 A1 | 3/2017 | McBride et al. |
| 2018/0123974 | 5/2018 | McBride et al. |

FOREIGN PATENT DOCUMENTS

| | | |
|---|---|---|
| KR | 2013-0093717 A | 8/2013 |
| KR | 10-1475925 B1 | 12/2014 |
| WO | WO-2014/110453 | 7/2014 |
| WO | WO-2015-126430 A1 | 8/2015 |
| WO | WO-2016/025501 | 2/2016 |
| WO | WO 2017/023396 A1 | 2/2017 |
| WO | WO-2017/058350 A1 | 4/2017 |
| WO | WO-2017/062344 A1 | 4/2017 |
| WO | WO 2017-146768 A1 | 8/2017 |

OTHER PUBLICATIONS

International Search Report and Written Opinion prepared by the Korean Intellectual Property Office as International Searching Authority for PCT Intl Patent App. No. PCT/US2016/044867; 13 pages.
U.S. Appl. No. 14/730,695; Non-Final Rejection dated Dec. 2, 2016; 27 pages.
Batalle, Josep, et al.; "On the Implementation of NFV over an Open Flow Infrastructure: Routing Function Virtualization"; Nov. 11, 2013; 3 pages.
Metzler, Jim, et al.; "The 2013 Guide to Network Virtualization and SDN"; https://www.avaya.com/en/documents/the_2013_guide_to-network_virtualization_and_sdn.pdf; Dec. 2013; 6 pages.
International Application No. PCT/US2015/044690; International Preliminary Report on Patentability dated Feb. 23, 2017; 9 pages.
International Search Report and Written Opinion prepared by the Korean Intellectual Property Office as International Searching Authority for PCT Intl Patent App. No. PCT/US2016/055293 dated Jan. 11, 2017; 12 pages.
U.S. Appl. No. 14/678,280; Non-Final Rejection dated Mar. 21, 2017, 94 pages.
U.S. Appl. No. 14/730,695; Final Rejection dated Mar. 29, 2017, 27 pages.
ETSI Group Specification (Oct. 2013), "Network Functions Virtualisation (NFV); Use Cases" 50 pages.
Wikipedia (Oct. 2014), "Network Functions Virtualization" Htt;:// en.wikipedia.org/wiki/Network_Functions_virtualization; accessed on Oct. 23, 2014, 5 pages.
LightReading (Mar. 17, 2015). "RAD Launches vCPE Platform for Hosting VNFs." Web Site www.lightreading.com/nfv/nfv-elements/rad-launches-vcpe-platform-for-hosting-vnfs. Accessed Sep. 8, 2015, 1 page.

(56) References Cited

OTHER PUBLICATIONS

Gowan, Bo. (Jun. 22, 2015) "Ciena unveils a carrier-grade CPE for NFV." Web Site www.ciena.com/connect/blog/Ciena-unveils-a-carrier-grade-CPE-for-NFV.html. Accessed Sep. 8, 2015, 4 pages.
International Application No. PCT/US2015/044690; International Search Report and Written Opinion dated Dec. 4, 2015; 12 pages.
U.S. Appl. No. 14/678,208; Non-Final Rejection dated Sep. 29, 2017; 21 pages.
U.S. Appl. No. 14/983,884; Notice of Allowance dated Jul. 28, 2017; 30 pages.
U.S. Appl. No. 14/730,695; Non-Final Rejection dated Aug. 11, 2017 26 pages.
International Preliminary Report on Patentability prepared by the International Bureau for PCT/US16/55293 dated Apr. 10, 2018, 9 pages.
Slwczak, Piotr, Configuring Floating IP Addresses for Networking in OpenStack Public and Private Clouds, dated Aug. 10, 2012, 27 pages.

CUSTOMER ENVIRONMENT NETWORK FUNCTIONS VIRTUALIZATION (NFV)

CROSS-REFERENCES TO RELATED APPLICATIONS

This application claims priority to U.S. patent application Ser. No. 61/974,927 (the "'927 Application"), filed Apr. 3, 2014 by Michael J. Fargano entitled, "Network Functions Virtualization Interconnection Gateway," U.S. patent application Ser. No. 61/974,930 (the "'930 Application"), filed Apr. 3, 2014 by Michael J. Fargano entitled, "Network Functions Virtualization Interconnection Hub," U.S. patent application Ser. No. 61/976,896 (the "'896 Application"), filed Apr. 8, 2014 by Michael J. Fargano, entitled, "Customer Environment Network Functions Virtualization (NFV)," and to U.S. patent application Ser. No. 61/977,820 (the "'820 application"), filed Apr. 10, 2014 by Michael J. Fargano, entitled, "Customer Environment Network Functions Virtualization (NFV)."

This application is also related to U.S. patent application Ser. No. 14/678,208, filed on a date even herewith by Michael J. Fargano et al., entitled, "Network Functions Virtualization Interconnection Gateway," and U.S. patent application Ser. No. 14/678,280, filed on a date even herewith by Michael J. Fargano et al., entitled, "Network Functions Virtualization Interconnection Hub."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing interconnection gateway and/or hub functionalities, and, in particular embodiments, to methods, systems, and computer software for implementing interconnection gateway and/or hub functionalities between or among at least one network functions virtualization ("NFV") entity and at least one NFV-based customer device that are located in corresponding different networks.

BACKGROUND

Although currently available network gateway devices and network hub devices allow for interconnection between or among two or more networks and network components therein, such interconnection is for conventional data traffic. Such currently available network gateway or hub devices, however, do not provide for interconnection between or amongst two or more network functions virtualization ("NFV") entities in corresponding two or more different networks, much less provide access to one or more virtualized network functions ("VNFs") via such interconnections. The currently available network gateway or hub devices also do not provide for interconnection between or amongst one or more NFV entities and one or more NFV-based customer devices in corresponding two or more different networks, much less provide access to one or more virtualized network functions ("VNFs") via such interconnections.

Hence, there is a need for more robust and scalable solutions for implementing interconnection gateway and/or hub functionalities, by, e.g., implementing interconnection gateway and/or hub functionalities between or among at least one network functions virtualization ("NFV") entity and at least one NFV-based customer device that are located in corresponding different networks.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1A:
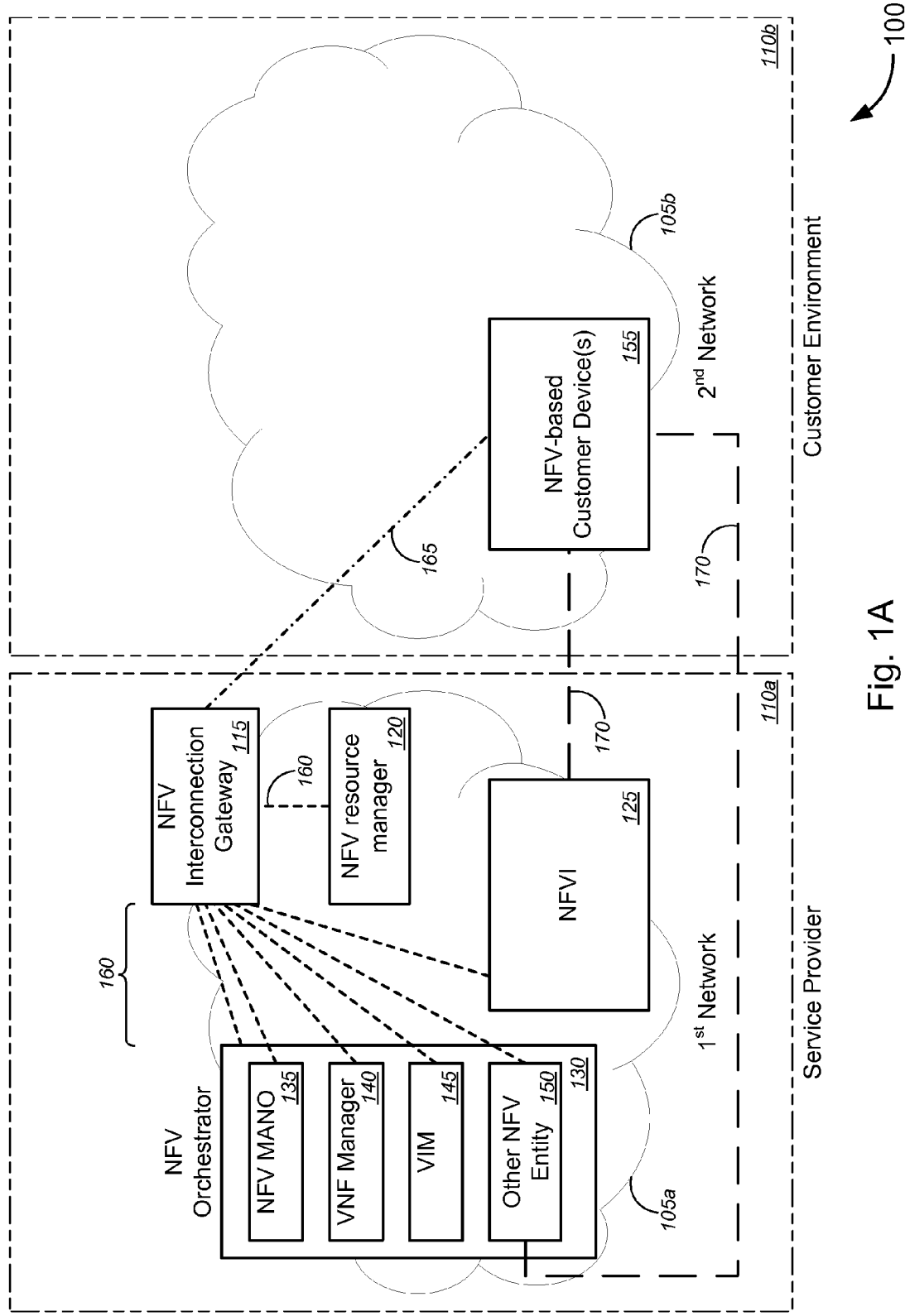
FIGS. 1A and 1B are schematic diagrams illustrating various systems for implementing interconnection gateway functionality between a set of network functions virtualization ("NFV") entities in a first network and one or more NFV-based customer devices in a second network, in accordance with various embodiments.

Various embodiments provide techniques for implementing interconnection gateway and/or hub functionalities between or among at least one network functions virtualization ("NFV") entity and at least one NFV-based customer device that are located in corresponding different networks.

In some embodiments, a NFV interconnection gateway ("NFVIG")—which provides NFV interconnection between a network of a (network) service provider and a network associated with a customer environment in a one-to-one manner—might receive a set of network interconnection information from one or more sets of NFV entities located within the service provider network and from one or more sets of NFV-based customer devices located within a network separate from the service provider network. The NFVIG might, in some cases, be located in one of these networks (typically in the service provider network; although the customer environment might, in some cases, also have a second NFVIG). The NFVIG might abstract each set of network interconnection information, and might establish one or more links between the one or more sets of NFV entities and the one or more sets of NFV-based customer devices, based at least in part on the abstracted sets of network interconnection information. The NFVIG might provide access to one or more virtualized network functions ("VNFs") via the one or more links.

In some cases, a NFV entity might include, without limitation, at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, a domain orchestrator, and/or the like. In some instances, one or more NFV entities might include a device that is configured to request execution of VNFs and to access the VNFs being executed on corresponding one of the one or more other NFV entities, without capacity and/or capability to locally execute the VNFs. Herein, "lack of capacity" might imply to resources are exhausted due to load, while "lack of capability" might imply that the service provider does not have resources to locally execute the VNFs in the first place. In some instances, a service provider that owns, manages, or controls a particular VNF may offer the particular VNF to other service providers only if the particular VNF is executed on its own NFVI. The NFVIG, in some aspects, might include, but is not limited to, a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, an external network-to-network interface ("E-NNI") device, and/or the like. In some cases, the network connection information might include, without limitation, information regarding at least one of latency, jitter, bandwidth, packet loss, nodal connectivity, compute resources, storage resources, memory capacity, routing, operations support systems ("OSS"), or business support systems ("BSS"), additional services (e.g., firewall, security, parental control functionality, etc.), and/or information regarding at least one of fault, configuration, accounting, performance, or security ("FCAPS"), and/or the like.

According to some embodiments, a customer environment might include, but is not limited to, one of an Internet of things ("IOT") environment, a customer residence, a customer business, a healthcare facility, an industrial facility, a vehicle, a public safety answering point ("PSAP") facility, and/or the like. The customer residence might include, without limitation, one of a customer residential premises (e.g., a single family house, a town house, etc.), a multi-dwelling unit (e.g., an apartment building/complex, a condominium building/complex, etc.), or a short-term lodging facility (e.g., a motel, a hotel, an inn, etc.), and/or the like. The customer business might include, but is not limited to, one of a customer commercial premises, a customer business premises, and/or the like. The healthcare facility might include, without limitation, one of a hospital, a clinic, a doctor's office, a dentist's office, an optometrist's office, a specialist physician's office, and/or the like. The industrial facility might include, but is not limited to, one of an industrial manufacturing facility, an industrial processing facility, a warehouse, and/or the like. The vehicle might include, without limitation, one of a bicycle, a motorbike, a car, an all-terrain vehicle, a snowmobile, a minivan, a truck, a van, a bus, a transport vehicle, an industrial vehicle, a government vehicle, a commercial vehicle, a recreational vehicle, a personal watercraft, a boat, a ship, an airplane, a helicopter, a personal aircraft, a space vehicle, a satellite, a probe, a drone, a space station, and/or the like.

The NFV-based customer device (depending on the customer environment in which it may be located or with which it may be associated) might include, but is not limited to, one of a tablet computer, a smart phone, a mobile phone, a telephone system, a personal digital assistant, a portable gaming device, a web camera, an image capture device, a set-top box or video recording/playback device, a television, a vehicle-based set-top box, a vehicle-based television or video monitor, a server computer or server system, a desktop computer, a laptop computer, a residential/commercial/vehicle-based/PSAP gateway device or a residential/commercial/vehicle-based/PSAP network device, a game console, a printer, a scanner, an image projection device, a database or a data storage device, an external speaker, an audio recording/playback device, a kitchen appliance, a thermostat or other sensing device, a vehicle climate control system, a premises security control device, a lighting system, a vehicle lighting system, a remote door locking system, a remote door opening/closing system, a vehicle door opening/closing device, a garage door opener, a remote window locking system, a remote window opening/closing system, a window covering opening/closing control system, a robotic cleaning system, a baby monitor, an intercom system, a health monitoring device or a diagnostic device or a medical device, a power generation system, a medical/emergency vehicle (e.g., ambulance, police car, fire engine, etc.) dispatch control system, an industrial or transport vehicle (e.g., transport truck, forklift, etc.) dispatch control system, an industrial manufacturing robot, industrial manufacturing machinery, an industrial processing robot, industrial processing machinery, an industrial warehouse item transporting robot, industrial warehouse item transporting machinery, an industrial process monitoring system, a vehicle-based navigation system, a vehicle-based audio system or a vehicle-based media recording and playback device, a communications device, and/or the like.

According to some aspects, providing access to the one or more VNFs might include, without limitation, sending one or more VNFs from one or more sets of NFV entities located within the service provider network to one or more sets of NFV-based customer devices located within the network separate from the service provider network, providing one or more sets of NFV-based customer devices with access to one or more VNFs running on one or more sets of NFV entities without sending the one or more VNFs from the one or more sets of NFV entities to the one or more sets of NFV-based customer devices, providing access to the one or more VNFs via a NFVIG, providing access to the one or more VNFs via peering connection between one or more sets of NFV entities and one or more sets of NFV-based customer devices, bursting one or more VNFs from one or more sets of NFV entities to one or more sets of NFV-based customer devices using an application programming interface ("API"), and/or the like.

According to some embodiments, a NFV interconnection hub ("NFVIH")—which provides NFV interconnection amongst three or more networks of three or more separate (network) service providers/customer environments in a many-to-many manner—might receive a set of network interconnection information from each of three or more sets of NFV entities/NFV-based customer devices, each set of NFV entities/NFV-based customer devices being located within a network separate from the networks in which the other sets of NFV entities/NFV-based customer devices are located. The NFVIH might be located within a separate external network. The NFVIH might abstract each set of network interconnection information, and might establish one or more links among the three or more sets of NFV entities/NFV-based customer devices, based at least in part on the abstracted sets of network interconnection information. The NFVIH might provide access to one or more VNFs via the one or more links. In some aspects, the NFVIH might provide hub-to-hub NFV interconnection between or amongst large groups of separate networks (with each group being interconnected by a hub), to allow for expanded scalability in NFV interconnection or the like.

In some cases, a NFV entity might include, without limitation, at least one of a NFV orchestrator, a NFVI system, a NFV MANO system, a VNF manager, a NFV resource manager, a VIM, a VM, a macro orchestrator, a domain orchestrator, and/or the like. In some instances, one or more NFV entities might include a device that is configured to request execution of VNFs and to access the VNFs being executed on corresponding one of the one or more other NFV entities, without capacity and/or capability to locally execute the VNFs. As above, "lack of capacity" might imply to resources are exhausted due to load, while "lack of capability" might imply that the service provider does not have resources to locally execute the VNFs in the first place. In some instances, a service provider that owns, manages, or controls a particular VNF may offer the particular VNF to other service providers only if the particular VNF is executed on its own NFVI. The NFVIH, in some aspects, might include, but is not limited to, a physical hub device, a hub application hosted on a distributed computing platform, a hub application hosted on a cloud computing platform, a VNF-based hub application hosted on a centralized hub hardware system, a hub application hosted on a server, a VNF-based hub application hosted on a computing device, an E-NNI device, and/or the like. In some cases, the network connection information might include, without limitation, information regarding at least one of latency, jitter, bandwidth, packet loss, nodal connectivity, compute resources, storage resources, memory capacity, routing, OSS, or BSS, additional services (e.g., firewall, security, parental control functionality, etc.), and/or information regarding at least one of fault, configuration, accounting, performance, or security ("FCAPS"), and/or the like.

According to some embodiments, a customer environment might include, but is not limited to, one of an Internet of things ("IOT") environment, a customer residence, a customer business, a healthcare facility, an industrial facility, a vehicle, a public safety answering point ("PSAP") facility, and/or the like. The customer residence might include, without limitation, one of a customer residential premises (e.g., a single family house, a town house, etc.), a multi-dwelling unit (e.g., an apartment building/complex, a condominium building/complex, etc.), or a short-term lodging facility (e.g., a motel, a hotel, an inn, etc.), and/or the like. The customer business might include, but is not limited to, one of a customer commercial premises, a customer business premises, and/or the like. The healthcare facility might include, without limitation, one of a hospital, a clinic, a doctor's office, a dentist's office, an optometrist's office, a specialist physician's office, and/or the like. The industrial facility might include, but is not limited to, one of an industrial manufacturing facility, an industrial processing facility, a warehouse, and/or the like. The vehicle might include, without limitation, one of a bicycle, a motorbike, a car, an all-terrain vehicle, a snowmobile, a minivan, a truck, a van, a bus, a transport vehicle, an industrial vehicle, a government vehicle, a commercial vehicle, a recreational vehicle, a personal watercraft, a boat, a ship, an airplane, a helicopter, a personal aircraft, a space vehicle, a satellite, a probe, a drone, a space station, and/or the like.

The NFV-based customer device (depending on the customer environment in which it may be located or associated) might include, but is not limited to, one of a tablet computer, a smart phone, a mobile phone, a telephone system, a personal digital assistant, a portable gaming device, a web camera, an image capture device, a set-top box or video recording/playback device, a television, a vehicle-based set-top box, a vehicle-based television or video monitor, a server computer or server system, a desktop computer, a laptop computer, a residential/commercial/vehicle-based/

PSAP gateway device or a residential/commercial/vehicle-based/PSAP network device, a game console, a printer, a scanner, an image projection device, a database or a data storage device, an external speaker, an audio recording/playback device, a kitchen appliance, a thermostat or other sensing device, a vehicle climate control system, a premises security control device, a lighting system, a vehicle lighting system, a remote door locking system, a remote door opening/closing system, a vehicle door opening/closing device, a garage door opener, a remote window locking system, a remote window opening/closing system, a window covering opening/closing control system, a robotic cleaning system, a baby monitor, an intercom system, a health monitoring device or a diagnostic device or a medical device, a power generation system, a medical/emergency vehicle (e.g., ambulance, police car, fire engine, etc.) dispatch control system, an industrial or transport vehicle (e.g., transport truck, forklift, etc.) dispatch control system, an industrial manufacturing robot, industrial manufacturing machinery, an industrial processing robot, industrial processing machinery, an industrial warehouse item transporting robot, industrial warehouse item transporting machinery, an industrial process monitoring system, a vehicle-based navigation system, a vehicle-based audio system or a vehicle-based media recording and playback device, a communications device, and/or the like.

According to some aspects, providing access to the one or more VNFs might include, without limitation, sending one or more VNFs from one set of NFV entities/NFV-based customer devices in one network to another set of NFV entities/NFV-based customer devices in another network via the one or more links, providing one set of NFV entities/NFV-based customer devices in one network with access to one or more VNFs running on another set of NFV entities/NFV-based customer devices in another network without sending the one or more VNFs from the one set of NFV entities/NFV-based customer devices to the another set of NFV entities/NFV-based customer devices, providing access to the one or more VNFs via a NFVIH (in some cases, via one or more NFVIGs), providing access to the one or more VNFs via peering connection between one set of NFV entities/NFV-based customer devices in one network and another set of NFV entities/NFV-based customer devices in another network, bursting one or more VNFs from one set of NFV entities/NFV-based customer devices in one network to another set of NFV entities/NFV-based customer devices in another network using an API, and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network communications technology, network virtualization technology, network configuration technology, and/or the like. In other aspects, certain embodiments, can improve the functioning of a computer or network system itself (e.g., computing devices or systems that form parts of the network, computing devices or systems for performing the functionalities described below, etc.), for example, by enabling implementation of network functions virtualization ("NFV") interconnection between one or more sets of NFV entities and one or more sets of NFV-based customer devices in corresponding two or more separate networks or amongst three or more sets of NFV entities/NFV-based customer devices in corresponding three or more separate networks, enabling access to virtual network functions ("VNFs") via such NFV interconnection, enabling implementation of virtual gateway and/or hub functionalities for performing one or more of these implementations, enabling implementation of virtualization functionalities for performing one or more of these implementations, improving network and/or computing system functionalities, improving network and/or computing system efficiencies, allowing for updating of software, applications, network connectivity, and/or other functionality on NFV-based customer devices, and/or the like.

In particular, to the extent any abstract concepts are present in the various embodiments, those concepts can be implemented as described herein by devices, software, systems, and methods that involve specific novel functionality (e.g., steps or operations), such as implementing NFV interconnection between one or more sets of NFV entities and one or more sets of NFV-based customer devices in corresponding two or more separate networks or amongst three or more sets of NFV entities/NFV-based customer devices in corresponding three or more separate networks, providing an NFV entity/NFV-based customer device with access to VNFs via such NFV interconnection, implementing virtualization functionalities for performing these implementations, enabling NFVaaS functionality or VNFaaS functionality for enabling a device associated with a customer environment to access VNFs via such NFV interconnection, and/or the like, to name a few examples, that extend beyond mere conventional computer processing operations. These functionalities can produce tangible results outside of the implementing computer system, including, merely by way of example, improved network and/or computing system operations, improved network and/or computing system operation efficiencies, improved functions for devices (which may be frequented updated), longer life of devices (at least from an obsolescence perspective), and/or the like, any of which may be observed or measured by customers and/or service providers.

In an aspect, a method might comprise receiving, with an interconnection gateway device within a first network and from one or more internal network functions virtualization ("NFV") entities, a first set of network connection information, each of the one or more internal NFV entities being located within the first network. The method might also comprise receiving, with the interconnection gateway device and from one or more NFV-based customer devices, a second set of network connection information, each of the one or more NFV-based customer devices being located within a second network external to the first network. The method might further comprise abstracting, with the interconnection gateway device, the first set of network connection information to generate a first set of abstracted network connection information and abstracting, with the interconnection gateway device, the second set of network connection information to generate a second set of abstracted network connection information. Each of the first set of abstracted network connection information and the second set of abstracted network connection information might be abstracted to be independent of any particular NFV entity or any particular NFV-based customer device in any network. The method might additionally comprise establishing, with the interconnection gateway device, one or more links between each of the one or more internal NFV entities and each of at least one NFV-based customer devices of the one or more NFV-based customer devices, based at least in part on one or more of the first set of abstracted network connection information or the second set of abstracted network connection information. The method might further comprise providing access to one or more virtualized network functions ("VNFs") via the one or more links.

According to some embodiments, the first network might be associated with a first service provider, and the second network might be associated with a customer environment. In some cases, the customer environment might comprise at least one of an Internet of things ("IOT") environment, a customer residential premises, a multi-dwelling unit, a short-term lodging facility, a customer commercial premises, a customer business premises, a health-care facility, an industrial manufacturing facility, an industrial processing facility, a warehouse, a vehicle, or a public safety answering point ("PSAP") facility, and/or the like.

In some embodiments, providing access to the one or more VNFs via the one or more links might comprise sending one or more VNFs from at least one internal NFV entity of the one or more internal NFV entities to at least one NFV-based customer device of the one or more NFV-based customer devices, via the one or more links. Alternatively, providing access to the one or more VNFs via the one or more links might comprise providing at least one NFV-based customer device of the one or more NFV-based customer devices with access to one or more VNFs running on at least one internal NFV entity of the one or more internal NFV entities, without sending the one or more VNFs from the at least one internal NFV entity to the at least one NFV-based customer device. In some embodiments, providing access to the one or more VNFs via the one or more links might comprise providing, via the interconnection gateway device, access to one or more VNFs via the one or more links. In other embodiments, providing access to the one or more VNFs via the one or more links might comprise providing access to one or more VNFs, via peering connection between at least one internal NFV entity of the one or more internal NFV entities and at least one NFV-based customer device of one or more NFV-based customer devices. In yet other embodiments, providing access to the one or more VNFs via the one or more links might comprise bursting, using an application programming interface ("API"), one or more VNFs from at least one internal NFV entity of the one or more internal NFV entities to at least one NFV-based customer device of the one or more NFV-based customer devices.

Merely by way of example, in some instances, each of the one or more internal NFV entities might comprise at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like. In some embodiments, each of the one or more NFV-based customer devices might comprise a device that is configured to request execution of VNFs and to access the VNFs being executed on at least one of the one or more internal NFV entities, without at least one of capacity or capability to locally execute the VNFs.

According to some embodiments, the interconnection gateway device might comprise a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, or an external network-to-network interface ("E-NNI") device, and/or the like. In some cases, the first set of network connection information might comprise information regarding at least one of latency, jitter, bandwidth, packet loss, nodal connectivity, compute resources, storage resources, memory capacity, routing, operations support systems ("OSS"), or business support systems ("BSS"), and/or the like, while the second set of network connection information might comprise information regarding at least one of latency, jitter, bandwidth, packet loss, nodal connectivity, compute resources, storage resources, memory capacity, routing, OSS, or BSS, and/or the like. In some instances, the first set of network connection information might comprise information regarding at least one of fault, configuration, accounting, performance, or security ("FCAPS"), while the second set of network connection information might comprise information regarding at least one of fault, configuration, accounting, performance, or security ("FCAPS").

Merely by way of example, in some embodiments, the second network might be associated with at least one of an IOT environment, a customer residential premises, a multi-dwelling unit, a short-term lodging facility, and/or the like. In such embodiments, each of the one or more NFV-based customer devices might comprise at least one of a residential gateway device, a residential network device, a video recording device, a video playback device, a set-top box, an audio recording device, an audio playback device, an external speaker, a game console, a tablet computer, a laptop computer, a desktop computer, a smart phone, a mobile phone, a portable gaming device, an image capture device, a printer, a scanner, a data storage device, a television, a kitchen appliance, a thermostat, a sensing device, a home security control device, or a lighting system, and/or the like.

In some cases, the second network might be associated with at least one of an IOT environment, a customer commercial premises, a customer business premises, and/or the like. In such cases, each of the one or more NFV-based customer devices might comprise at least one of a commercial gateway device, a commercial network device, a video recording device, a video playback device, an image projection device, a set-top box, an audio recording device, an audio playback device, an external speaker, a tablet computer, a laptop computer, a desktop computer, a smart phone, a mobile phone, a personal digital assistant, an image capture device, a printer, a scanner, a data storage device, a television, a telephone system, a local server system, a kitchen appliance, a thermostat, a sensing device, a commercial security control system, a doorway locking system, or a lighting system.

In some instances, the second network might be associated with at least one of an IOT environment or a health-care facility, or the like. In such instances, each of the one or more NFV-based customer devices might comprise at least one of a commercial gateway device, a commercial network device, a video recording device, a video playback device, a set-top box, an audio recording device, an audio playback device, an external speaker, a tablet computer, a laptop computer, a desktop computer, a smart phone, a mobile phone, a game console, a portable gaming device, an image capture device, an image projection device, a printer, a scanner, a data storage device, a television, a telephone system, a kitchen appliance, a thermostat, a sensing device, a commercial security control system, a doorway locking system, a lighting system, a health monitoring device, a diagnostic device, a medical device, a power generation system, or a medical vehicle dispatch control system, and/or the like.

According to some embodiments, the second network might be associated with at least one of an IOT environment, an industrial manufacturing facility, an industrial processing facility, a warehouse, and/or the like. In such embodiments, each of the one or more NFV-based customer devices might comprise at least one of a commercial gateway device, a commercial network device, a video recording device, a video playback device, a set-top box, an audio recording device, an audio playback device, an external speaker, a tablet computer, a laptop computer, a desktop computer, a smart phone, a mobile phone, a portable gaming device, an image capture device, a data storage device, a printer, a scanner, a television, a kitchen appliance, a thermostat, a sensing device, a home security control device, a lighting system, an industrial manufacturing robot, industrial manufacturing machinery, an industrial processing robot, industrial processing machinery, an industrial warehouse item transporting robot, or industrial warehouse item transporting machinery, and/or the like.

In some aspects, the second network might be associated with at least one of an IOT environment or a vehicle, which might include, without limitation, at least one of a bicycle, a motorbike, a car, an all-terrain vehicle, a snowmobile, a minivan, a truck, a van, a bus, a transport vehicle, an industrial vehicle, a government vehicle, a commercial vehicle, a recreational vehicle, a personal watercraft, a boat, a ship, an airplane, a helicopter, a personal aircraft, a space vehicle, a satellite, a probe, a drone, or a space station, or the like. In such aspects, each of the one or more NFV-based customer devices might comprise at least one of a vehicle control computer system, a vehicle-based navigation system, a vehicle-based gateway device, a vehicle-based network device, a vehicle-based audio system, a vehicle-based media recording and playback device, a vehicle lighting system, vehicle door opening/closing devices, a tablet computer, a laptop computer, a smart phone, a mobile phone, a portable gaming device, a data storage device, a sensing device, or an image capture device, and/or the like.

In some embodiments, the second network is associated with at least one of an IOT environment or a public safety answering point ("PSAP") facility, or the like. In such embodiments, each of the one or more NFV-based customer devices might comprise at least one of a PSAP gateway device, a PSAP network device, a computer system, a data storage device, or a communications device, and/or the like.

In various embodiments, the method might further comprise bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics. Each of the first pod and the second pod might comprise physical hardware resources that are part of an internal NFV entity of the one or more internal NFV entities.

In some embodiments, the method might further comprise service chaining two or more VNFs together to provide a single network service. In some cases, the two or more VNFs might comprise at least one first service chained VNF provided by at least one internal NFV entity of the one or more internal NFV entities and at least one second service chained VNF provided by at least one external NFV entity that is located outside of each of the first network and the second network, and service chaining the two or more VNFs together to provide a single network service might comprise service chaining the at least one first service chained VNF and the at least one second service chained VNF together to provide the single network service. In some instances, the two or more VNFs might comprise two or more service chained VNFs provided by only one of at least one internal NFV entity of the one or more internal NFV entities or at least one external NFV entity of the one or more external NFV entities that are located outside of each of the first network and the second network, and service chaining the two or more VNFs together to provide a single network service might comprise service chaining the two or more service chained VNFs provided by only one of at least one internal NFV entity or the at least one external NFV entity.

In some cases, the method might further comprise sending, with the interconnection gateway device and to at least one of the one or more NFV-based customer devices, a service catalog indicating at least one of a plurality of VNFs, a plurality of application programming interfaces ("APIs"), or a plurality of services offered by the one or more internal NFV entities. According to some embodiments, receiving the second set of network connection information might comprise receiving, with the interconnection gateway device, the second set of network connection information from the one or more NFV-based customer devices via a second interconnection gateway device located within the second network. In some instances, the method might further comprise sending, with the interconnection gateway device and to at least one of the one or more NFV-based customer devices via the second interconnection gateway device, a service catalog indicating at least one of a plurality of VNFs, a plurality of application programming interfaces ("APIs"), or a plurality of services offered by the one or more internal NFV entities. In some embodiments, receiving the second set of network connection information might comprise receiving, with the interconnection gateway device, the second set of network connection information from the one or more NFV-based customer devices via an interconnection hub device located within an external network separate from each of the first network and the second network.

According to some embodiments, the first set of abstracted network connection information might include fine-grained information that is hidden from the one or more NFV-based customer devices, while the second set of abstracted network connection information might include coarse-grained information that is public information. In some embodiments, the method might further comprise certifying, with the interconnection gateway device, the one or more VNFs, and storing, with the interconnection gateway device, a record of the one or more VNFs that are certified in a database in communication with the interconnection gateway device.

In another aspect, a system might comprise an interconnection gateway device located within a first network, one or more internal network functions virtualization ("NFV") entities located within the first network, and one or more NFV-based customer devices located within a second network that is external to the first network. The interconnection gateway device might comprise at least one first processor, at least one first data storage device in communication with the at least one first processor (the at least one first data storage device having data stored thereon), and at least one first non-transitory computer readable medium in communication with the at least one first processor and with the at least one first data storage device. The at least one first non-transitory computer readable medium might have stored thereon computer software comprising a first set of instructions that, when executed by the at least one first processor, causes the interconnection gateway device to perform one or more functions. Each of the one or more internal NFV entities might comprise at least one second processor, at least one second data storage device in communication with the at least one second processor (the at least one second data storage device having data stored thereon), at least one second non-transitory computer readable medium in communication with the at least one second processor and with the at least one second data storage device. The at least one second non-transitory computer readable medium might have stored thereon computer software comprising a second set of instructions that, when executed by the at least one second processor, causes the internal NFV entity to perform one or more functions. Each of the one or more NFV-based customer devices might comprise at least one third processor, at least one third data storage device in communication with the at least one third processor (the at least one third data storage device having data stored thereon), at least one third non-transitory computer readable medium in communication with the at least one third processor and with the at least one third data storage device, the at least one third non-transitory computer readable medium having stored thereon computer software comprising a third set of instructions that, when executed by the at least one third processor, causes the NFV-based customer device to perform one or more functions.

The second set of instructions might comprise instructions for sending a first set of network connection information to the interconnection gateway device, while the third set of instructions might comprise instructions for sending a second set of network connection information to the interconnection gateway device. The first set of instructions might comprise instructions for receiving, from the one or more internal NFV entities, the first set of network connection information, instructions for receiving, from the one or more NFV-based customer devices, the second set of network connection information, instructions for abstracting the first set of network connection information to generate a first set of abstracted network connection information, and instructions for abstracting the second set of network connection information to generate a second set of abstracted network connection information. Each of the first set of abstracted network connection information and the second set of abstracted network connection information might be abstracted to be independent of any particular NFV entity or any particular NFV-based customer device in any network. The first set of instructions might further comprise instructions for establishing one or more links between each of the one or more internal NFV entities and each of at least one NFV-based customer device of the one or more NFV-based customer devices, based at least in part on one or more of the first set of abstracted network connection information or the second set of abstracted network connection information, and instructions for providing access to one or more virtualized network functions ("VNFs") via the one or more links. The second set of instructions might further comprise instructions for providing access or sending the one or more VNFs via the one or more links, while the third set of instructions might further comprise instructions for accessing or receiving the one or more VNFs via the one or more links.

In some cases, the first network might be associated with a first service provider, while the second network might be associated with a customer environment. In some instances, the customer environment might comprise at least one of an Internet of things ("IOT") environment, a customer residential premises, a multi-dwelling unit, a short-term lodging facility, a customer commercial premises, a customer business premises, a health-care facility, an industrial manufacturing facility, an industrial processing facility, a warehouse, a vehicle, or a public safety answering point ("PSAP") facility. In some embodiments, each of the one or more internal NFV entities might comprise at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

According to some embodiments, the interconnection gateway device might comprise a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, or an external network-to-network interface ("E-NNI") device, and/or the like.

Merely by way of example, in some embodiments, the first set of instructions might further comprise instructions for bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics. Each of the first pod and the second pod might comprise physical hardware resources that are part of an internal NFV entity of the one or more internal NFV entities.

In some embodiments, the first set of instructions might further comprise instructions for service chaining two or more VNFs together to provide a single network service. According some embodiments, the first set of instructions might further comprise instructions for sending, to at least one of the one or more NFV-based customer devices, a service catalog indicating at least one of a plurality of VNFs, a plurality of application programming interfaces ("APIs"), or a plurality of services offered by the one or more internal NFV entities. In various embodiments, the first set of instructions might further comprise instructions for certifying the one or more VNFs and instructions for storing a record of the one or more VNFs that are certified in a database in communication with the interconnection gateway device.

In yet another aspect, an interconnection gateway device might comprise at least one processor, at least one data storage device in communication with the at least one processor (the at least one data storage device having data stored thereon), and at least one non-transitory computer readable medium in communication with the at least one processor and the at least one data storage device. The at least one non-transitory computer readable medium might have stored thereon computer software comprising a set of instructions that, when executed by the at least one processor, causes the interconnection gateway device to perform one or more functions. The set of instructions might comprise instructions for receiving, from one or more internal network functions virtualization ("NFV") entities, a first set of network connection information and instructions for receiving, from one or more NFV-based customer devices, a second set of network connection information. Each of the one or more internal NFV entities might be located within the first network in which the interconnection gateway device is located, while each of the one or more NFV-based customer devices might be located within a second network external to the first network.

The set of instructions might also comprise instructions for abstracting the first set of network connection information to generate a first set of abstracted network connection information and instructions for abstracting the second set of network connection information to generate a second set of abstracted network connection information. Each of the first set of abstracted network connection information and the second set of abstracted network connection information might be abstracted to be independent of any particular NFV entity or any particular NFV-based customer device in any network. The set of instructions might further comprise instructions for establishing one or more links between each of the one or more internal NFV entities and each of the one or more NFV-based customer devices, based at least in part on one or more of the first set of abstracted network connection information or the second set of abstracted network connection information. The set of instructions might additionally comprise instructions for providing access to one or more virtualized network functions ("VNFs") via the one or more links.

According to some embodiments, each of the one or more internal NFV entities might comprise at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like.

In some cases, the set of instructions might further comprise instructions for bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics, and/or the like. Each of the first pod and the second pod might comprise physical hardware resources that are part of an internal NFV entity of the one or more internal NFV entities.

In some instances, the set of instructions might further comprise instructions for service chaining two or more VNFs together to provide a single network service. In some embodiments, the set of instructions might further comprise instructions for sending, to at least one of the one or more NFV-based customer devices, a service catalog indicating at least one of a plurality of VNFs, a plurality of application programming interfaces ("APIs"), or a plurality of services offered by the one or more internal NFV entities.

Merely by way of example, in some cases, the set of instructions might further comprise instructions for certifying the one or more VNFs and instructions for storing a record of the one or more VNFs that are certified in a database in communication with the interconnection gateway device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

In some aspects, a NFVIG might sit on each side of two service provider networks associated with two service providers that would like to have a NFV interconnection (for reasons including, but not limited to, customer roaming services, customer nomadic services, wholesale play, disaster recovery, offloading, service bureau operations, or network operator/service provider cooperation, and/or the like). Such a NFVIG might in effect be a super-gateway or a gateway complex with sub-gateways as part of it that might handle appropriate sub-interconnections, including, without limitation, OSS/BSS, VNF, NFVI, orchestrator, VNF managers, virtualized infrastructure manager, and/or the like. Some key functions of the NFVIG might include, but are not limited to, providing key gateway functions, including, without limitation, security, quality of service ("QoS"), information hiding, billing information collection, fault isolation/zoning, and/or the like. The interconnections might take the form of APIs, other interconnection protocols (preferably defined as industry standard(s)), and/or the like. Once NFV is widely deployed, some scenarios for utilizing or implementing (widely deployed) NFVIG might include, but are not limited to, overload/offload, third party contract implementation, regulatory/unbundling mandates, multi-service provider collaborations, company merger transitions, and/or the like.

In various aspects, the NFVIG (or similar functionality) might be used in a hub or centralized service bureau (or clearing house) mode in which many network operators can interconnect with many network operators—versus the NFVIG, which (as described herein) is a one-to-one network operator interconnection model. The NFVIH might provide many-to-many operator interconnections at the NFVIH or might provide indirect interconnection by simply providing the availability and/or routing information for on-demand (or scheduled) operator-to-operator interconnection outside of the NFVIH (in effect facilitated by the NFVIH). Once NFVIGs (or NFV interconnection via other methods) become widely adopted, scalability and ancillary service (including, without limitation, billing, availability, routing, etc.) will be needed for wide interconnection. The NFVIH or similar functionalities (as described herein) provide solutions for this.

In some embodiments, the NFV architecture and/or platform may be used in customer premises ("CP"), which might include a home, a multiple dwelling or multi-dwelling unit (e.g., apartment complex or condominium, etc.), small business, large business, hospitals or other healthcare facilities, and/or the like. Effectively, the use of NFV in a CP environment could provide for more cost effective and efficient smart environment (e.g., smart home or smart office, etc.) by using NFV to implement CP communications and/or network functions, consumer electronics, appliances, robots, 3D printers, energy management, entertainment, medical equipment or devices, basic CP cloud support (e.g., storage, backup, etc.), and/or the like. The use of NFV in the CP would allow for dumb (and relatively low cost) terminal devices (e.g., routers, consumer electronics, etc.) to use the NFV architecture and/or platform to gain the intelligence, coordination, and/or control that is needed. In addition, the dumb terminal devices would have a longer life (at least from an obsolescence perspective) because new/upgraded functions, features, services, and/or the like can be administered in the NFV applications on the platform, which may work in conjunction with the NFVIG and/or NFVIH systems described above.

In some cases, the NFV architecture and/or platform may be used in industrial applications, which might include manufacturing, energy extraction, energy distribution and management, and/or the like. Effectively, the use of NFV in an industrial environment could provide for more cost effective and efficient smart environment (e.g., smart manufacturing facility, smart processing facility, smart factory, smart warehouse, etc.) by using NFV to implement industrial communications and/or network functions, industrial electronics, appliances, robots, 3D printers, energy management, fault monitoring, entertainment, medical equipment or devices, basic cloud support (e.g., storage, backup, etc.), and/or the like. The use of NFV in the industrial environments would allow for dumb (and relatively low cost) terminal devices (e.g., routers, industrial electronics, etc.) to use the NFV architecture and/or platform to gain the intelligence, coordination, and/or control that is needed. In addition, the dumb terminal devices would have a longer life (at least from an obsolescence perspective) because new/upgraded functions, features, services, and/or the like can be administered in the NFV applications on the platform, which may work in conjunction with the NFVIG and/or NFVIH systems described above.

According to some embodiments, the NFV architecture and/or platform may be used in vehicles, which might include cars, buses, vans, recreational vehicles ("RVs"), boats, ships, airplanes, space vehicles, space stations, and/or the like. Effectively, the use of NFV in a vehicular environment could provide for more cost effective and efficient smart environment (e.g., smart car, etc.) by using NFV to implement vehicular communications and/or network functions, vehicular electronics, vehicular appliances, consumer electronics, robots, 3D printers, energy management, entertainment, medical equipment or devices, basic cloud support (e.g., storage, backup, etc.), and/or the like. The use of NFV in the CP would allow for dumb (and relatively low cost) terminal devices (e.g., routers, consumer electronics, etc.) to use the NFV architecture and/or platform to gain the intelligence, coordination, and/or control that is needed. In addition, the dumb terminal devices would have a longer life (at least from an obsolescence perspective) because new/upgraded functions, features, services, and/or the like can be administered in the NFV applications on the platform, which may work in conjunction with the NFVIG and/or NFVIH systems described above.

In some instances, the NFV architecture and/or platform may be used in public safety access point ("PSAP") applications, which might include PSAP customer premises equipment ("CPE") virtualization, up to and including entire virtualization of the PSAP, and/or the like. Effectively, the use of NFV in a PSAP environment could provide for more cost effective and efficient smart environment by using NFV to implement PSAP communications and/or network functions, PSAP electronics, basic cloud support (e.g., storage, backup, etc.), and/or the like. The use of NFV in the industrial environments would allow for dumb (and relatively low cost) terminal devices (e.g., PSAP CPE, routers, etc.) to use the NFV architecture and/or platform to gain the intelligence, coordination, and/or control that is needed. In addition, the dumb terminal devices would have a longer life (at least from an obsolescence perspective) because new/upgraded functions, features, services, and/or the like can be administered in the NFV applications on the platform, which may work in conjunction with the NFVIG and/or NFVIH systems described above. In some embodiments, a PSAP NFV can be completely implemented by a service provider and the PSAP would view the service provider as an intelligent utility and might pay for services and might pay for growth as the PSAP grows. In some cases, the service provider would be responsible for implementation of NG911 as part of the PSAP NFV. This could help to bring more PSAPs to implement NG911 in a scalable and pay-as-you-go way.

For network management and control, e.g., for large scale applications involved with implementing NFV interconnection gateway and/or hub functionalities, the following techniques and/or technologies, among other similar techniques and/or technologies, can facilitate NFV interconnection and/or VNF access provision: Software Defined Networking ("SDN"); Deep Packet Inspection ("DPI"); Network Functions Virtualization ("NFV") with Management and Orchestration; Service Chaining/Forwarding Graphs; and/or the like.

Herein, a "hypervisor" might refer to a virtual machine manager ("VMM"), which might be a component of computer software, firmware, and/or hardware that creates and runs virtual machines. The "hypervisor" might run one or more VMs on a computer defined as a "host machine," and each of the one or more VMs might be defined as a "guest machine." In operation, the "hypervisor" might provide the "guest machines" or operating systems of the "guest machines" with a virtual operating platform, and might manage the execution of the "guest machine" operating systems.

In some embodiments, rather than (or in addition to) a VM system, containers may be utilized for virtualization functionalities. A "container" might refer to a virtual construct that is similar to a virtual machine, except that, in some embodiments, containers (within a host computing system) share the same operating system, and thus do not need to run multiple instances of the operating system (as in the case of VMs in a host computing system). Accordingly, containers may be smaller in size and may be more efficient to run compared with VMs or hypervisors.

The term "business support system" ("BSS") might refer to components that a service provider (such as a telephone operator or telecommunications company) might use to run its business operations, including, for example, taking orders, handling payment issues, or dealing with revenues, and the like. BSS might generally cover the four main areas of product management, customer management, revenue management, and order management. In a related manner, the term "operations support system" ("OSS") might refer to components used by telecommunications service providers to deal with the telecommunications network itself, supporting processes including, but not limited to, maintaining network inventory, provisioning services, configuring network components, managing faults, and the like. The two systems functioning together might be referred to as "BSS/OSS."

An "application programming interface" ("API") might refer to a protocol intended to be used as an interface by software components to communicate with each other.

"Virtualization" might refer to a process of mapping hardware resources to create "virtual machine resource" within the framework of the VMs so that the VM environment may utilize the hardware resources. For example, each of the north, south, east, and west interfaces are parts of physical and/or virtual links that have been apportioned or "virtualized" to an application as a port to the application, which might be associated with various external components (i.e., BSS/OSS, AIN, second autonomous systems, customers, and the like) via the hardware or host system on which the VM is running. A virtualization congestion control frameworks might be as described in detail in U.S. patent application Ser. No. 14/531,000 (the "'000 application"), filed Nov. 3, 2014 by Michael K. Bugenhagen, entitled, "Physical to Virtual Network Transport Function Abstraction" and U.S. patent application Ser. No. 14/061,147 (the "'147 application"), filed Oct. 23, 2013 by Michael K. Bugenhagen, entitled, "Virtualization Congestion Control Framework," which is a continuation-in-part application of U.S. patent application Ser. No. 14/060,450 (the "'450 application"), filed Oct. 22, 2013 by Michael K. Bugenhagen, entitled, "Virtualization Congestion Control Framework," the entire disclosures of which are incorporated herein by reference in their entirety for all purposes. One or more infrastructure components of these virtualization congestion control frameworks may, in some non-limiting embodiment, be utilized in implementing physical to virtual network transport function abstraction, as discussed in the '000 application.

Specific Exemplary Embodiments

Figure 11:
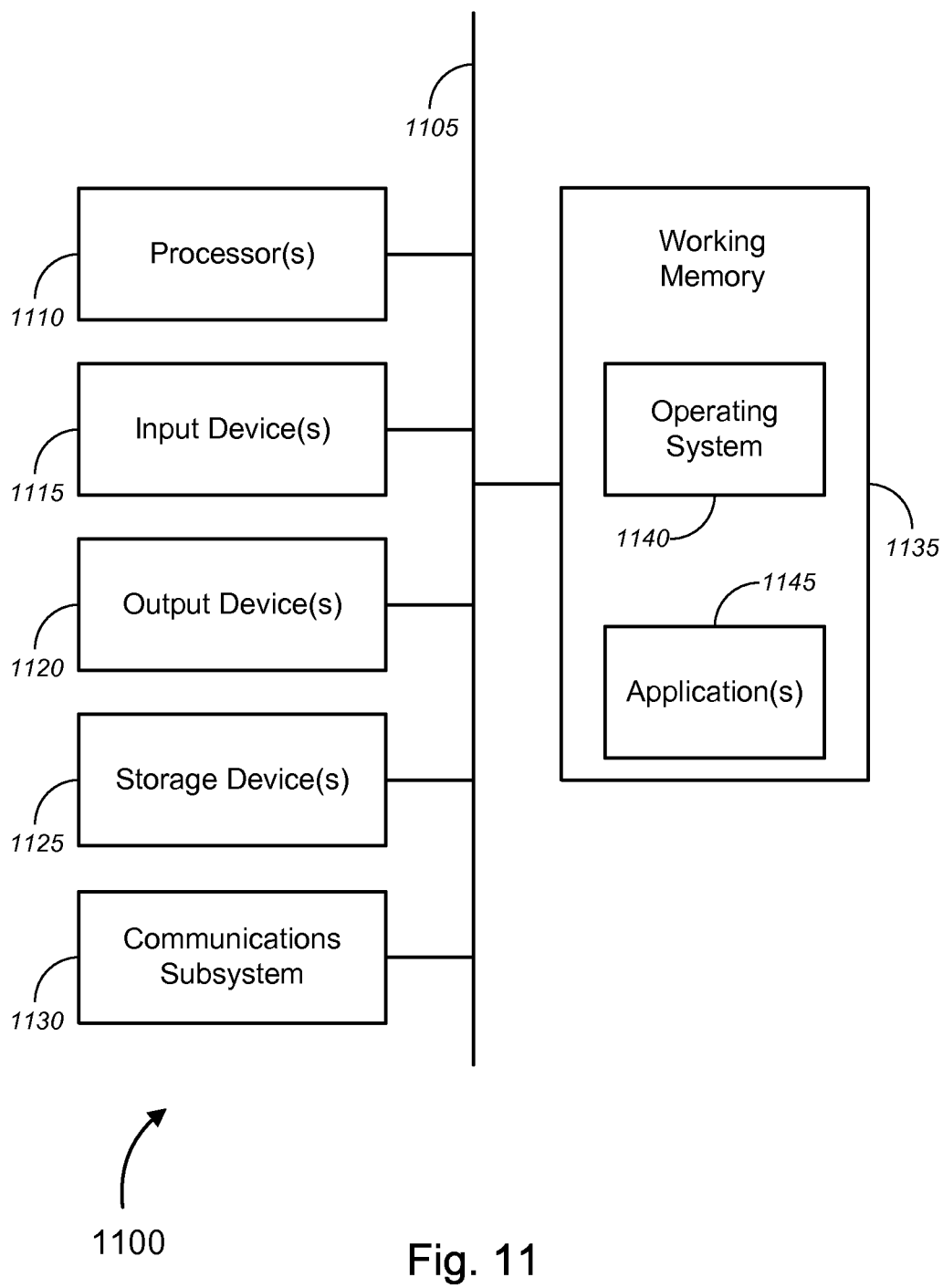
FIG. 11 is a block diagram illustrating an exemplary computer or system hardware architecture, in accordance with various embodiments.
Figure 12:
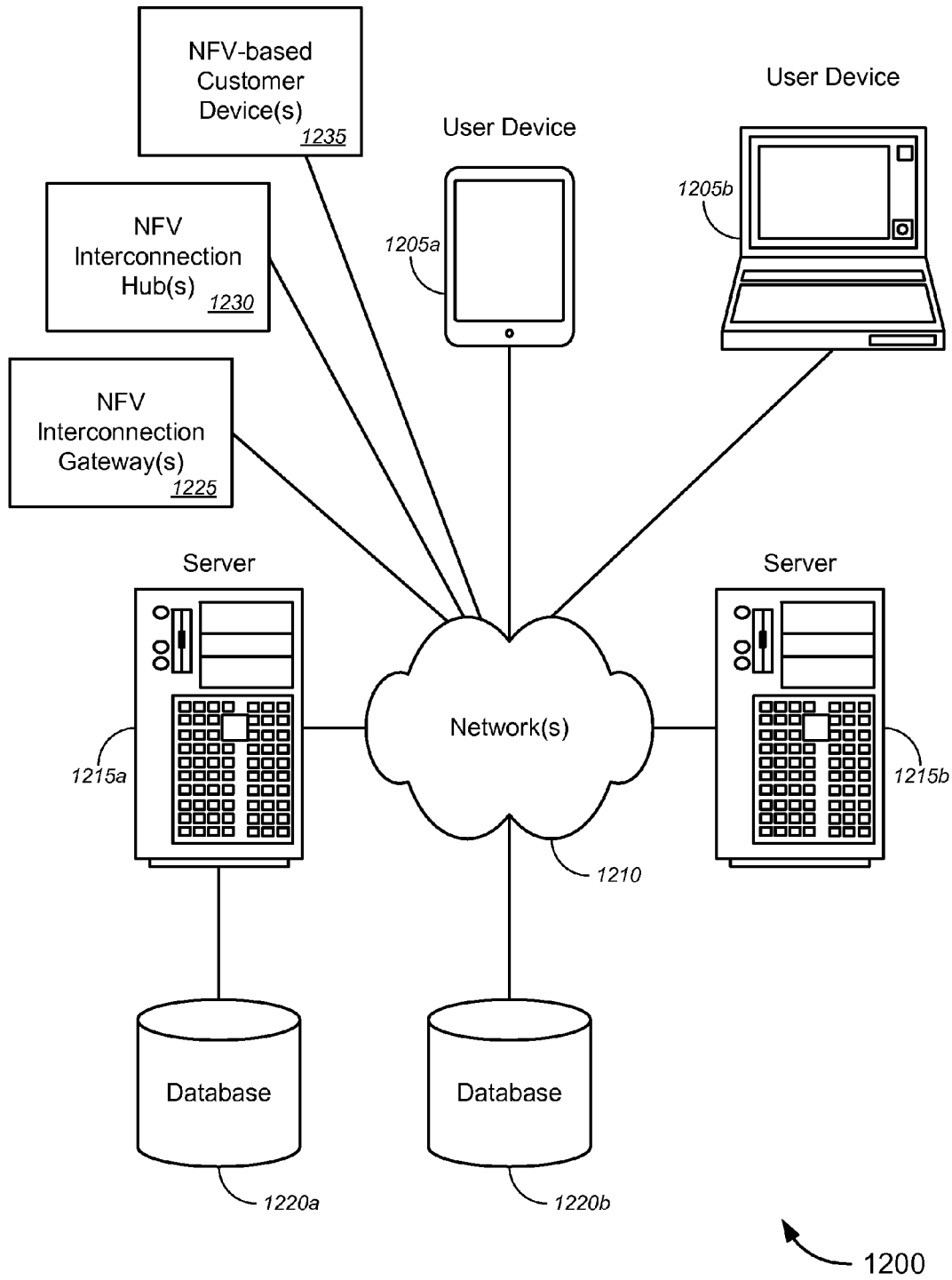
FIG. 12 is a block diagram illustrating a networked system of computers, computing systems, or system hardware architecture, which can be used in accordance with various embodiments.

We now turn to the embodiments as illustrated by the drawings. FIGS. 1-12 illustrate some of the features of the method, system, and apparatus for implementing interconnection gateway and/or hub functionalities between or among one or more network functions virtualization ("NFV") entities and one or more NFV-based customer devices that are located in corresponding different networks, as referred to above. FIGS. 1-4 and 9 illustrate some of the features of the method, system, and apparatus for implementing interconnection gateway functionality between a set of NFV entities in a first network and one or more NFV-based customer devices in a second network, while FIGS. 5-8 and 10 illustrate some of the features of the method, system, and apparatus for implementing interconnection hub functionality among one or more service provider NFV entities in one or more service provider networks and a first set of NFV-based customer devices in a first network through an $N^{th}$ set of NFV-based customer devices in an $N^{th}$ network or for implementing hub-to-hub interconnection among a first interconnection hub in a first external network, a second interconnection hub in a second external network, through an $N^{th}$ interconnection hub in an $N^{th}$ external network, and FIGS. 11 and 12 illustrate exemplary system and hardware implementation. The methods, systems, and apparatuses illustrated by FIGS. 1-12 refer to examples of different embodiments that include various components and steps, which can be considered alternatives or which can be used in conjunction with one another in the various embodiments. The description of the illustrated methods, systems, and apparatuses shown in FIGS. 1-12 is provided for purposes of illustration and should not be considered to limit the scope of the different embodiments.

Figure 1B:
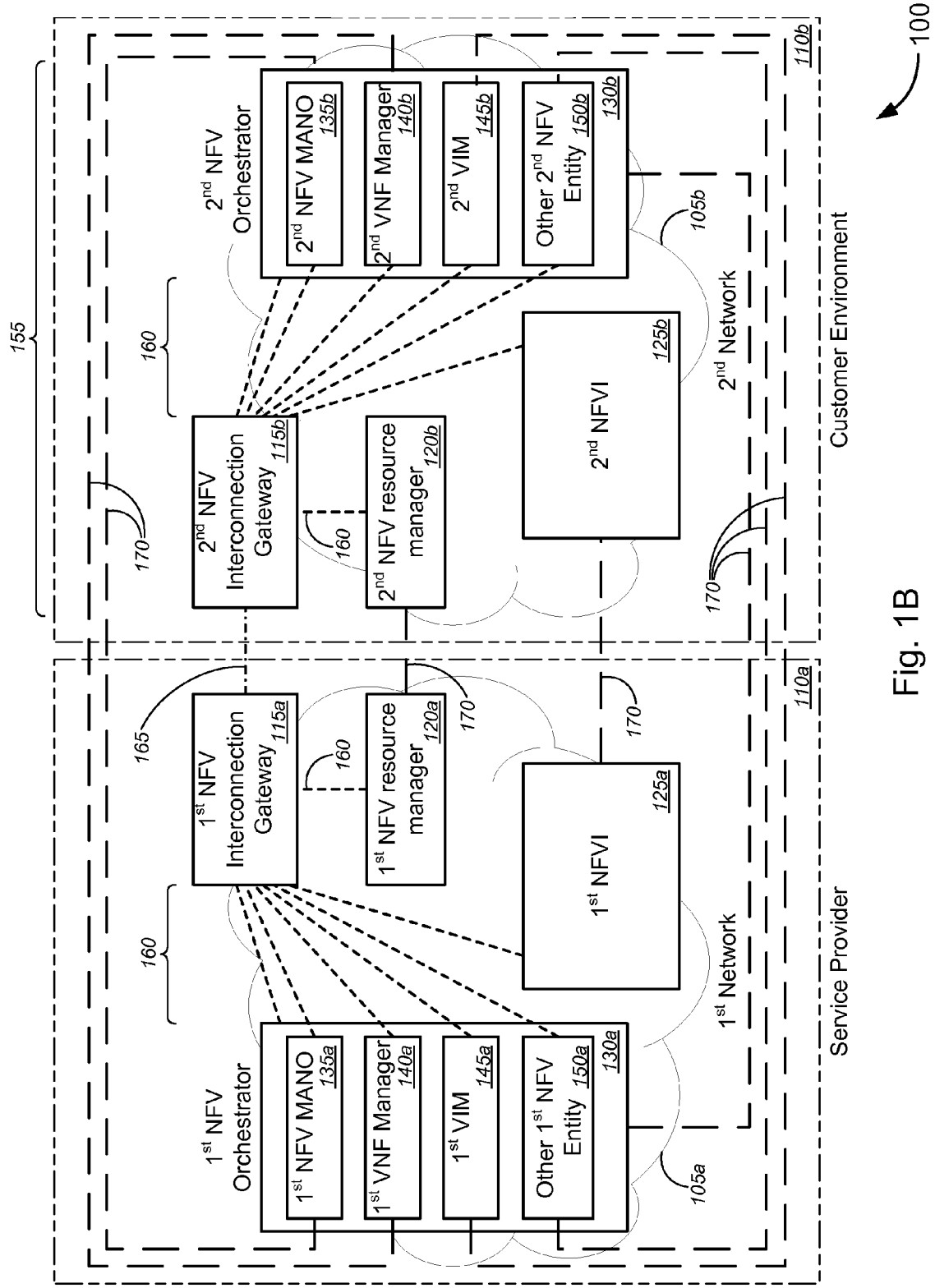

With reference to the figures, FIGS. 1A and 1B (collectively, "FIG. 1") are schematic diagrams illustrating various systems for implementing interconnection gateway functionality between a set of network functions virtualization ("NFV") entities in a first network and one or more NFV-based customer devices in a second network, in accordance with various embodiments.

In the embodiment of FIG. 1A, system 100 might comprise a first network 105a and a second network 105b, which are respectively associated with a service provider 110a and a customer environment 110b. System 100 might further comprise a NFV interconnection gateway or an interconnection gateway device 115 and one or more NFV entities, both of which are located within the first network 105a. The one or more NFV entities, according to some embodiments, might include, without limitation, one or more of a NFV resource manager 120, a NFV Infrastructure ("NFVI") system 125, a NFV orchestrator 130, a NFV management and orchestration ("MANO") architectural framework or system 135, a virtual network function ("VNF") manager 140, a virtual infrastructure manager ("VIM") 145, and/or other NFV entities 150. In some instances, the NFV MANO system 135, the VNF manager 140, the VIM 145, and/or the other NFV entities 150 might be part of the NFV orchestrator 130. In alternative instances, one or more of the NFV MANO system 135, the VNF manager 140, the VIM 145, and/or the other NFV entities 150 might be separate from, but in communication with, the NFV orchestrator 130. In some cases, the NFV entities 150 might include, but are not limited to, a virtual machine ("VM"), a macro orchestrator, a domain orchestrator, a god orchestrator, and/or the like.

System 100 might further comprise one or more NFV-based customer devices 155 located within the second network 105b. The one or more NFV-based customer devices 155 might, in some embodiments, include, without limitation, one or more of a VM, a macro orchestrator, a domain orchestrator, a god orchestrator, and/or the like. According to some embodiments, the one or more NFV-based customer devices 155 might include, but are not limited to, the devices shown and described in detail below with respect to FIGS. 4A-4G, and the customer environment might include, without limitation, one of a customer residence (FIG. 4A), a customer business (FIG. 4B), a healthcare facility (FIG. 4C), an industrial facility (FIG. 4D), a vehicle (FIG. 4E), a public safety answering point ("PSAP") facility (FIG. 4F), an Internet of things ("IOT") environment (FIG. 4G), and/or the like.

In some embodiments, the NFV interconnection gateway 115 might be an application running on a cloud platform, while in some cases might be part of any NFV entity that needs to interconnect with another NFV platform (e.g., MANO system, NFVI, VNF, etc.). In some instances, the interconnection gateway 115 might have both a physical component and a virtual component. The physical component might primarily be the physical interface between two or more networks of different service providers, while the virtual component might be an NFV entity that is hosted within the service provider's network. In some cases, it may be possible that each participating service provider could have an NFV hosted in its respective network, but that is not required. According to some embodiments, an NFV entity might be split into a portion completely under the control of an owning service provider. The owning service provider can then establish a set of functions that are available to other service providers and/or customer environments via application programming interfaces ("APIs") to tailor their specific needs at the interconnection gateway. The owning service provider might ensure that the function(s) provided and the APIs provided enable functionality to other service providers and/or customer environments, while also protecting the owning service provider network from nefarious activities. In general, the NFV interconnection gateway, which could be centralized or distributed within one network, might provide one-to-one NFV interconnection between service provider network(s) and networks within a customer environment(s).

In operation, the NFV interconnection gateway 115 might receive a first set of network connection information from at least one of the one or more NFV entities 120-150a via links 160 (which are represented in FIG. 1 as dash lines). The NFV interconnection gateway 115 might also receive a second set of network connection information from at least one of the one or more NFV-based customer devices 155 via links 165 (which are represented in FIG. 1 as dot-dash lines) that extend between the first network 105a and the second network 105b. The NFV interconnection gateway 115 might abstract the first set of network connection information and the second set of network connection information to generate a first set of abstracted network connection information and a second set of abstracted network connection information, respectively. The NFV interconnection gateway 115 might establish one or more links 170 between each of the one or more NFV entities and at least one NFV-based customer device of the one or more NFV-based customer devices (in this case between the NFVI systems 125 and the NFV-based customer device(s) 155, between the other NFV entity 150 and the NFV-based customer device(s) 155, and/or the like), based at least in part on one or more of the first set of abstracted network connection information or the second set of abstracted network connection information.

The NFV interconnection gateway 115 might subsequently provide access to one or more VNFs via the one or more links 170 (which are represented in FIG. 1 as long dash lines) that extend between the first network 105a and the second network 105b. In general, access can be either local access (e.g., a copy of the VNF is transferred to the NFV-based customer device(s) of the second network and is run on resources in the second network (in some cases, the resources of the NFV-based customer device(s) itself) or remote access (e.g., the VNF is run on the owning service provider's network resources (in this example, the first network) and the NFV-based customer device(s) is provided with access to the VNF running on the owning service provider's network resources). In some cases, providing access to the one or more VNFs might include, without limitation, one or more of providing at least one NFV-based customer device 155 of the one or more NFV-based customer devices 155 with access to one or more VNFs running on at least one NFV entity 120-150 of the one or more NFV entities 120-150, without sending the one or more VNFs from the at least one NFV entity 120-150 to the at least one NFV-based customer device 155; sending one or more VNFs from at least one NFV entity 120-150 of the one or more NFV entities 120-150 to at least one NFV-based customer device 155 of the one or more NFV-based customer devices 155, via the one or more links 170; providing, via the interconnection gateway device 155, access to one or more VNFs via the one or more link 160, 165, and/or 170; providing access to one or more VNFs, via peering connection between at least one NFV entity 120-150 of the one or more NFV entities 120-150 and at least one NFV-based customer device 155 of one or more NFV-based customer devices 155; bursting, using an application programming interface ("API"), one or more VNFs from at least one NFV entity 120-150 of the one or more NFV entities 120-150 to at least one NFV-based customer device 155 of the one or more NFV-based customer devices 155; and/or the like.

Merely by way of example, in some embodiments, each of one or more NFV-based customer devices 155 might be without the capacity and/or capability to locally execute the one or more VNFs, and might comprise a device that is configured to request execution of VNFs and to access the VNFs being executed on corresponding one of the one or more NFV entities.

In alternative embodiments, as shown in the embodiment of FIG. 1B, both the first network 105a and the second network 105b might include NFV interconnection gateway devices 115a and 115b (collectively, "interconnection gateway devices 115"). In such embodiments, system 100 might further comprise the second NFV interconnection gateway or interconnection gateway device 115b located in the second network 105b, as well as one or more NFV-based customer devices 155, which are located in the second network 105b. In some embodiments, each of the NFV interconnection gateway devices 115 might include, without limitation, one or more of a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, an external network-to-network interface ("E-NNI") device, and/or the like.

The NFV interconnection gateway device 115, the NFV resource manager 120, the NFVI system 125, the NFV orchestrator 130, the NFV MANO system 135, the VNF manager 140, the VIM 145, and the other NFV entities 150 of FIG. 1A might be referred to in FIG. 1B as the first interconnection gateway device 115a, the first NFV resource manager 120a, the first NFVI system 125a, the first NFV orchestrator 130a, the first NFV MANO system 135a, the first VNF manager 140a, the first VIM 145a, and the other first NFV entities 150a, respectively.

The one or more NFV-based customer devices 155 might include NFV entities including, but are not limited to, one or more of a second NFV resource manager 120b, a second NFVI system 125b, a second NFV orchestrator 130b, a second NFV MANO system 135b, a second VNF manager 140b, a second VIM 145b, and/or other second NFV entities 150b. In some instances, the second NFV MANO system 135b, the second VNF manager 140b, the second VIM 145b, and/or the other second NFV entities 150b might be part of the second NFV orchestrator 130b. In alternative instances, one or more of the second NFV MANO system 135b, the second VNF manager 140b, the second VIM 145b, and/or the other second NFV entities 150b might be separate from, but in communication with, the second NFV orchestrator 130b.

In operation, the embodiment of FIG. 1B might be similar to the embodiment of FIG. 1A, except that each interconnection gateway device 115 might receive network connection information from local NFV entities (i.e., NFV entities located in the same network as the particular interconnection gateway device) over links 160. If the first NFV interconnection gateway 115a is performing interconnection gateway functionalities (which is likely for at least a majority of embodiments, as the first NFV interconnection gateway 115a is associated with a service provider providing NFV functionalities or other virtualization functionalities to customer devices in customer environments), it might request and might receive the second set of network connection information from the one or more second NFV entities (i.e., the one or more NFV-based customer devices 155) via the second NFV interconnection gateway 115b, which might, in some cases, abstract the second set of network connection information from each of the one or more second NFV entities prior to sending the network connection information, and might send the second set of abstracted network connection information to the first NFV interconnection gateway 115a via links 165. In alternative cases, the second NFV interconnection gateway 115b might send the second set of network connection information to the first NFV interconnection gateway 115a via links 165, without abstracting the second set of network connection information. Based at least in part on one or more of the first set of abstracted network connection information or the second set of abstracted network connection information, the first NFV interconnection gateway 115a might establish the one or more links 170 (i.e., between the first and second NFV resource managers 120, between the first and second NFVI systems 125, between the first and second NFV orchestrators 130, between the first and second NFV MANO systems 135, between the first and second VNF managers 140, between the first and second VIMs 145, and between the other first and second NFV entities 150, and/or the like). The first NFV interconnection gateway device 115a might provide access to one or more VNFs in a manner similar to that as described above with respect to FIG. 1A. Although the above embodiment has been described with respect to the first NFV interconnection gateway device 115a performing the interconnection gateway functionalities, the various embodiments are not so limited and the second NFV interconnection gateway device 115b might perform the interconnection gateway functionalities. In alternative embodiments, each NFV interconnection gateway device 115a and 115b might each perform some of the interconnection gateway functionalities, as appropriate.

Figure 2:
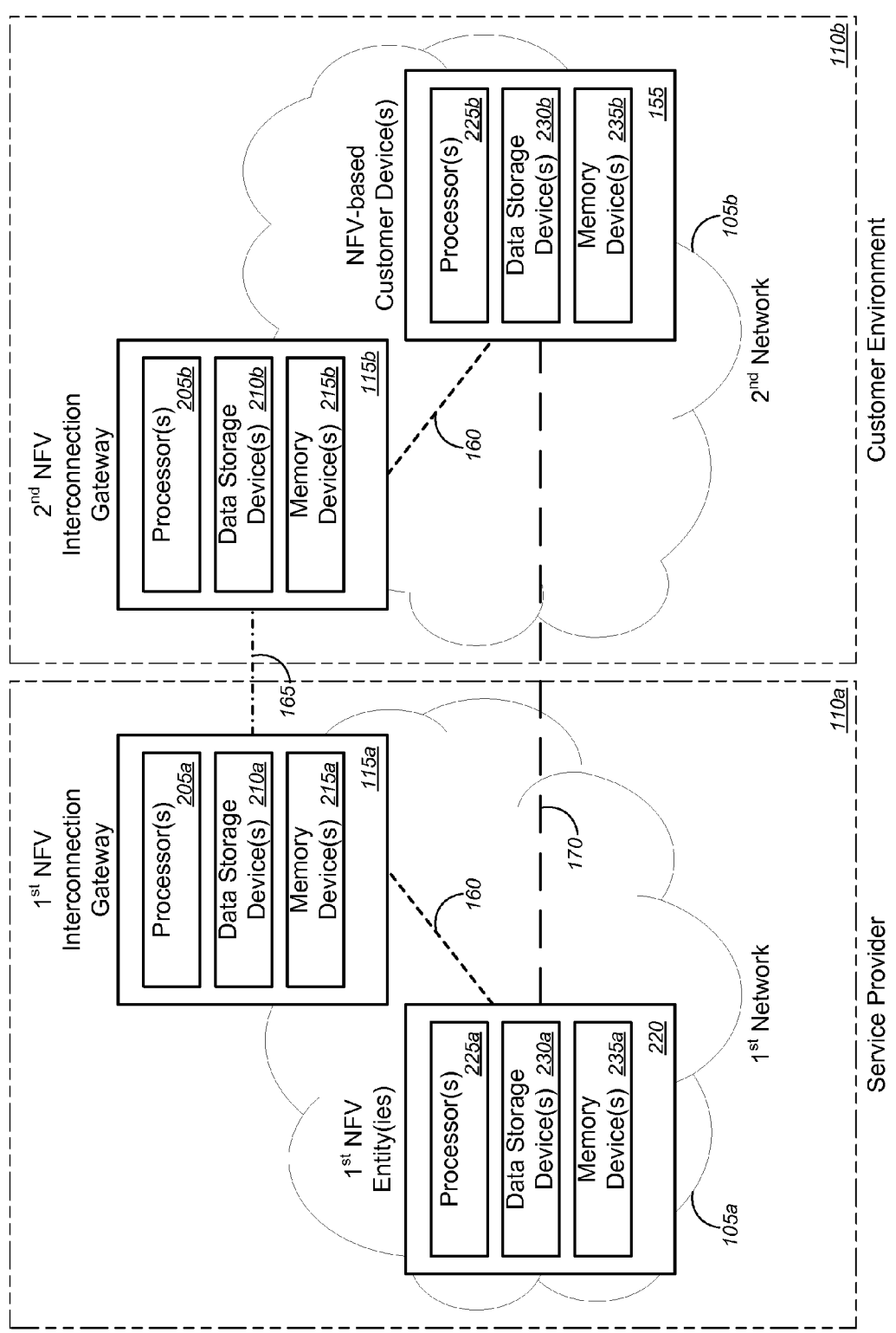
FIG. 2 is a block diagram illustrating another system for implementing interconnection gateway functionality between a set of NFV entities in a first network and one or more NFV-based customer devices in a second network, in accordance with various embodiments.

FIG. 2 is a block diagram illustrating another system for implementing interconnection gateway functionality between a set of NFV entities in a first network and one or more NFV-based customer devices in a second network, in accordance with various embodiments. FIG. 2 is similar to the embodiment of FIG. 1B, except that FIG. 2 depicts processors, data storage devices, and memory devices within each of the NFV interconnection gateway devices 115, in each of the NFV entities 220, and in each of the NFV-based customer devices 155. In particular, as shown in FIG. 2, the first NFV interconnection gateway device 115a might include, without limitation, a processor(s) 205a, a data storage device(s) 210a, and a memory device(s) 215a that are all interconnected with each other. Likewise, the second NFV interconnection gateway device 115b might include, without limitation, a processor(s) 205b, a data storage device(s) 210b, and a memory device(s) 215b that are all interconnected with each other. The data storage device(s) 210 might store data that is transmitted or received from the NFV interconnection gateway 115a or 115b, while the memory device(s) 215 might be a non-transitory computer readable medium that stores computer software comprising a set of instructions that, when executed by the corresponding processor(s) 205, causes the corresponding interconnection gateway device 115 to perform one or more functions (such as those as described herein with respect to FIGS. 1A, 1B, and 9A-9C, or the like).

In a similar manner, each of the NFV entity(ies) 220 might include, but is not limited to, a processor(s) 225a, a data storage device(s) 230a, and a memory device(s) 235a that are all interconnected with each other Likewise, each of the NFV-based customer devices 115 (which might include one or more NFV entities, as shown and described above with respect to FIG. 1B) might include, but is not limited to, a processor(s) 225b, a data storage device(s) 230b, and a memory device(s) 235b that are all interconnected with each other. The data storage device(s) 230 might store data that is transmitted or received from the NFV entity 220 or the NFV-based customer device 155, while the memory device (s) 235 might be a non-transitory computer readable medium that stores computer software comprising a set of instructions that, when executed by the processor(s) 225, causes the NFV entity 220 or the NFV-based customer device 155 to perform one or more functions (such as those as described below with respect to FIGS. 1A, 1B, and 9A-9C, or the like).

The techniques and configurations of FIG. 2 are otherwise similar, if not identical to, the techniques and configurations as described above with respect to FIG. 1, and the descriptions of the embodiment of FIG. 1 may similarly be applicable to those of the embodiment of FIG. 2 (unless incompatible, inconsistent, or otherwise stated as being different).

Figure 3:
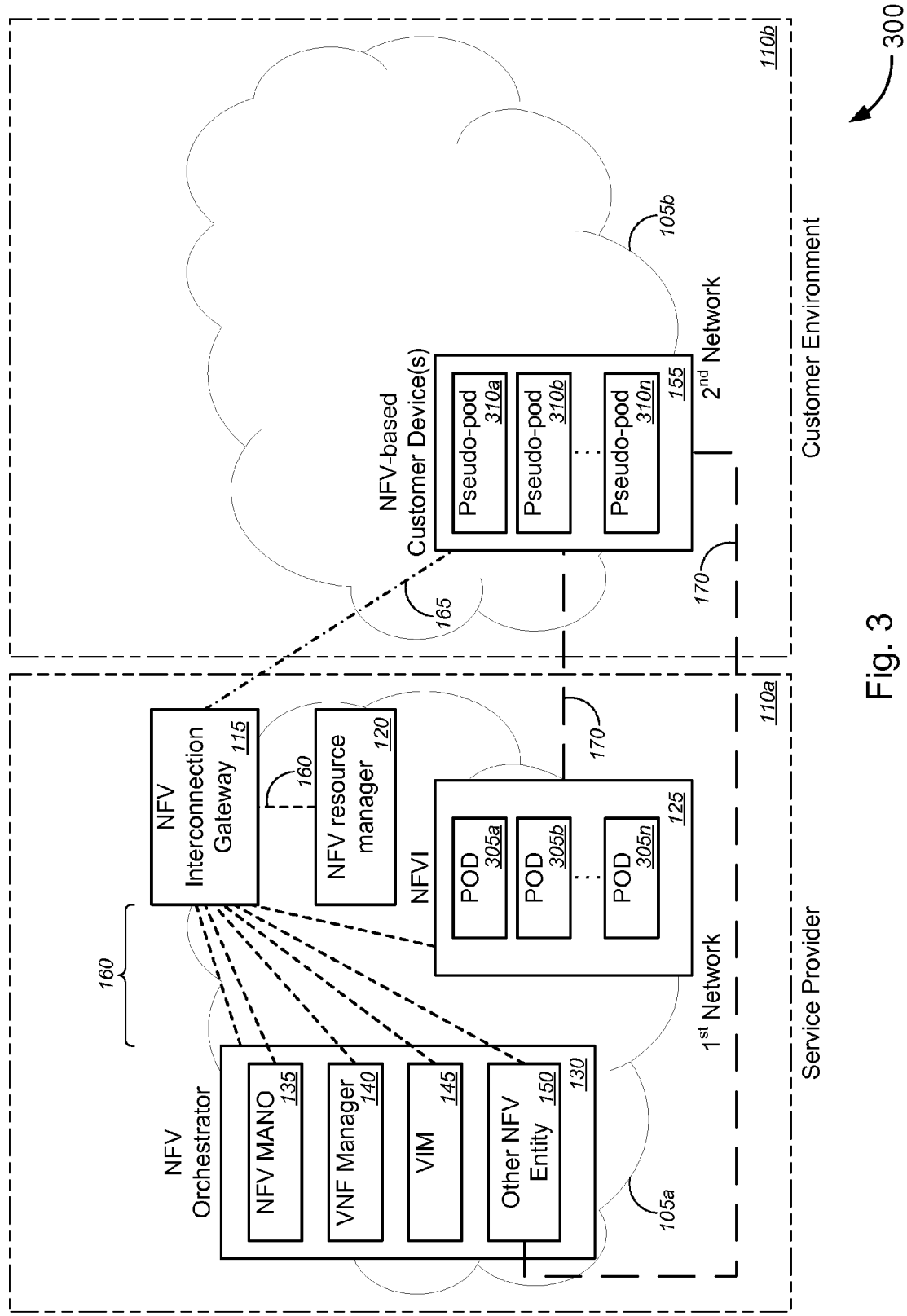
FIG. 3 is a schematic diagram illustrating yet another system for implementing interconnection gateway functionality between a set of NFV entities in a first network and one or more NFV-based customer devices in a second network, in accordance with various embodiments.

FIG. 3 is a schematic diagram illustrating yet another system for implementing interconnection gateway functionality between a set of NFV entities in a first network and one or more NFV-based customer devices in a second network, in accordance with various embodiments. FIG. 3 is similar to the embodiment of FIG. 1A, except that FIG. 3 depicts a plurality of pods in each of the NFVI system 125 and a plurality of pseudo-pods in each of at least one NFV-based customer device 155. Herein, "pseudo-pod" might refer to hardware resources that might be the customer device version of hardware resources that may be found in a service provider NFVI (which are referred to herein as pods, and might be embodied in the service provider NFVI as one or more racks of equipment or the like). In some embodiments, each pod might represent and/or include physical hardware resources that are part of the NFVI system 125, that are part of an external NFV entity (i.e., an NFV entity that is external to the first NFV entities or external to the NFV-based customer devices, or that is external to the first and second networks 105a and 105b), or that are part of the at least one NFV-based customer device 155 (e.g., part of the second NFVI system 125b as shown and described above with respect to FIG. 1B, or the like). In some cases, each pod might represent a rack of network communications equipment (e.g., compute resource, storage resource, etc.) within a telecommunications facility (e.g., DSLAM, CO, POP, Tera-POP, etc.) associated with the service provider 110a or a different service provider.

Turning back to the embodiment of FIG. 3, the NFVI system 125 might include a first pod 305a, a second pod 305b, through an $N^{th}$ pod 305n (collectively, "pods 305"), while the at least one NFV-based customer device 155 might include a first pseudo-pod 310a, a second pseudo-pod 310b, through an $N^{th}$ pseudo-pod 310n (collectively, "pseudo-pods 310").

In operation, the NFV interconnection gateway device 115 might burst at least one VNF from a first pod to a second pod, based at least in part on one or more of time of day, geographic usage throughout a day, one or more performance characteristics (including, without limitation, latency, jitter, bandwidth, compute resource usage, storage resource usage, memory resource usage, and/or the like), or changes in one or more performance characteristics, and/or the like. In some embodiments, the first and second pods might be within the NFVI system 125, to allow the service provider 110a that is providing the interconnection gateway functionality to internally burst the at least one VNF among its own physical hardware resources. In alternative embodiments, the interconnection gateway device 115 might burst the at least one VNF from any of the pods 305a-305n and pseudo-pods 310a-310n to any other of the pods 305a-305n and pseudo-pods 310a-310n. Bursting to a pod in the second network 105b (i.e., pseudo-pods 310a-310n) might allow for more localized execution of VNFs closer to a customer (in various embodiments, within the customer environment 110b itself).

Although the NFVI 125 and the at least one NFV-based customer device 155 are each depicted as a single component in the network, this is merely to simplify illustration, but the various embodiments are not so limited, and the NFVI 125 and/or the at least one NFV-based customer device 155 may be embodied as any suitable number of NFVI systems and/or or any number of NFV-based customer devices within its respective network 105. In some embodiments, the NFVI system 125 might include, without limitation, hardware resources located at a customer premises (e.g., hardware resources in network equipment at a residential customer premises; hardware resources in other wireless or wireline customer premises equipment ("CPE"); resources in a customer's mobile devices or other user devices; hardware resources in telecommunications closet(s) or room(s) at a multi-dwelling unit; hardware resources in telecommunications closet(s) or room(s) at a commercial customer premises; and/or the like), at a digital subscriber line access multiplexer ("DSLAM") (e.g., hardware resources in telecommunications or equipment rack(s) at the DSLAM; and/or the like), at a central office ("CO") (e.g., hardware resources in telecommunications rack(s) at the CO; and/or the like), at a point of presence ("POP") with the network, at a Tera-POP (i.e., a POP that is capable of terabit per second (i.e., at least 1 trillion bits per second) data transfer speeds), or the like.

In a non-limiting example, based on information regarding usage at different times of day, geographic usage throughout a day, one or more performance characteristics (including, without limitation, latency, jitter, bandwidth, compute resource usage, storage resource usage, memory resource usage, and/or the like), or changes in one or more performance characteristics, and/or the like, the interconnection gateway device 115 might burst VNFs associated with a user's business or work to pods/pseudo-pods within the user's work premises or at a DSLAM or CO that is local to the user's work premises, just before the user typically arrives at work (e.g., between about 6 a.m. and 8 a.m. on weekday mornings). During the user's typical lunch break, the interconnection gateway device 115 might burst VNFs associated with the user's media content (e.g., media content playback VNFs, etc.), news resources (e.g., news gathering VNFs, sports information gathering VNFs, etc.), and/or the like to pods/pseudo-pods within the user's work premises (if the user typically eats at work), to a DSLAM or CO that is local to the user's work premises (if the user typically eats at or near work), or the like. After the user's typical lunch hour, the interconnection gateway device 115 might burst VNFs associated with the user's media content, news resources, and/or the like to pods at the CO, POP, Tera-POP, or the like. When the user typical leaves work (e.g., for home; such as after 6 p.m.), the interconnection gateway device 115 might burst the VNFs associated with the user's media content, news resources, and/or the like to pods/pseudo-pods at the user's residential premises, at a DSLAM or CO near the user's residential premises, and/or the like, and might burst the VNFs associated with the user's business or work to pods at the CO, POP, Tera-POP, or the like. In the middle of the night (e.g., between 11 p.m. and 5 a.m.), the interconnection gateway device 115 might burst VNFs associated with backup software applications to pods/pseudo-pods that are closer to the user's work premises and/or to the user's residential premises, to back up the user's work and/or personal/entertainment data, or the like. Also in the middle of the night, the interconnection gateway device 115 might burst VNFs associated with third party computational cycles to pods/pseudo-pods closer to the user's work premises and/or the user's residential premises, to utilize unused or underutilized compute and/or data storage resources, or the like.

The techniques and configurations of FIG. 3 are otherwise similar, if not identical to, the techniques and configurations as described above with respect to FIG. 1, and the descriptions of the embodiment of FIG. 1 may similarly be applicable to those of the embodiment of FIG. 3 (unless incompatible, inconsistent, or otherwise stated as being different).

FIGS. 4A-4G (collectively, "FIG. 4") are schematic diagrams illustrating various embodiments of a system for implementing interconnection gateway functionality between a set of NFV entities in a first network and one or more NFV-based customer devices in a second network. The various embodiments depict NFV-based customer devices within various different customer environments, which as mentioned above, include, without limitation, a customer residence (FIG. 4A), a customer business (FIG. 4B), a healthcare facility (FIG. 4C), an industrial facility (FIG. 4D), a vehicle (FIG. 4E), a public safety answering point ("PSAP") facility (FIG. 4F), an Internet of things ("IOT") environment (FIG. 4G), and/or the like. FIG. 4 is otherwise the same or similar as the embodiment of FIG. 1A.

Figure 4A:
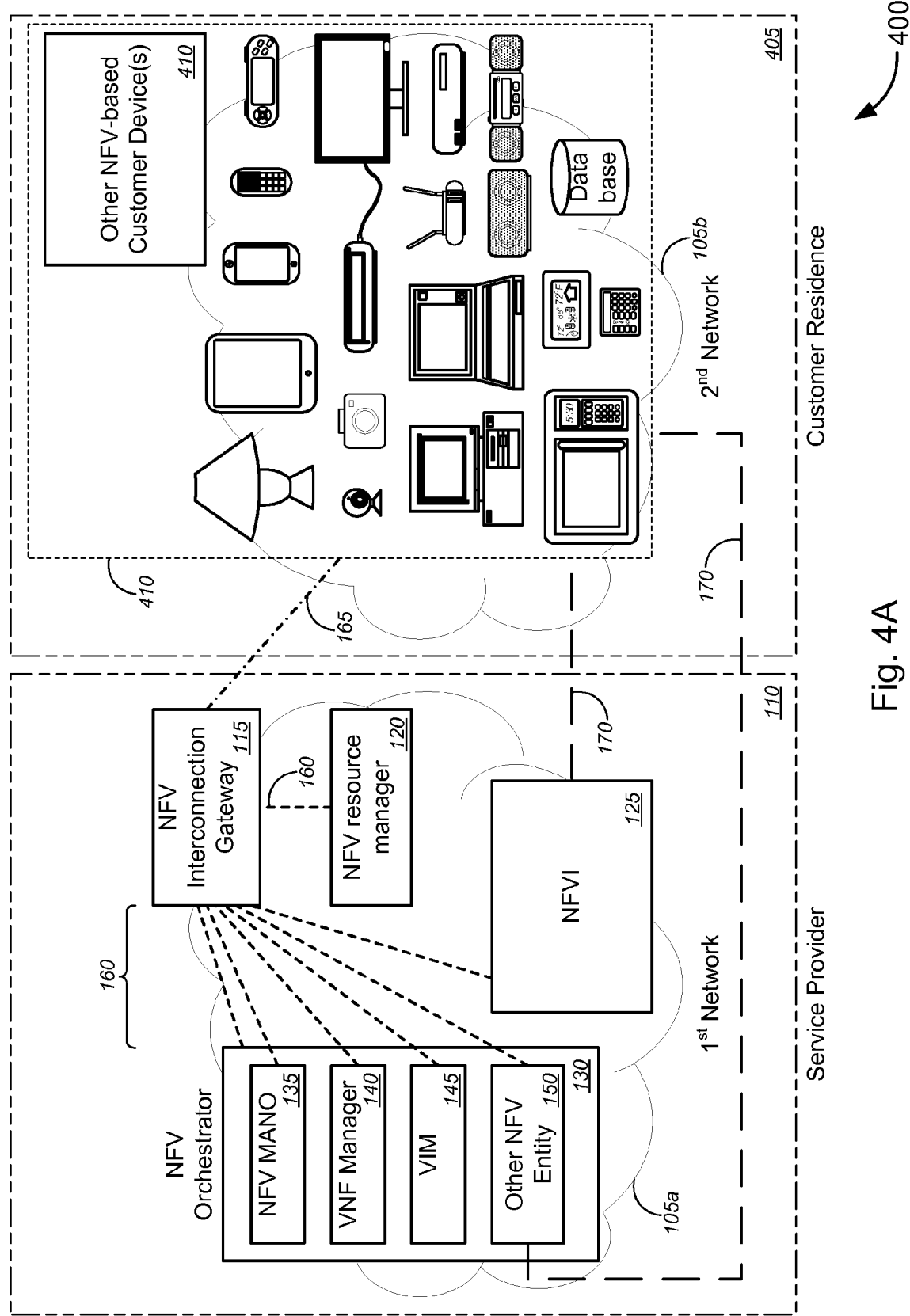
FIGS. 4A-4G are schematic diagrams illustrating various embodiments of a system for implementing interconnection gateway functionality between a set of NFV entities in a first network and one or more NFV-based customer devices in a second network.

In the embodiment of FIG. 4A, the second network 105b might be associated with a customer residence 405 (i.e., customer environment), which might include, but is not limited to, one of a customer residential premises (e.g., a single family house, a town house, etc.), a multi-dwelling unit (e.g., an apartment building/complex, a condominium building/complex, etc.), or a short-term lodging facility (e.g., a motel, a hotel, an inn, etc.), and/or the like. System 400 might include one or more NFV-based customer devices 410 that are located within customer residence 405 and/or in (direct) communication with (and in range of) the second network 105b. The one or more NFV-based customer devices 410 might include, without limitation, one or more of a lighting system, a tablet computer, a smart phone, a mobile phone, a portable gaming device, a web camera, an image capture device, a set-top box or video recording/playback device, a television, a desktop computer, a laptop computer, a residential gateway device or a residential network device, a game console, an external speaker, an audio recording/playback device, a kitchen appliance (e.g., microwave, stove, a kitchen vent hood, refrigerator, oven, dishwasher, mixer, rice maker, pressure cooker, etc.), a thermostat or other sensing device, a home security control device, a database or a data storage device, and/or other NFV-based customer devices. In some cases, the other NFV-based customer devices might include, but are not limited to, a printer, a scanner, a remote door locking system, a remote door opening/closing system, a garage door opener, a remote window locking system, a remote window opening/closing system, a window covering opening/closing control system, a robotic cleaning system, a baby monitor, an intercom system, and/or the like.

Figure 4B:
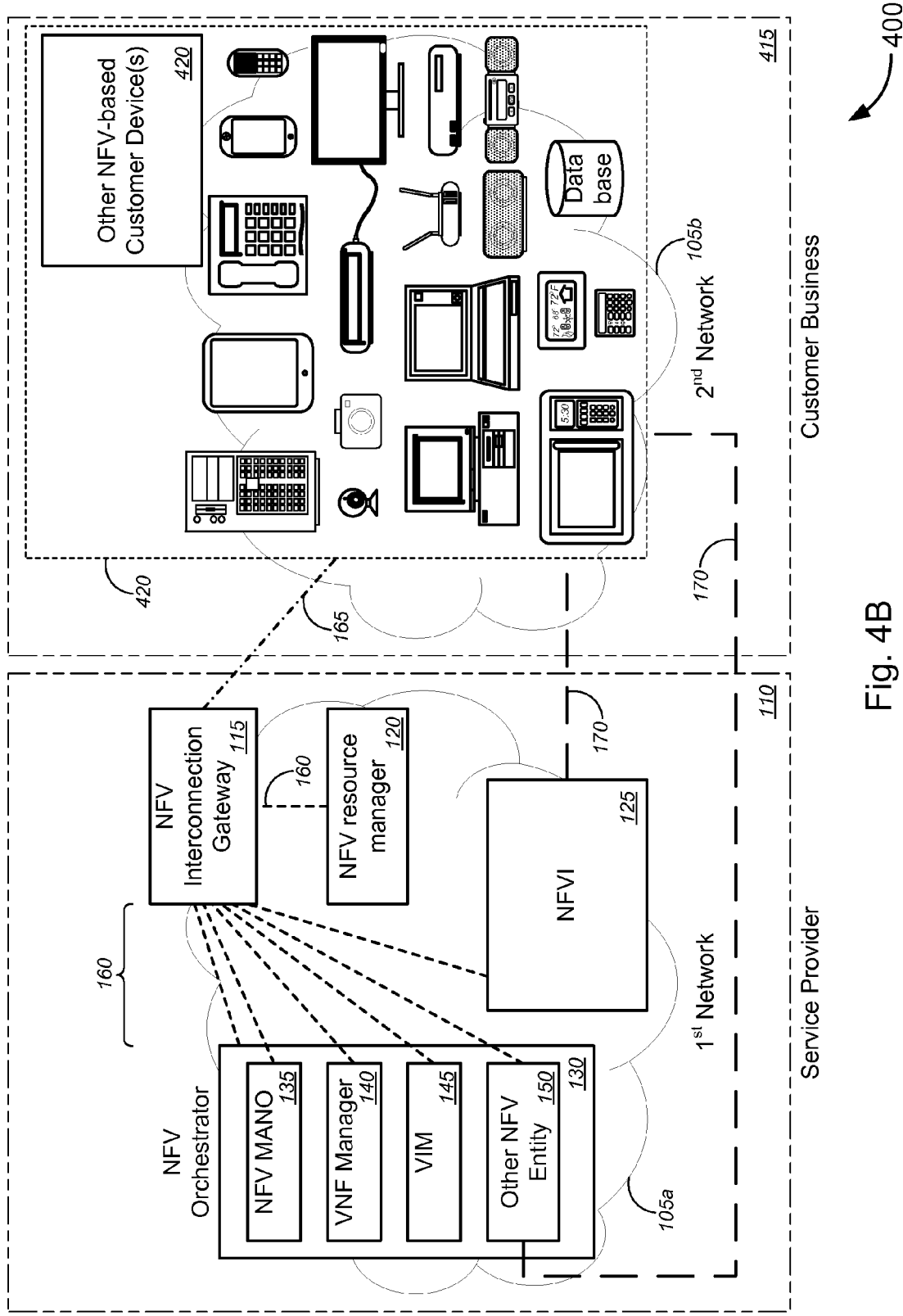

With reference to FIG. 4B, the second network 105b might be associated with a customer business 415 (i.e., customer environment), which might include, but is not limited to, one of a customer commercial premises, a customer business premises, and/or the like. In some cases, the customer business 415 might include a national company or an international company, which might have a network that is local to each business location, a network that spans multiple locations in a state or province, a network that spans locations in multiple states or provinces, a network that spans locations throughout the entire nation, a network that spans locations throughout multiple countries, and/or a network that spans locations throughout the world, or the like. For single location or few location businesses, the NFV interconnection gateway model as shown and described above with respect to FIGS. 1-3 might be appropriate. For more national or international businesses, the NFV interconnection hub model (including hub-gateway(s), hub-to-hub, hub-to-hub-to-hub, etc.) as shown and described below with respect to FIGS. 5-8 might be appropriate.

System 400 of FIG. 4B might include one or more NFV-based customer devices 420 that are located within customer business 415 and/or in (direct) communication with (and in range of) the second network 105b. The one or more NFV-based customer devices 420 might include, without limitation, one or more of a server computer or server system, a tablet computer, a telephone system, a smart phone, a mobile phone, a web camera, an image capture device, a set-top box or video recording/playback device, a television, a desktop computer, a laptop computer, a commercial gateway device or a commercial network device, a game console, an external speaker, an audio recording/playback device, a kitchen appliance (e.g., microwave, stove, refrigerator, oven, dishwasher, etc.), a thermostat or other sensing device, a commercial security control system, a database or a data storage device, and/or other NFV-based customer devices. In some cases, the other NFV-based customer devices might include, but are not limited to, a lighting system, a personal digital assistant, an image projection device, a printer, a scanner, a remote door locking system, a remote door opening/closing system, a garage door opener, a remote window locking system, a remote window opening/closing system, a window covering opening/closing control system, a robotic cleaning system, an intercom system, and/or the like.

Figure 4C:
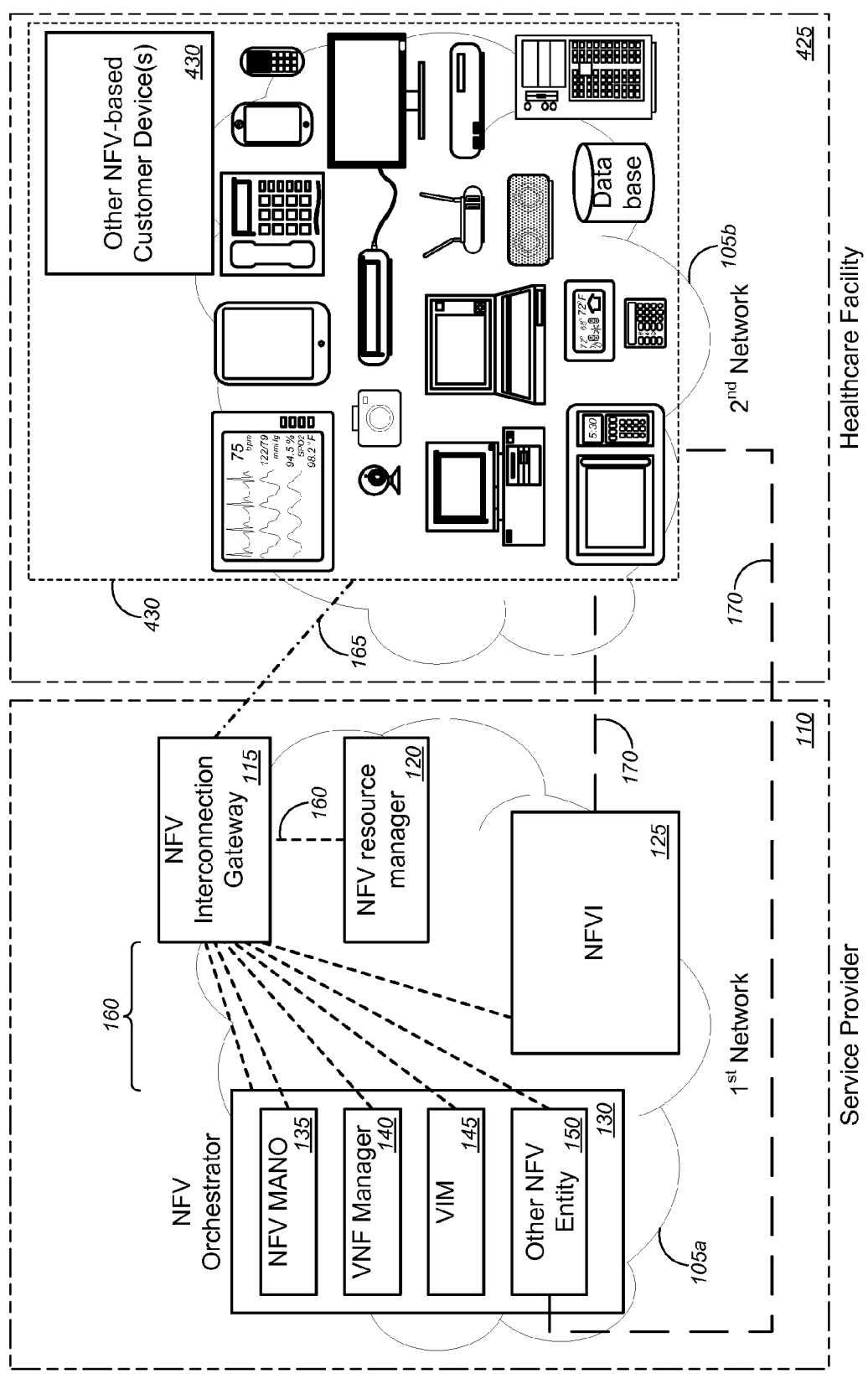

In FIG. 4C, the second network 105b might be associated with a healthcare facility 425 (i.e., customer environment), which might include, but is not limited to, one of a hospital, a clinic, a doctor's office, a dentist's office, an optometrist's office, a specialist physician's office, and/or the like. In some cases, the healthcare facility 425 might include a national healthcare facility or an international healthcare facility, which might have a network that is local to each healthcare facility location, a network that spans multiple healthcare facility locations in a state or province, a network that spans healthcare facility locations in multiple states or provinces, a network that spans healthcare facility locations throughout the entire nation, a network that spans healthcare facility locations throughout multiple countries, and/or a network that spans healthcare facility locations throughout the world, or the like. For single location or few location healthcare facilities (e.g., small clinics, small medical offices, small dental offices, small optometric offices, small specialist offices, or stand-alone hospitals, etc.), the NFV interconnection gateway model as shown and described above with respect to FIGS. 1-3 might be appropriate. For more national or international healthcare facilities (e.g., large hospitals, hospital chains, etc.), the NFV interconnection hub model (including hub-gateway(s), hub-to-hub, hub-to-hub-to-hub, etc.) as shown and described below with respect to FIGS. 5-8 might be appropriate.

The system 400 might include one or more NFV-based customer devices 430 that are located within a healthcare facility 425 and/or in (direct) communication with (and in range of) the second network 105b. The one or more NFV-based customer devices 430 might include, without limitation, one or more of a health monitoring device or a diagnostic device or a medical device, a tablet computer, a telephone system, a smart phone, a mobile phone, a web camera, an image capture device, a set-top box or video recording/playback device, a television, a desktop computer, a laptop computer, a commercial gateway device or a commercial network device, a game console, an external speaker, a kitchen appliance (e.g., microwave, stove, refrigerator, oven, dishwasher, etc.), a thermostat or other sensing device, a commercial security control system, a database or a data storage device, a server computer or server system, and/or other NFV-based customer devices. In some cases, the other NFV-based customer devices might include, but are not limited to, a lighting system, a personal digital assistant, an image projection device, a printer, a scanner, an audio recording/playback device, a portable gaming device, a remote door locking system, a remote door opening/closing system, a remote window locking system, a remote window opening/closing system, a window covering opening/closing control system, a robotic cleaning system, an intercom system, a power generation system, a medical vehicle (e.g., ambulance, etc.) dispatch control system, and/or the like.

Figure 4D:
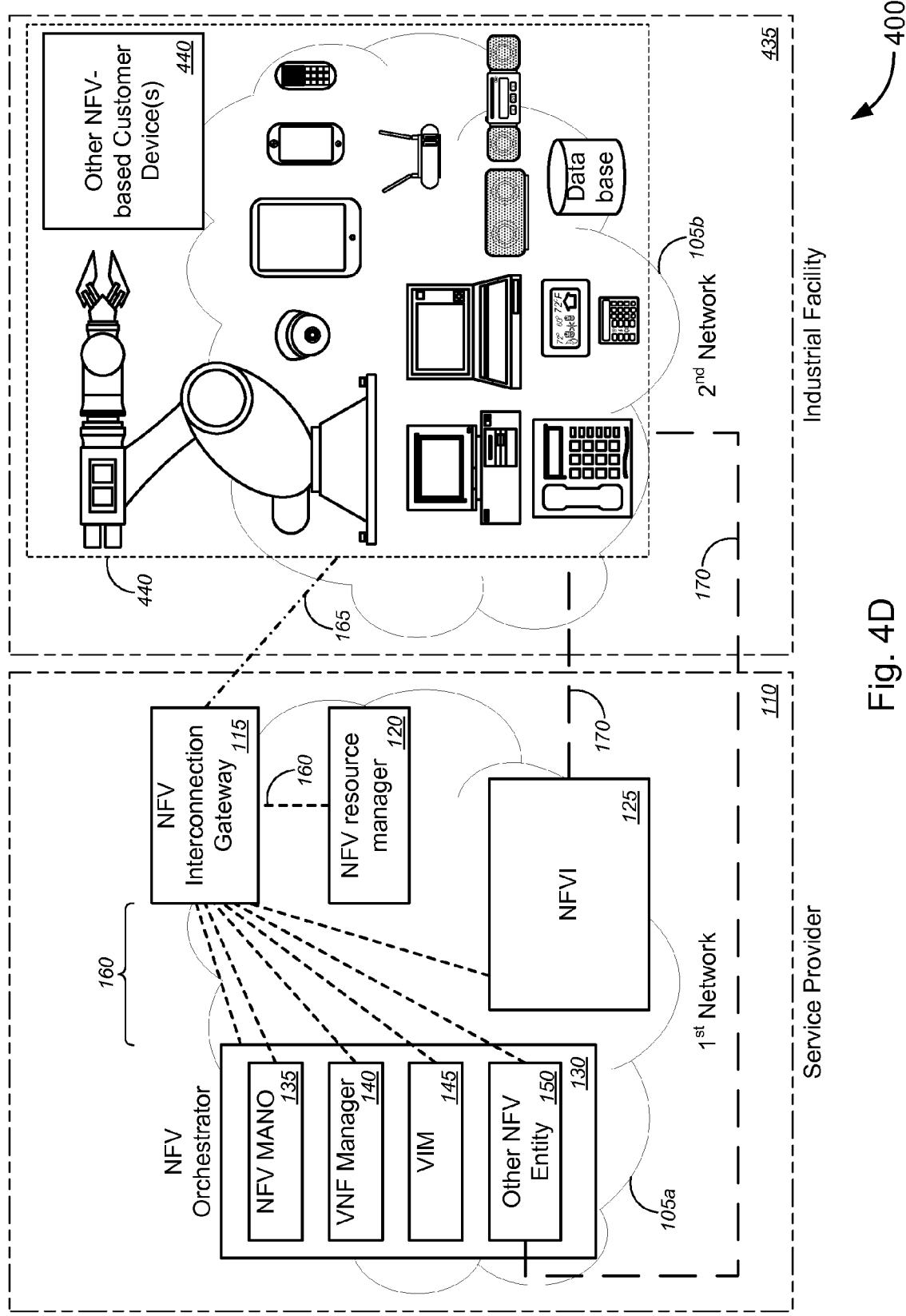

In the embodiment of FIG. 4D, the second network 105b might be associated with an industrial facility 435 (i.e., customer environment), which might include, but is not limited to, one of an industrial manufacturing facility, an industrial processing facility, a warehouse, and/or the like. In some cases, the customer business 435 might include a national company or an international company, which might have a network that is local to each industrial or business location, a network that spans multiple locations in a state or province, a network that spans locations in multiple states or provinces, a network that spans locations throughout the entire nation, a network that spans locations throughout multiple countries, and/or a network that spans locations throughout the world, or the like. For single location or few location industrial businesses, the NFV interconnection gateway model as shown and described above with respect to FIGS. 1-3 might be appropriate. For more national or international industrial businesses, the NFV interconnection hub model (including hub-gateway(s), hub-to-hub, hub-to-hub-to-hub, etc.) as shown and described below with respect to FIGS. 5-8 might be appropriate.

The system 400 might include one or more NFV-based customer devices 440 that are located within the industrial facility 435 and/or in (direct) communication with (and in range of) the second network 105b. The one or more NFV-based customer devices 440 might include, without limitation, one or more of industrial machinery (including, but not limited to, an industrial manufacturing robot, industrial manufacturing machinery, an industrial processing robot, industrial processing machinery, an industrial warehouse item transporting robot, industrial warehouse item transporting machinery, and/or the like), an image capture device (including, without limitation, a surveillance system, camera array, etc.), a tablet computer, a smart phone, a mobile phone, a desktop computer, a laptop computer, a commercial gateway device or a commercial network device, an external speaker, an audio recording/playback device, a telephone system, an industrial process monitoring system, a thermostat or other sensing device, a commercial security control system, a database or a data storage device, and/or other NFV-based customer devices. In some cases, the other NFV-based customer devices might include, but are not limited to, a server computer or server system, a lighting system, a set-top box or video recording/playback device, a television, an image projection device, a kitchen appliance (e.g., microwave, stove, refrigerator, oven, dishwasher, etc.), a printer, a scanner, a remote door locking system, a remote door opening/closing system, a remote window locking system, a remote window opening/closing system, a window covering opening/closing control system, a robotic cleaning system, an intercom system, a power generation system, an industrial or transport vehicle (e.g., transport truck, forklift, etc.) dispatch control system, and/or the like.

Figure 4E:
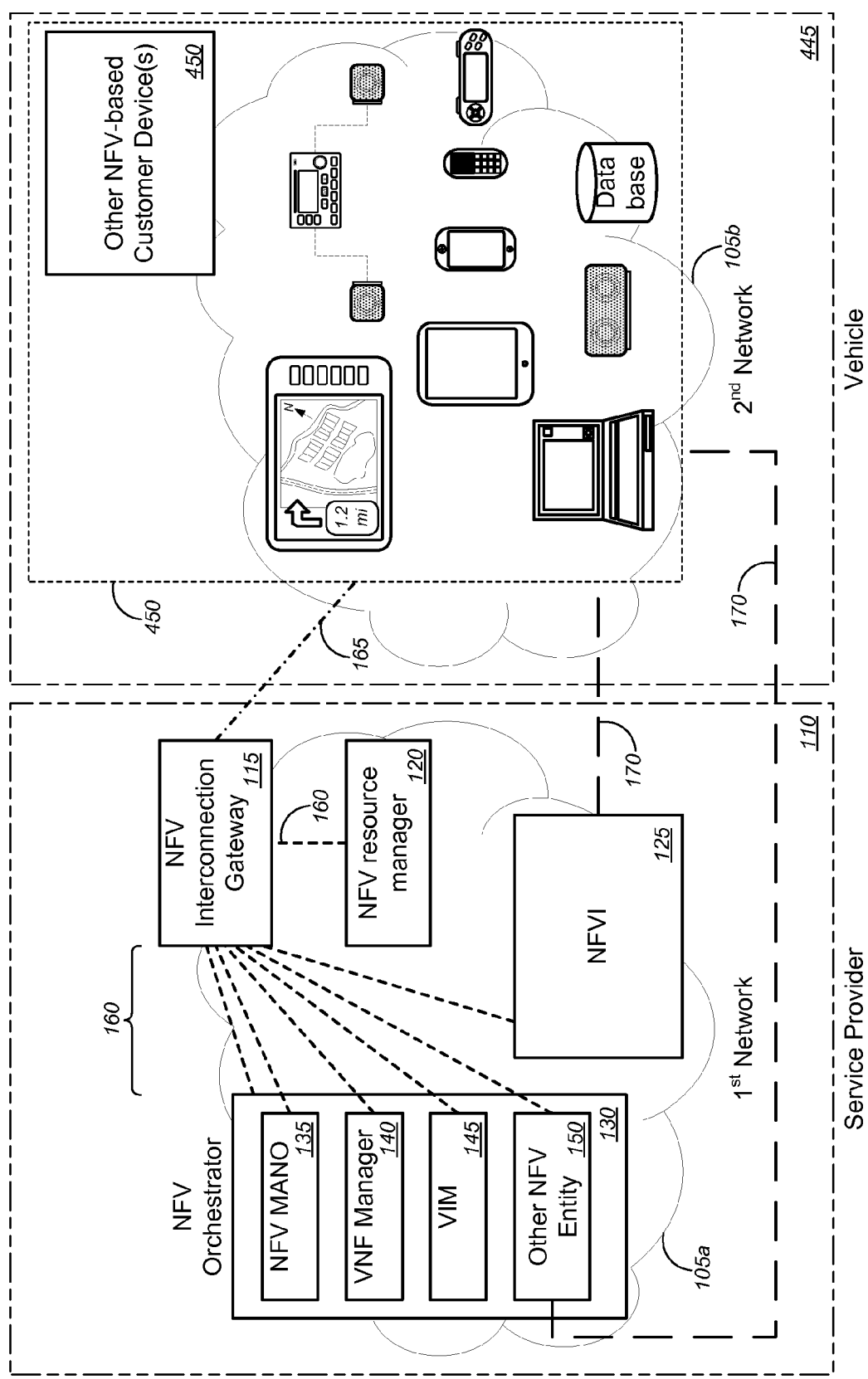

With reference to FIG. 4E, the second network 105b might be associated with a vehicle 445 (i.e., customer environment), which might include, but is not limited to, one of a bicycle, a motorbike, a car, an all-terrain vehicle, a snowmobile, a minivan, a truck, a van, a bus, a transport vehicle, an industrial vehicle, a government vehicle, a commercial vehicle, a recreational vehicle, a personal watercraft, a boat, a ship, an airplane, a helicopter, a personal aircraft, a space vehicle, a satellite, a probe, a drone, a space station, and/or the like. System 400 might include one or more NFV-based customer devices 450 that are located within vehicle 445 and/or in (direct) communication with (and in range of) the second network 105b. The one or more NFV-based customer devices 450 might include, without limitation, one or more of a vehicle-based navigation system (e.g., GPS system or the like), a vehicle-based audio system or a vehicle-based media recording and playback device, a tablet computer, a smart phone, a mobile phone, a portable gaming device, a laptop computer, an external speaker, a database or a data storage device, and/or other NFV-based customer devices. In some cases, the other NFV-based customer devices might include, but are not limited to, a vehicle control computer system, a vehicle-based gateway device, a vehicle-based network device, a vehicle climate control system, a sensing device, a vehicle lighting system, a vehicle door opening/closing device, a vehicle-based set-top box, a vehicle-based television or video monitor, an image capture device, a remote door locking system, a garage door opening/closing remote control device, a remote window opening/closing system, and/or the like.

Figure 4F:
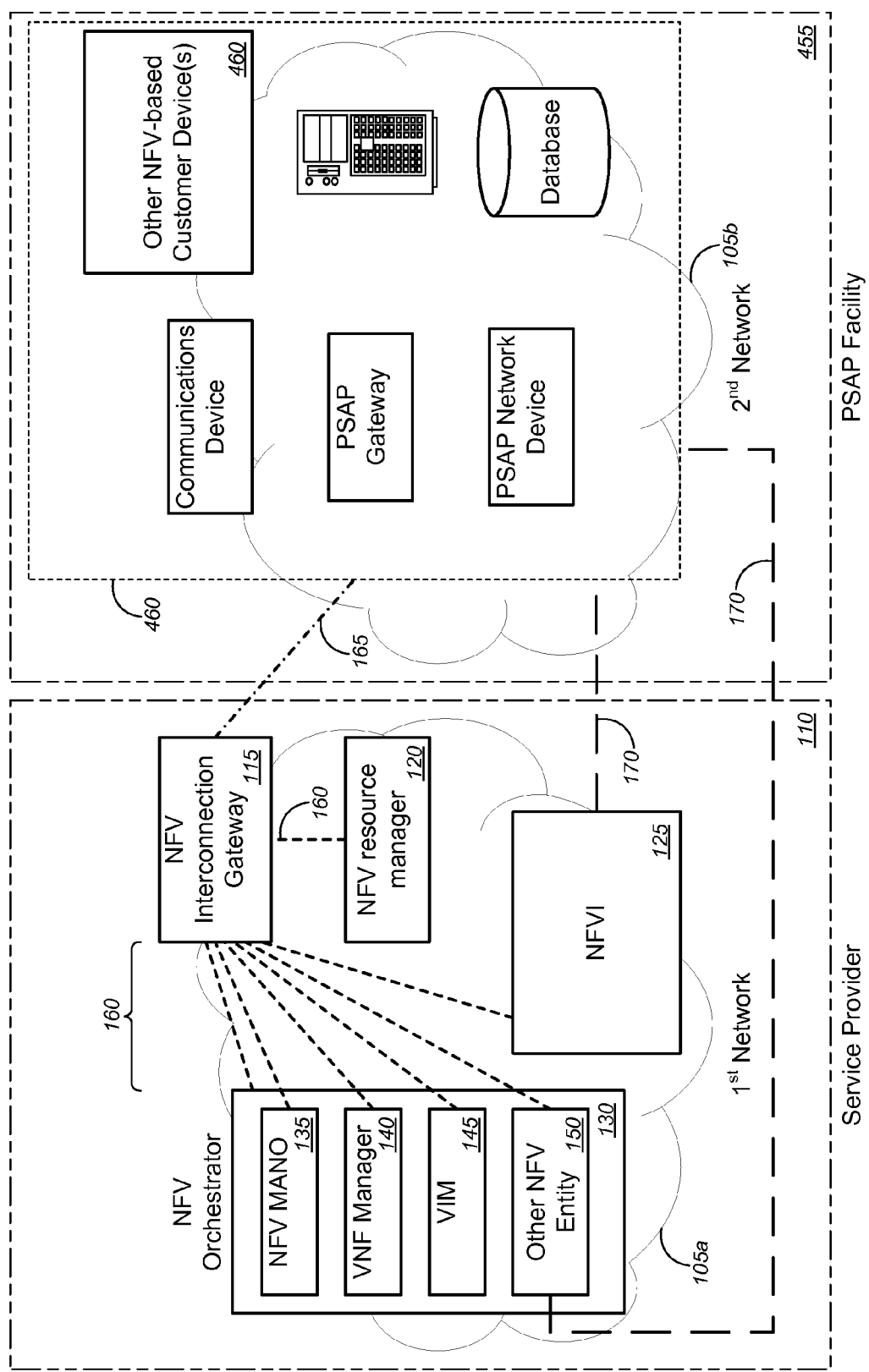

In the embodiment of FIG. 4F, the second network 105b might be associated with a public safety answering point ("PSAP") facility 455 (i.e., customer environment). In some cases, the PSAP facility 455 might include a national PSAP facility, which might have a network that is local to each PSAP facility location, a network that spans multiple PSAP facility locations in a state or province, a network that spans PSAP facility locations in multiple states or provinces, a network that spans PSAP facility locations throughout the entire nation, and/or the like. For single location or few location PSAP facilities, the NFV interconnection gateway model as shown and described above with respect to FIGS. 1-3 might be appropriate. For more nationwide or more regional PSAP facilities, the NFV interconnection hub model (including hub-gateway(s), hub-to-hub, hub-to-hub-to-hub, etc.) as shown and described below with respect to FIGS. 5-8 might be appropriate.

System 400 might include one or more NFV-based customer devices 460 that are located within the PSAP facility 455 and/or in (direct) communication with (and in range of) the second network 105b. The one or more NFV-based customer devices 460 might include, without limitation, one or more of a communications device, a PSAP gateway device, a PSAP network device, a computer system, a data storage device, and/or other NFV-based customer devices. In some cases, the other NFV-based customer devices might include, but are not limited to, a server computing computer system, a sensing device, an image capture device, a remote door locking system, a garage door opening/closing remote control device, a remote door opening/closing system, a remote window locking system, a remote window opening/closing system, a window covering opening/closing control system, a robotic cleaning system, an intercom system, a power generation system, an emergency vehicle (e.g., ambulance, police car, fire engine, etc.) dispatch control system, and/or the like.

Figure 4G:
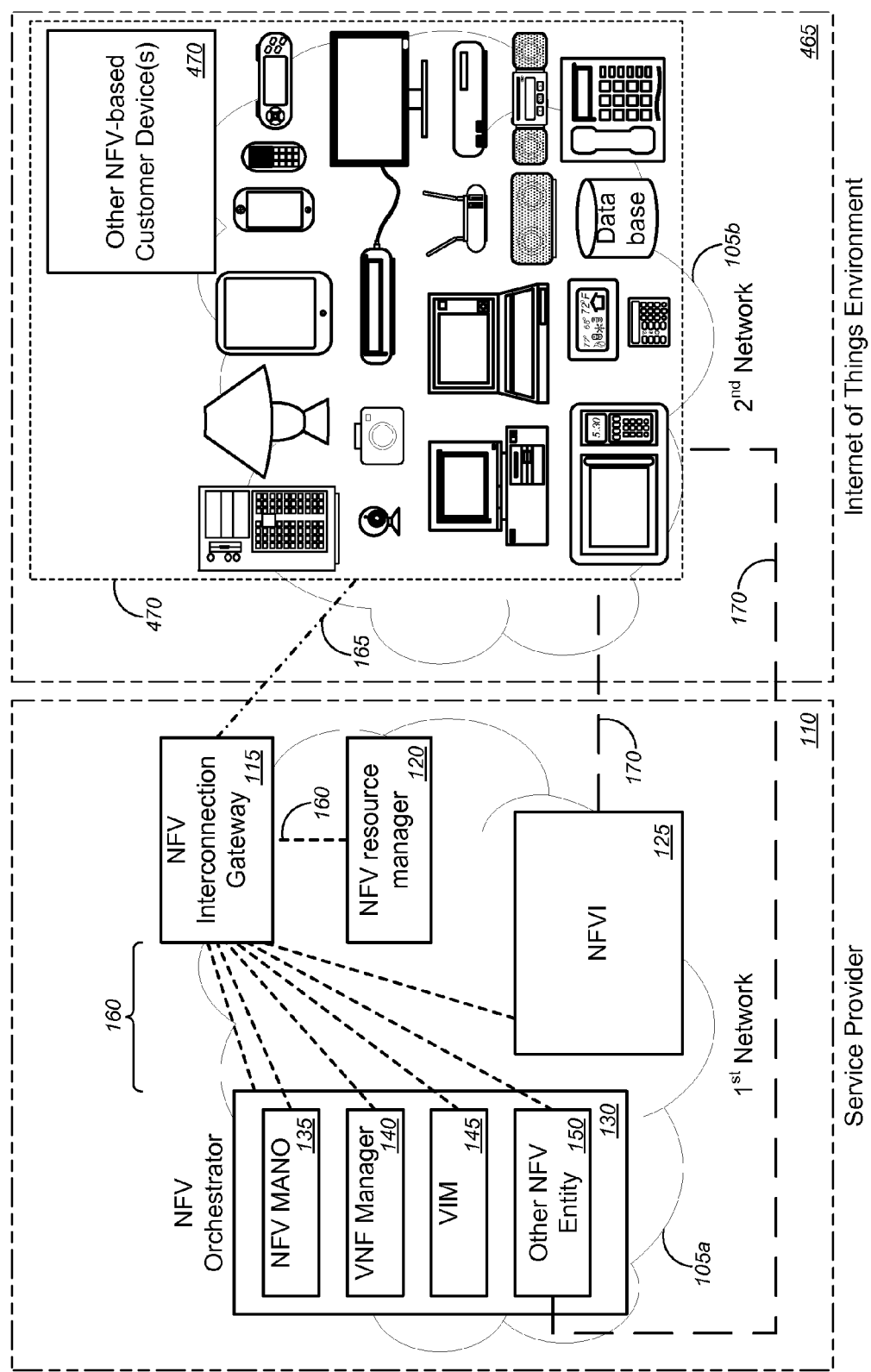

In the embodiment of FIG. 4G, the second network 105b might be associated with an IOT or machine-to-machine ("M2M") environment 465 (i.e., customer environment), which might include, but is not limited to, any suitable environment in which machines or devices interconnect and communicate with each other in a manner similar to the network of computing systems known as the Internet, and/or the like. System 400 might include one or more NFV-based customer devices 470 that are located within IOT or M2M environment and/or in (direct) communication with (and in range of) the second network 105b. The one or more NFV-based customer devices 470 might include, without limitation, one or more of a server computer or server system, a lighting system, a tablet computer, a smart phone, a mobile phone, a portable gaming device, a web camera, an image capture device, a set-top box or video recording/playback device, a television, a desktop computer, a laptop computer, a residential gateway device or a residential network device, a game console, an external speaker, an audio recording/playback device, a kitchen appliance (e.g., microwave, stove, a kitchen vent hood, refrigerator, oven, dishwasher, mixer, rice maker, pressure cooker, etc.), a thermostat or other sensing device, a home security control device, a database or a data storage device, a telephone system, and/or other NFV-based customer devices. In some cases, the other NFV-based customer devices might include, but are not limited to, any of the other NFV-based customer devices 410, 420, 430, 440, 450, and/or 460 as described above, and/or the like.

In operation, the NFV interconnection gateway 115 might receive a first set of network connection information from at least one of the one or more NFV entities 120-150a via links 160 (which are represented in FIG. 4 as dash lines). The NFV interconnection gateway 115 might also receive a second set of network connection information from at least one of the one or more NFV-based customer devices 410, 420, 430, 440, 450, and 460 via links 165 (which are represented in FIG. 4 as dot-dash lines) that extend between the first network 105a and the second network 105b. The NFV interconnection gateway 115 might abstract the first set of network connection information and the second set of network connection information to generate a first set of abstracted network connection information and a second set of abstracted network connection information, respectively. The NFV interconnection gateway 115 might establish one or more links 170 between each of the one or more NFV entities and at least one NFV-based customer device of the one or more NFV-based customer devices (in this case between the NFVI systems 125 and the NFV-based customer device(s) 410, 420, 430, 440, 450, and 460, between the other NFV entity 150 and the NFV-based customer device(s) 410, 420, 430, 440, 450, and 460, and/or the like), based at least in part on one or more of the first set of abstracted network connection information or the second set of abstracted network connection information.

The NFV interconnection gateway 115 might subsequently provide access to one or more VNFs via the one or more links 170 (which are represented in FIG. 1 as long dash lines) that extend between the first network 105a and the second network 105b. In some cases, providing access to the one or more VNFs might include, without limitation, one or more of providing at least one NFV-based customer device 410, 420, 430, 440, 450, and 460 of the one or more NFV-based customer devices 410, 420, 430, 440, 450, and 460 with access to one or more VNFs running on at least one NFV entity 120-150 of the one or more NFV entities 120-150, without sending the one or more VNFs from the at least one NFV entity 120-150 to the at least one NFV-based customer device 410, 420, 430, 440, 450, and 460; sending one or more VNFs from at least one NFV entity 120-150 of the one or more NFV entities 120-150 to at least one NFV-based customer device 410, 420, 430, 440, 450, and 460 of the one or more NFV-based customer devices 410, 420, 430, 440, 450, and 460, via the one or more links 170; providing, via the interconnection gateway device 410, 420, 430, 440, 450, and 460, access to one or more VNFs via the one or more link 160, 165, and/or 170; providing access to one or more VNFs, via peering connection between at least one NFV entity 120-150 of the one or more NFV entities 120-150 and at least one NFV-based customer device 410, 420, 430, 440, 450, and 460 of one or more NFV-based customer devices 410, 420, 430, 440, 450, and 460; bursting, using an application programming interface ("API"), one or more VNFs from at least one NFV entity 120-150 of the one or more NFV entities 120-150 to at least one NFV-based customer device 410, 420, 430, 440, 450, and 460 of the one or more NFV-based customer devices 410, 420, 430, 440, 450, and 460; and/or the like.

Merely by way of example, in some embodiments, each of one or more NFV-based customer devices 410, 420, 430, 440, 450, and 460 might be without the capacity and/or capability to locally execute the one or more VNFs, and might comprise a device that is configured to request execution of VNFs and to access the VNFs being executed on corresponding one of the one or more NFV entities. According to some embodiments, the NFV interconnection gateway 115, in providing access to the VNFs (as described above), might allow for or otherwise facilitate updating of the NFV-based customer devices 410, 420, 430, 440, 450, and 460 with improved versions of current functionalities, with new functionalities (so long as the hardware systems support such functionalities or if modular hardware can be configured to interface with existing hardware, etc.), with security updates, with power efficiency updates, with device/network interconnectivity updates, and/or the like. In this manner, according to some embodiments, basic or dumb devices may be deployed as embodied by the NFV-based customer devices 410, 420, 430, 440, 450, and 460, while operational software and the like may be provided to the NFV-based customer devices 410, 420, 430, 440, 450, and 460 remotely (via the NFV interconnection gateway and/or the NFV interconnection hub (as described in detail below), or the like) to fully utilize the full spectrum of functionalities of the NFV-based customer devices 410, 420, 430, 440, 450, and 460. With such NFV interconnection implementation, dumb and relatively low cost terminal devices may be deployed, and the NFV architecture and platform may be used to provide the intelligence, coordination, and control needed to operate the terminal devices. In addition, the dumb terminal devices would have a longer life (at least from an obsolescence perspective) because new/upgraded functions, features, services, and/or the like can be administered in the NFV applications on the platform.

The techniques and configurations of FIG. 4 are otherwise similar, if not identical to, the techniques and configurations as described above with respect to FIGS. 1-3, and the descriptions of the embodiment of FIGS. 1-3 may similarly be applicable to those of the embodiment of FIG. 4 (unless incompatible, inconsistent, or otherwise stated as being different).

Figure 5:
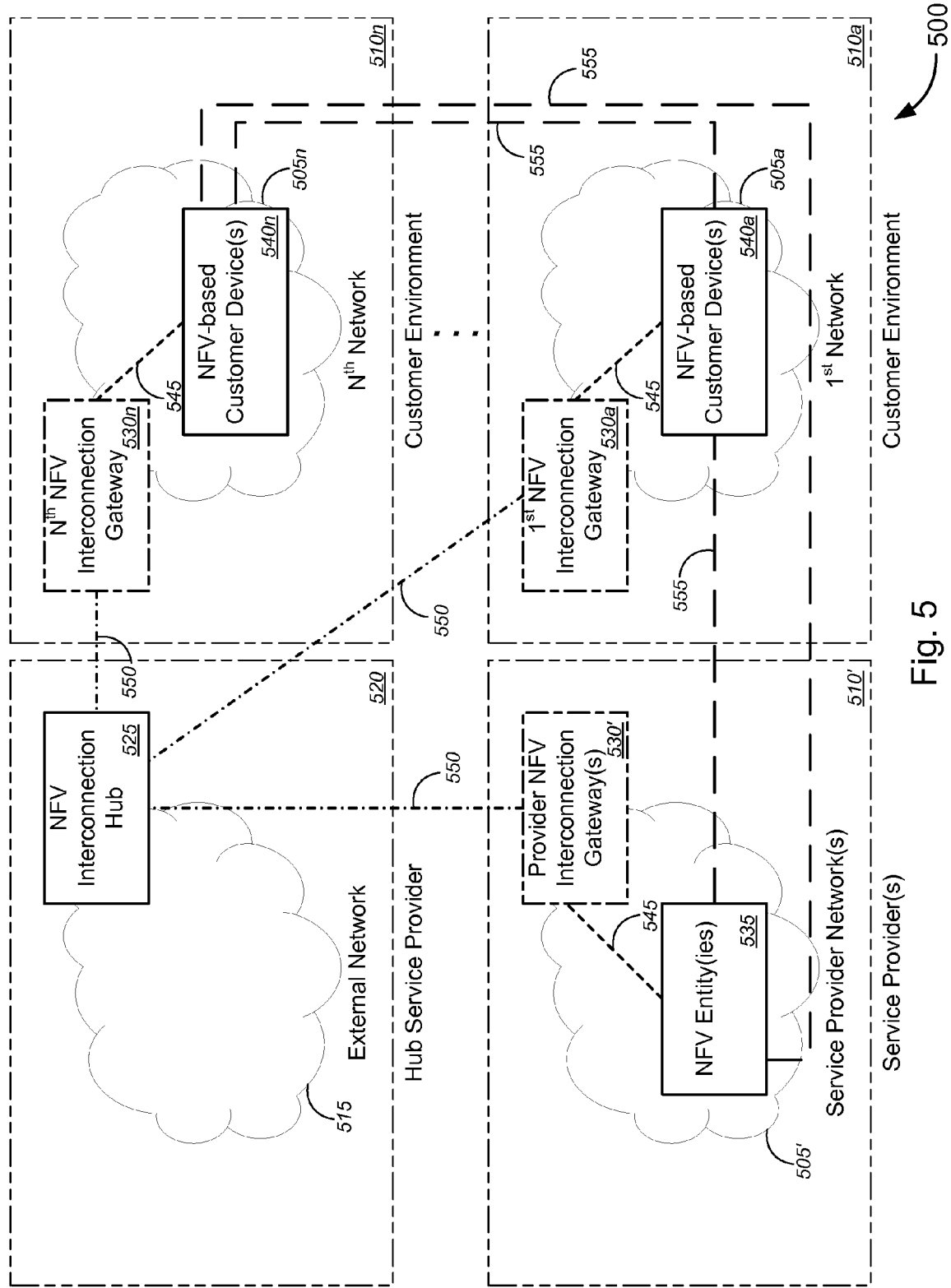
FIG. 5 is a schematic diagram illustrating a system for implementing interconnection hub functionality among one or more sets of service provider NFV entities in one or more service provider networks and a first set of NFV-based customer devices in a first network through an $N^{th}$ set of NFV-based customer devices in an $N^{th}$ network, in accordance with various embodiments.

FIG. 5 is a schematic diagram illustrating a system for implementing interconnection hub functionality among one or more sets of service provider NFV entities in one or more service provider networks and a first set of NFV-based customer devices in a first network through an $N^{th}$ set of NFV-based customer devices in an $N^{th}$ network, in accordance with various embodiments.

In the embodiment of FIG. 5, system 500 might comprise a first network 505a through an $N^{th}$ network 505n, as well as one or more service provider networks 505' (collectively, "networks 505"), which are respectively associated with a first customer environment 510a through an $N^{th}$ customer environment 510n (collectively, "customer environments 510"), as well as one or more service providers 510', respectively. System 500 might also comprise an external network 515 that is associated with a hub service provider 520. System 500 might further comprise an NFV interconnection hub 525 that is located in the external network 515. System 500 might additional comprise, associated with each service provider 510', a service provider or provider NFV interconnection gateway 530' (optional) and one or more NFV entities 535 that are located in the respective network 505' (for simplicity of illustration, only one service provider 510' and one service provider network 505' is shown in FIG. 5, although any number of service providers 510' and service provider networks 505' may be implemented). System 500 might further comprise, associated with each customer environment 510, an NFV interconnection gateway 530 (optional) and one or more NFV-based customer devices 540, and/or the like. For example, an optional first NFV interconnection gateway 530a and one or more NFV-based customer devices 540a might be located within the first network 505a, and so on, through to an optional $N^{th}$ NFV interconnection gateway 530n and one or more $N^{th}$ NFV-based customer devices 540n being located within the $N^{th}$ network 505n.

According to some embodiments, each of the one or more NFV entities 535 might include, without limitation, one or more of a NFV resource manager (such as NFV resource manager 120), a NFV Infrastructure ("NFVI") system (such as NFVI system 125, etc.), a NFV orchestrator (such as NFV orchestrator 130, or the like), a NFV management and orchestration ("MANO") architectural framework or system (such as NFV MANO system 135, or the like), a virtual network function ("VNF") manager (such as VNF manager 140, or the like), a virtual infrastructure manager ("VIM") (such as VIM 145, or the like), and/or other NFV entities (such as other NFV entities 150, etc.). In some instances, the NFV MANO system, the VNF manager, the VIM, and/or the other NFV entities might be part of the NFV orchestrator. In alternative instances, one or more of the NFV MANO system, the VNF manager, the VIM, and/or the other NFV entities might be separate from, but in communication with, the NFV orchestrator. In some cases, the other NFV entities might include, but are not limited to, a virtual machine ("VM"), a macro orchestrator, a domain orchestrator, a god orchestrator, and/or the like.

In some embodiments, each NFV interconnection gateway 530 (including provider NFV interconnection gateway 530' and the $1^{st}$ through $N^{th}$ NFV interconnection gateways 530a-530n) might be an application running on a cloud platform, while in some cases might be part of any NFV entity that needs to interconnect with another NFV platform (e.g., MANO system, NFVI, VNF, etc.). In some instances, each interconnection gateway 530 might have both a physical component and a virtual component. The physical component might primarily be the physical interface between two or more networks of different service providers, while the virtual component might be an NFV entity that is hosted within the service provider's network and/or customer environment network. In some cases, it may be possible that each participating service provider or customer environment could have an NFV hosted in its respective network, but that is not required. According to some embodiments, an NFV entity might be split into a portion completely under the control of an owning service provider. The owning service provider can then establish a set of functions that are available to other service providers or customer environment(s) via application programming interfaces ("APIs") to tailor their specific needs at the interconnection gateway. The owning service provider might ensure that the function(s) provided and the APIs provided enable functionality to other service providers or customer environment(s), while also protecting the owning service provider network from nefarious activities. In general, the NFV interconnection gateway, which could be centralized or distributed within one network, might provide one-to-one NFV interconnection between two service provider networks, between one service provider network and one customer environment network, or between two customer environment networks.

Merely by way of example, in some aspects, NFV interconnection hub might be provided as a service, including, without limitation, various centralized services for NFV-based service providers and/or NFV-based customer environments to interconnect. In general, the NFV interconnection hub, which could be centralized or distributed within one network, might provide many-to-many NFV interconnection amongst a plurality of service provider networks and/or a plurality of customer environment networks (in some cases, amongst three or more service provider/customer environment networks). In some embodiments, the many-to-many interconnection service can take the form of discovery and authentication (which is its simplest form). In alternative embodiments, the many-to-many interconnection service can take the form of a full blown hub for interconnection. In its simplest form, the NFV interconnection hub could be embodied as applications on a cloud platform. In some cases, the NFV interconnection hub, in its simplest form, might be embodied as a registry (or a more complex catalog). In more complex forms, the NFV interconnection hub could be similar to the full blown interconnect with instances of NFV interconnection gateways. In some instances, the NFV interconnection hub might be embodied as a hub device that utilizes actual interconnection and/or micro-peering amongst NFV entities and/or NFV-based customer devices in various different networks connected by the hub. According to some embodiments the interconnection hub might translate NFV-specific standards (e.g., translating FCAPS for one network service provider to FCAPS for a different network service provider, translating FCAPS for one network service provider to FCAPS for a customer environment network, or the like). In some cases, the interconnection hub might determine how interconnection gateways establish interconnections. In some instances, the interconnection hub might function as a clearinghouse or possibly facilitate the NFVI optimization (in some cases, dynamically, and/or in real-time, establishing interconnections to NFV entities and/or NFV-based customer devices), possibly based on specifications established by a customer. According to some embodiments, the interconnection hub might establish an interconnection based on one or more of geolocation, usage, availability, budget, and/or functional requirements, or the like. In some embodiments, the interconnection hub might be federated or might be managed by a third party.

In operation, the NFV interconnection hub 525 might receive a set of service provider network connection information from at least one NFV entity of the one or more NFV entities 535 via links 550 (which are represented in FIG. 5 as dot-dash lines) that extend between the service provider network 505' and the external network 515—in some cases, via a provider NFV interconnection gateway 530' (which may or may not be present in the service provider network 505') via links 545 (which are represented in FIG. 5 as dash lines) between the at least one NFV entity 535 and the provider NFV interconnection gateway 530'. Similarly, the NFV interconnection hub 525 might receive a first set of network connection information from at least one NFV-based customer device of the one or more NFV-based customer devices 535a via links 550 (represented as dot-dash lines) that extend between the first network 505a and the external network 515—in some cases, via a first NFV interconnection gateway 530a (which may or may not be present in the second network 505a) via links 545 (represented as dash lines) between the at least one NFV-based customer device 540a and the first NFV interconnection gateway 530a. And so on, with the NFV interconnection hub 525 receiving an $N^{th}$ set of network connection information from at least one $N^{th}$ NFV-based customer device of the one or more $N^{th}$ NFV-based customer devices 535n via links 550 (represented as dot-dash lines) that extend between the $N^{th}$ network 505n and the external network 515—in some cases, via an $N^{th}$ NFV interconnection gateway 530n (which may or may not be present in the $N^{th}$ network 505n) via links 545 (represented as dash lines) between the at least one $N^{th}$ NFV-based customer device 540n and the $N^{th}$ NFV interconnection gateway 530n.

The NFV interconnection hub 525 might abstract each of the set of service provider network connection information, as well as the first set of network connection information through the $N^{th}$ set of network connection information to generate a set of abstracted service provider network connection information, as well as a first set of abstracted network connection information through an $N^{th}$ set of abstracted network connection information, respectively. The NFV interconnection hub 525 might establish one or more links 555 (which are represented in FIG. 5 as long dash lines) between one or more of at least one NFV entity and at least one first NFV-based customer devices through at least one $N^{th}$ NFV-based customer devices (and, in some embodiments, between or among one or more NFV-based customer devices 540a-540n), based at least in part on one or more of the set of abstracted service provider network connection information, the first set of abstracted network connection information, or the $N^{th}$ set of abstracted network connection information.

The NFV interconnection hub 525 might subsequently provide access to one or more VNFs via the one or more links 550 (represented as long dash lines) that extend between one of the service provider networks 505' and one of the first network 505a through the $N^{th}$ network 505n, or between one of the first network 505a through the $N^{th}$ network 505n and another of the first network 505a through the $N^{th}$ network 505n. In general, access can be either local access (e.g., a copy of the VNF is transferred to the one or more NFV-based customer devices of the first through $N^{th}$ networks 505a-505n and is run on resources in the corresponding first through $N^{th}$ networks 505a-505n (in some cases, the resources of the one or more NFV-based customer devices themselves) or remote access (e.g., the VNF is run on the owning service provider's network resources (in this example, one or more of the service provider networks 505') and the one or more NFV-based customer devices are provided with access to the VNF running on the owning service provider's network resources). In some cases, providing access to the one or more VNFs might include, without limitation, one or more of providing at least one of one or more first NFV-based customer devices 540a-540n with access to one or more VNFs running on at least one of one or more NFV entities 535, without sending the one or more VNFs from the at least one of the one or more NFV entities 535 to the at least one of the one or more first NFV-based customer devices 540a-540n; sending one or more VNFs from at least one of one or more NFV entities 535 to at least one of one or more first NFV-based customer devices 540a-540n; providing access, via the interconnection hub device 525, to one or more VNFs (in some cases, via the one or more links); providing access to one or more VNFs, via peering connection between at least one of one or more NFV entities 535 and at least one of one or more first NFV-based customer devices 540a-540n; bursting, using an application programming interface ("API"), one or more VNFs from at least one of one or more NFV entities 535 to at least one of one or more first NFV-based customer devices 540a-540n; and/or the like.

Merely by way of example, in some embodiments, each of one or more NFV-based customer devices 540a-540n might be without the capacity and/or capability to locally execute the one or more VNFs, and might comprise a device that is configured to request execution of VNFs and to access the VNFs being executed on at least one of one or more NFV entities 535, and/or the like.

Figure 6:
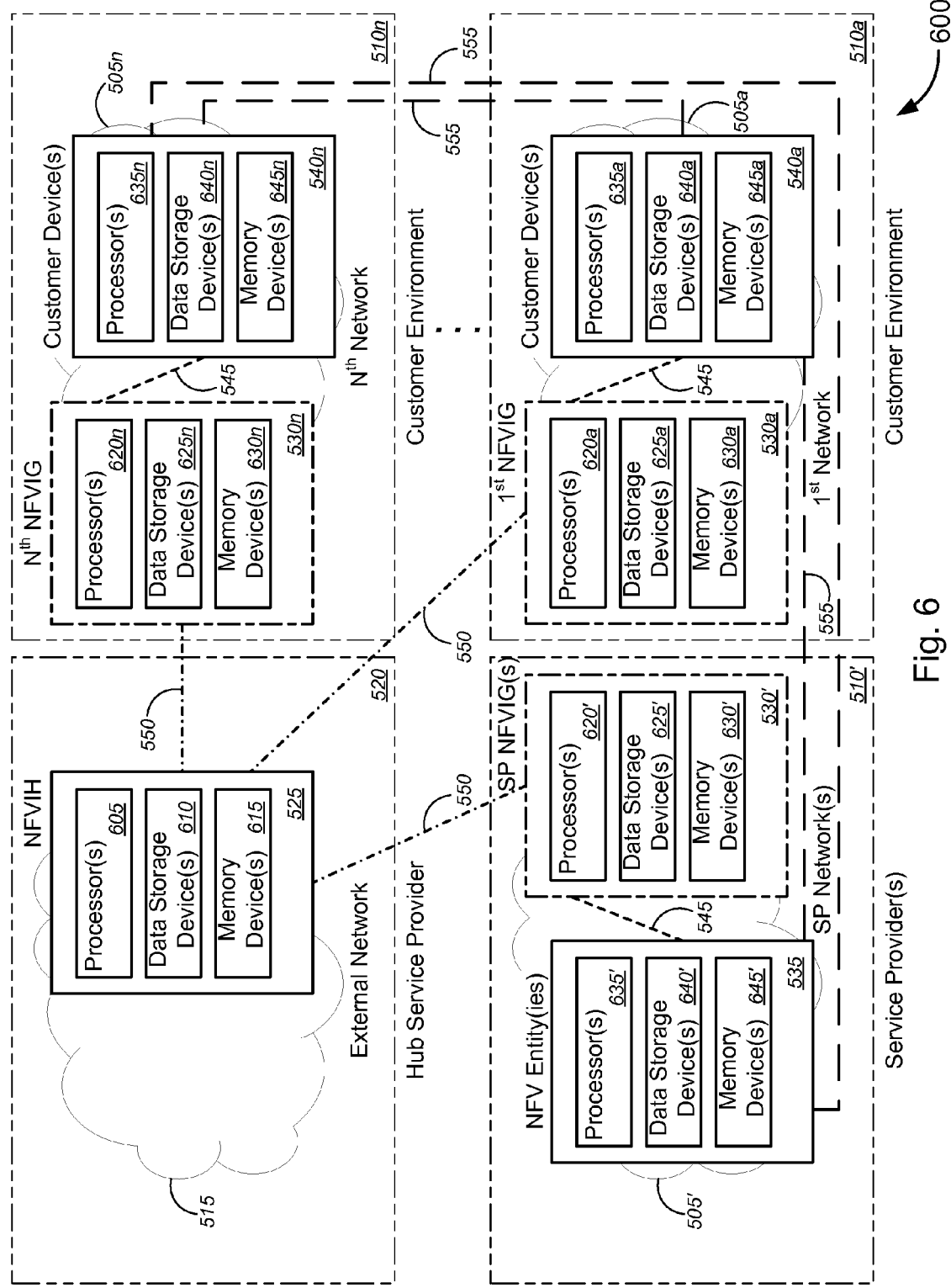
FIG. 6 is a schematic diagram illustrating another system for implementing interconnection hub functionality among one or more sets of service provider NFV entities in one or more service provider networks and a first set of NFV-based customer devices in a first network through an $N^{th}$ set of NFV-based customer devices in an $N^{th}$ network, in accordance with various embodiments.

FIG. 6 is a schematic diagram illustrating another system for implementing interconnection hub functionality among one or more sets of service provider NFV entities in one or more service provider networks and a first set of NFV-based customer devices in a first network through an $N^{th}$ set of NFV-based customer devices in an $N^{th}$ network, in accordance with various embodiments. FIG. 6 is similar to the embodiment of FIG. 5, except that FIG. 6 depicts processors, data storage devices, and memory devices within the NFV interconnection hub device 525, within each of the NFV interconnection gateway devices 530 (including service provider NFVIG(s) 530' associated with the service provider(s) 510' and first through $N^{th}$ NFVIGs 530a-530n associated with customer environments 510a-510n), within each of the NFV entities 535, and within each of the NFV-based customer devices 540. In particular, as shown in FIG. 6, the NFV interconnection hub device 525 might include, without limitation, a processor(s) 605, a data storage device(s) 610, and a memory device(s) 615 that are all interconnected with each other. The data storage device(s) 610 might store data that is transmitted or received from the NFV interconnection hub 525, while the memory device(s) 615 might be a non-transitory computer readable medium that stores computer software comprising a set of instructions that, when executed by the processor(s) 605, causes the interconnection hub device 525 to perform one or more functions (such as those as described herein with respect to FIGS. 5 and 10A-10E, or the like).

The service provider NFV interconnection gateway device 530' might include, without limitation, a processor(s) 620', a data storage device(s) 625', and a memory device(s) 630' that are all interconnected with each other. The first NFV interconnection gateway device 530a might include, without limitation, a processor(s) 620a, a data storage device(s) 625a, and a memory device(s) 630a that are all interconnected with each other. In a similar manner, the $N^{th}$ NFV interconnection gateway device 530n might include, without limitation, a processor(s) 620n, a data storage device(s) 625n, and a memory device(s) 630n that are all interconnected with each other. The data storage device(s) 625 (including data storage device(s) 625' and data storage devices 625a-625n) might store data that is transmitted or received from the NFV interconnection gateway 530 (including service provider NFVIG(s) 530' associated with the service provider(s) 510' and first through $N^{th}$ NFVIGs 530a-530n associated with customer environments 510a-510n), while the memory device(s) 630 (including memory device (s) 630' and memory devices 630a-630n) might be a non-transitory computer readable medium that stores computer software comprising a set of instructions that, when executed by the corresponding processor(s) 620 (including processor(s) 620' and processors 620a-620n), causes the corresponding interconnection gateway device 530 to perform one or more functions (such as those as described herein with respect to FIGS. 1A, 1B, and 9A-9C, or the like).

In a similar manner, each of the NFV entity(ies) 535 might include, but is not limited to, a processor(s) 635', a data storage device(s) 640', and a memory device(s) 645' that are all interconnected with each other. Likewise, each of the NFV-based customer devices 535a might include, but is not limited to, a processor(s) 635a, a data storage device(s) 640a, and a memory device(s) 645a that are all interconnected with each other. In a similar manner, each of the $N^{th}$ NFV-based customer devices 535n might include, but is not limited to, a processor(s) 635*n*, a data storage device(s) 640*n*, and a memory device(s) 645*n* that are all interconnected with each other. The data storage device(s) 640 (including data storage device(s) 640' and data storage devices 640*a*-640*n*) might store data that is transmitted or received from the corresponding NFV entity(ies) 535 or NFV-based customer devices 540*a*-540*n*, while the memory device(s) 645 (including memory device(s) 645' and memory devices 645*a*-645*n*) might each be a non-transitory computer readable medium that stores computer software comprising a set of instructions that, when executed by the corresponding processor(s) 635 (including processor(s) 635' and processors 635*a*-635*n*), causes the particular NFV entity 535 or NFV-based customer device 540 to perform one or more functions (such as those as described herein with respect to FIGS. 1A, 1B, 5, 9A-9C, and 10A-10E, or the like).

The techniques and configurations of FIG. 6 are otherwise similar, if not identical to, the techniques and configurations as described above with respect to FIG. 5, and the descriptions of the embodiment of FIG. 5 may similarly be applicable to those of the embodiment of FIG. 6 (unless incompatible, inconsistent, or otherwise stated as being different).

Figure 7:
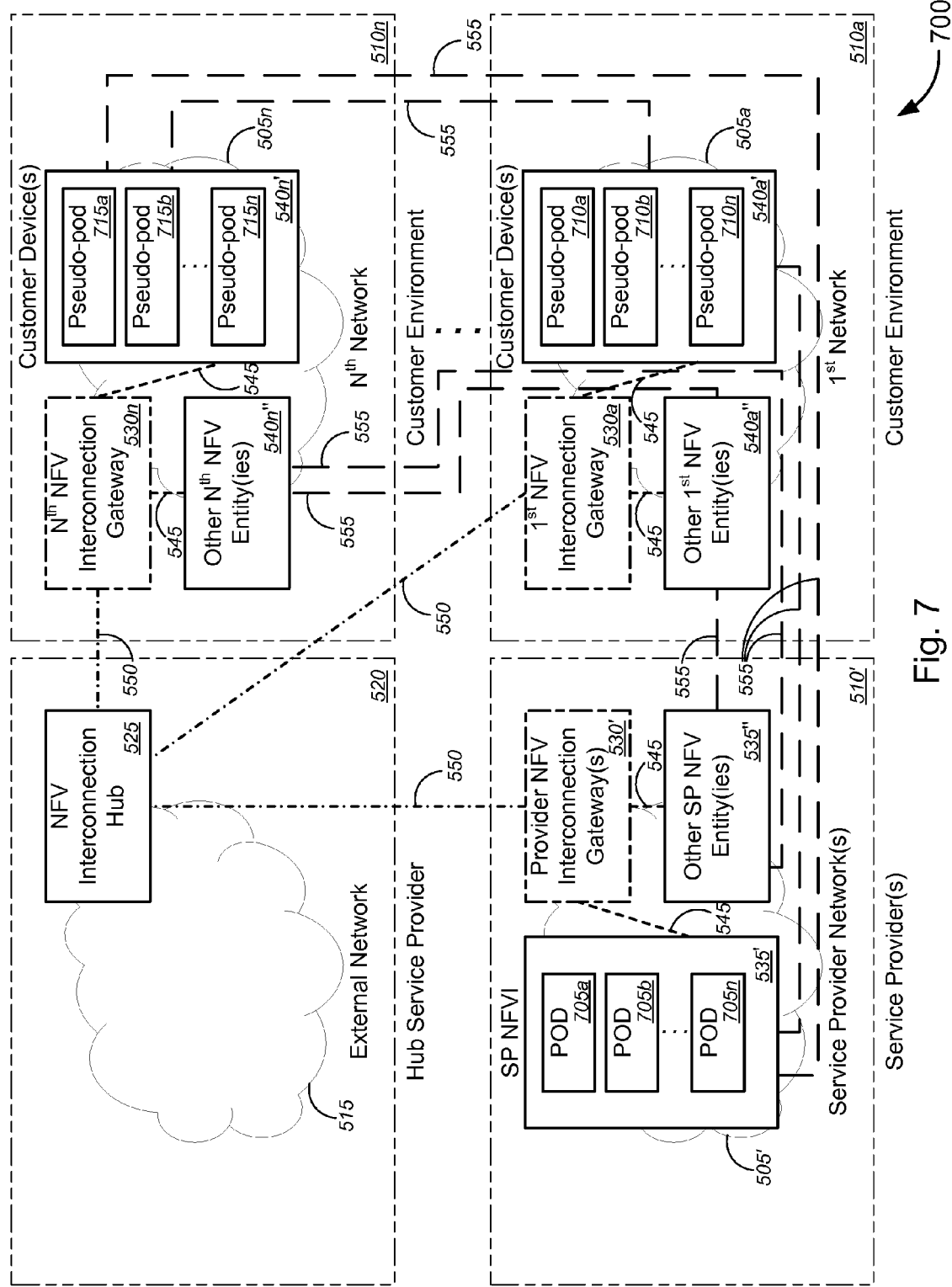
FIG. 7 is a schematic diagram illustrating yet another system for implementing interconnection hub functionality among one or more sets of service provider NFV entities in one or more service provider networks and a first set of NFV-based customer devices in a first network through an $N^{th}$ set of NFV-based customer devices in an $N^{th}$ network, in accordance with various embodiments.

FIG. 7 is a schematic diagram illustrating yet another system for implementing interconnection hub functionality among one or more sets of service provider NFV entities in one or more service provider networks and a first set of NFV-based customer devices in a first network through an $N^{th}$ set of NFV-based customer devices in an $N^{th}$ network, in accordance with various embodiments. FIG. 7 is similar to the embodiment of FIG. 5, except that FIG. 7 depicts a plurality of pods in each of at least one service provider NFV entity 535, a plurality of pseud-pods at least one first NFV-based customer device 540*a* through at least one $N^{th}$ NFV-based customer device 540*n*, and/or the like. In the embodiment of FIG. 7, the at least one service provider NFV entity 535 of FIG. 5 might comprise a service provider NFVI system(s) 535' and one or more other service provider NFV entities 535", while the at least one first NFV-based customer device 540*a* of FIG. 5 might comprise a first NFVI system(s) or other NFV-based customer device infrastructure 540*a*' and one or more other first NFV entities 540*a*", and the at least one $N^{th}$ NFV-based customer device 540*n* of FIG. 5 might comprise an $N^{th}$ NFVI system(s) or other NFV-based customer device infrastructure 540*n*' and one or more other $N^{th}$ NFV entities 540*n*".

The service provider NFVI system 535' might include a first pod 705*a*, a second pod 705*b*, through an $N^{th}$ pod 705*n* (collectively, "pods 705"), while the first NFVI system(s) or other NFV-based customer device infrastructure 540*a*' might include a first pseudo-pod 710*a*, a second pseudo-pod 710*b*, through an $N^{th}$ pseudo-pod 710*n* (collectively, "pseudo-pods 710"), and so on, with the $N^{th}$ NFVI system(s) or other NFV-based customer device infrastructure 540*n*' including a first pseudo-pod 715*a*, a second pseudo-pod 715*b*, through an $N^{th}$ pseudo-pod 715*n* (collectively, "pseudo-pods 715"). In some embodiments, each pod might represent and/or include physical hardware resources that are part of the service provider NFVI system(s) 535' and/or the first through $N^{th}$ NFVI system(s) or other NFV-based customer device infrastructure 540*a*'-540*n*' or that are part of an external NFV entity (i.e., an NFV entity that is external to the service provider NFV entities 535 or the first through $N^{th}$ NFV-based customer devices 540*a*-540*n*, or that is external to the service provider network 505' or first through $N^{th}$ networks 505*a*-505*n*), or the like. In some cases, each pod might represent a rack of network communications equipment (e.g., compute resource, storage resource, etc.) within a telecommunications facility associated with one of the service providers 510' or one of the customer environments 510*a*-510*n*.

In operation, the NFV interconnection hub device 525 might burst at least one VNF from a first pod to a second pod, based at least in part on one or more of time of day, geographic usage throughout a day, one or more performance characteristics (including, without limitation, latency, jitter, bandwidth, compute resource usage, storage resource usage, memory resource usage, and/or the like), or changes in one or more performance characteristics, and/or the like. In some embodiments, the first and second pods might be within only one of the service provider NFVI system 535', the first NFVI system(s) or other NFV-based customer device infrastructure 540*a*', or the $N^{th}$ NFVI system(s) or other NFV-based customer device infrastructure 540*n*', to provide the respective service provider(s) 510' or customer environment 510*a*-510*n*, with functionality (via the NFV interconnection hub device 525) to burst the at least one VNF internally among its own physical hardware resources, especially if said service provider or customer environment does not have a corresponding NFV interconnection gateway 530 in its network 505. In alternative embodiments, the interconnection hub device 525 might burst the at least one VNF from any of the pods 705*a*-705*n*, pseudo-pods 710*a*-710*n*, and pseudo-pods 715*a*-715*n* to any other of the pods/pseudo-pods 705*a*-705*n*, 710*a*-710*n*, and 715*a*-715*n*. Bursting to a pod in a different network 505 (e.g., any of networks 505' and 505*a*-505*n*) might allow for more localized execution of VNFs closer to a customer (in various embodiments, within the customer environment 510*a*-510*n* itself).

Although each of the service provider NFVI system 535' and the first through $N^{th}$ NFVI system(s) or other NFV-based customer device infrastructure 540*a*'-540*n*' is depicted as a single component in the corresponding network 505, this is merely to simplify illustration, but the various embodiments are not so limited, and each NFVI system 535' or NFVI system/other NFV-based customer device infrastructure 540*a*'-540*n*' may be embodied as any suitable number of NFVI systems or other NFV-based customer device infrastructure within its respective network 505. In some embodiments, each of the NFVI systems 535' might include, without limitation, hardware resources located at a customer premises (e.g., hardware resources in network equipment at a residential customer premises; hardware resources in other wireless or wireline customer premises equipment ("CPE"); resources in a customer's mobile devices or other user devices; hardware resources in telecommunications closet(s) or room(s) at a multi-dwelling unit; hardware resources in telecommunications closet(s) or room(s) at a commercial customer premises; and/or the like), at a digital subscriber line access multiplexer ("DSLAM") (e.g., hardware resources in telecommunications or equipment rack(s) at the DSLAM; and/or the like), at a central office ("CO") (e.g., hardware resources in telecommunications rack(s) at the CO; and/or the like), at a point of presence ("POP") with the network, at a Tera-POP (i.e., a POP that is capable of terabit per second (i.e., at least 1 trillion bits per second) data transfer speeds), or the like.

In a non-limiting example, based on information regarding usage at different times of day, geographic usage throughout a day, one or more performance characteristics (including, without limitation, latency, jitter, bandwidth, compute resource usage, storage resource usage, memory resource usage, and/or the like), or changes in one or more performance characteristics, and/or the like, the interconnection hub device 525 might burst VNFs associated with a user's business or work to pods/pseudo-pods within the user's work premises or at a DSLAM or CO that is local to the user's work premises, just before the user typically arrives at work (e.g., between about 6 a.m. and 8 a.m. on weekday mornings). During the user's typical lunch break, the interconnection hub device 525 might burst VNFs associated with the user's media content (e.g., media content playback VNFs, etc.), news resources (e.g., news gathering VNFs, sports information gathering VNFs, etc.), and/or the like to pods/pseudo-pods within the user's work premises (if the user typically eats at work), to a DSLAM or CO that is local to the user's work premises (if the user typically eats at or near work), or the like. After the user's typical lunch hour, the interconnection hub device 525 might burst VNFs associated with the user's media content, news resources, and/or the like to pods at the CO, POP, Tera-POP, or the like. When the user typical leaves work (e.g., for home; such as after 6 p.m.), the interconnection hub device 525 might burst the VNFs associated with the user's media content, news resources, and/or the like to pods/pseudo-pods at the user's residential premises, at a DSLAM or CO near the user's residential premises, and/or the like, and might burst the VNFs associated with the user's business or work to pods at the CO, POP, Tera-POP, or the like. In the middle of the night (e.g., between 11 p.m. and 5 a.m.), the interconnection hub device 525 might burst VNFs associated with backup software applications to pods/pseudo-pods that are closer to the user's work premises and/or to the user's residential premises, to back up the user's work and/or personal/entertainment data, or the like. Also in the middle of the night, the interconnection hub device 525 might burst VNFs associated with third party computational cycles to pods/pseudo-pods closer to the user's work premises and/or the user's residential premises, to utilize unused or underutilized compute and/or data storage resources, or the like.

In these various examples, the user's work premises and the user's residential premises (or more precisely, user devices or computing systems at each of these locations) and/or each of the DSLAM, CO, POP, Tera-POP, or the like might be connected or associated with one of the service provider network 505' and/or the first network 505a through the $N^{th}$ network 505n. In alternative embodiments, the user's work premises (or more precisely, user devices or computing systems at the work premises) might be connected or associated with one of the service provider network 505' and/or the first network 505a through the $N^{th}$ network 505n, while the user's residential premises (or more precisely, user devices or computing systems at the residential premises) might be connected or associated with another of the service provider network 505' and/or the first network 505a through the $N^{th}$ network 505n. In some embodiments, one or more of the DSLAM, CO, POP, Tera-POP, or the like might be connected or associated with one of the service provider networks 505'.

The techniques and configurations of FIG. 7 are otherwise similar, if not identical to, the techniques and configurations as described above with respect to FIG. 5, and the descriptions of the embodiment of FIG. 5 may similarly be applicable to those of the embodiment of FIG. 7 (unless incompatible, inconsistent, or otherwise stated as being different).

In the embodiments described above with respect to FIGS. 5-7, one interconnection hub 525 communicates with and establishes links among a plurality of NFV entities 535 or a plurality of NFV-based customer devices 540 (in some cases, via corresponding NFV interconnection gateway devices 530, if any) in a corresponding plurality of networks 505. The various embodiments, however, are not limited to such configuration or interconnection, and two or more interconnection hubs (each individually being in communication with and establishing links among separate pluralities of NFV entities in corresponding plurality of networks) might interconnect in a hub-to-hub manner, in some cases, in a hub-to-hub-to-hub manner, and so on (collectively, "hub-to-hub"), or the like, as described in detail below with respect to FIG. 8.

Figure 8:
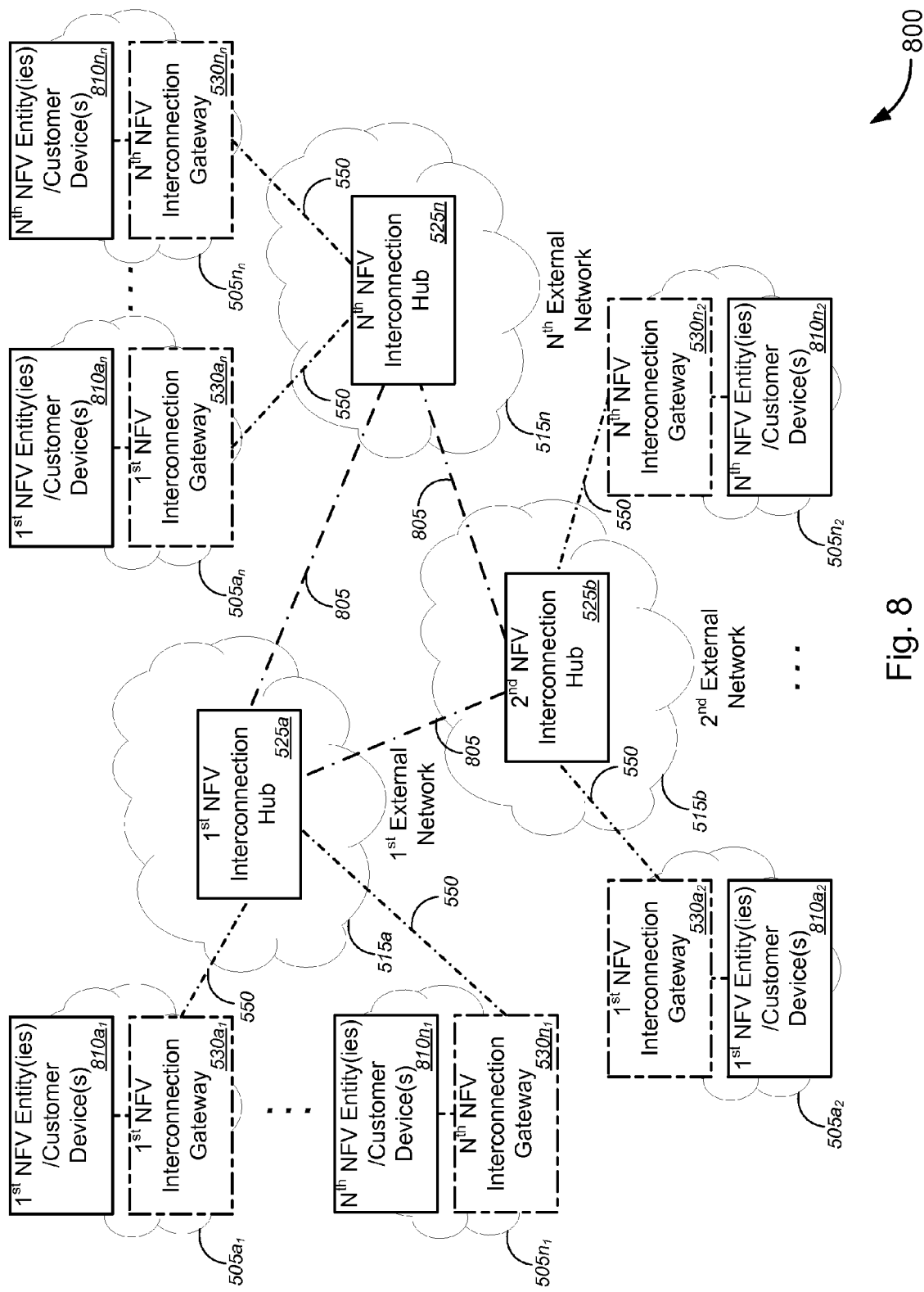
FIG. 8 is a schematic diagram illustrating a system for implementing hub-to-hub interconnection among a first interconnection hub in a first external network, a second interconnection hub in a second external network, through an $N^{th}$ interconnection hub in an $N^{th}$ external network, in accordance with various embodiments.

We now turn to FIG. 8, which is a schematic diagram illustrating a system for implementing hub-to-hub interconnection among a first interconnection hub in a first external network, a second interconnection hub in a second external network, through an $N^{th}$ interconnection hub in an $N^{th}$ external network, in accordance with various embodiments.

As shown in the embodiment of FIG. 8, system 800 might comprise a plurality of NFV interconnection hub devices 525, which might include, without limitation, a first NFV interconnection hub device 525a, a second NFV interconnection hub device 525b, through an $N^{th}$ NFV interconnection hub device 525n (collectively, "NFV interconnection hub devices 525"), which are associated with a first external network 515a, a second external network 515b, through an $N^{th}$ external network 515n, respectively (collectively, "external networks 515"). Each of the NFV interconnection hub devices 525 might communicate with and establish links among a plurality of NFV entities/NFV-based customer devices 810 (in some cases, via corresponding NFV interconnection gateway devices 530, if any) in a corresponding plurality of networks 505, in a manner similar to that as described above with respect to FIGS. 5-7. Particularly, the first NFV interconnection hub device 525a might communicate with and establish links among one or more first through $N^{th}$ NFV entities/NFV-based customer devices $810a_1$-$810n_1$ (in some cases, via corresponding NFV interconnection gateway devices $530a_1$-$530n_1$, if present) in a corresponding plurality of networks $505a_1$-$505n_1$. Similarly, the second NFV interconnection hub device 525b might communicate with and establish links among one or more first through $N^{th}$ NFV entities/NFV-based customer devices $810a_2$-$810n_2$ (in some cases, via corresponding NFV interconnection gateway devices $530a_2$-$530n_2$, if present) in a corresponding plurality of networks $505a_2$-$505n_2$. Likewise, the $N^{th}$ NFV interconnection hub device 525n might communicate with and establish links among one or more first through $N^{th}$ NFV entities/NFV-based customer devices $810a_n$-$810n_n$ (in some cases, via corresponding NFV interconnection gateway devices $530a_n$-$530n_n$, if present) in a corresponding plurality of networks $505a_n$-$505n_n$. Each of the first through $N^{th}$ NFV entities/NFV-based customer devices 810 (including NFV entities/NFV-based customer devices $810a_1$-$810n_1$, $810a_2$-$810n_2$, through $810a_n$-$810n_n$) might correspond to one of NFV entities 535 and/or NFV-based customer devices 540, as described above with respect to FIGS. 5-7.

In operation, each NFV interconnection hub device 525 might communicate with one or more other NFV interconnection hub devices 525a-525n via links 805. In this manner, links 550 might be established by one or more interconnection hub devices 525 among any two or more NFV entities/NFV-based customer devices among the NFV entities/NFV-based customer devices $810a_1$-$810n_1$, $810a_2$-$810n_2$, through $810a_n$-$810n_n$, in some cases via corresponding NFV interconnection gateway devices $530a_1$-$530n_1$, $530a_2$-$530n_2$, through $530a_n$-$530n_n$, if present, and via links 545 and/or 550 and via links 805. In some embodiments, one of the NFV interconnection hub devices 525 might burst at least one VNF from a first pod to a second pod, based at least in part on one or more of time of day, geographic usage throughout a day, one or more performance characteristics (including, without limitation, latency, jitter, bandwidth, compute resource usage, storage resource usage, memory resource usage, and/or the like), or changes in one or more performance characteristics, and/or the like. In some embodiments, the first and second pods might be within one NFVI system among the NFVI systems/other NFV-based customer device infrastructure systems $810a'$-$810n'$ in one of networks $505a_1$-$505n_1$, networks $505a_2$-$505n_2$, or networks $505a_n$-$505n_n$. In alternative embodiments, one of the NFV interconnection hub devices 525 might burst the at least one VNF from any of the pods/pseudo-pods 705a-705n, 710a-710n, and 715a-715n in any one of networks $505a_1$-$505n_1$, networks $505a_2$-$505n_2$, or networks $505a_n$-$505n_n$ to any other of the pods/pseudo-pods 705a-705n, 710a-710n, and 715a-715n in any one of networks $505a_1$-$505n_1$, networks $505a_2$-$505n_2$, or networks $505a_n$-$505n_n$, including bursting between or among pods/pseudo-pods at any level of customer work/residential premises, DSLAM, CO, POP, Tera-POP, etc. at each or any of these networks $505a_1$-$505n_1$, $505a_2$-$505n_2$, and/or $505a_n$-$505n_n$, or the like.

The techniques and configurations of FIG. 8 are otherwise similar, if not identical to, the techniques and configurations as described above with respect to FIGS. 5-7, and the descriptions of the embodiment of FIGS. 5-7 may similarly be applicable to those of the embodiment of FIG. 8 (unless incompatible, inconsistent, or otherwise stated as being different).

Figure 9A:
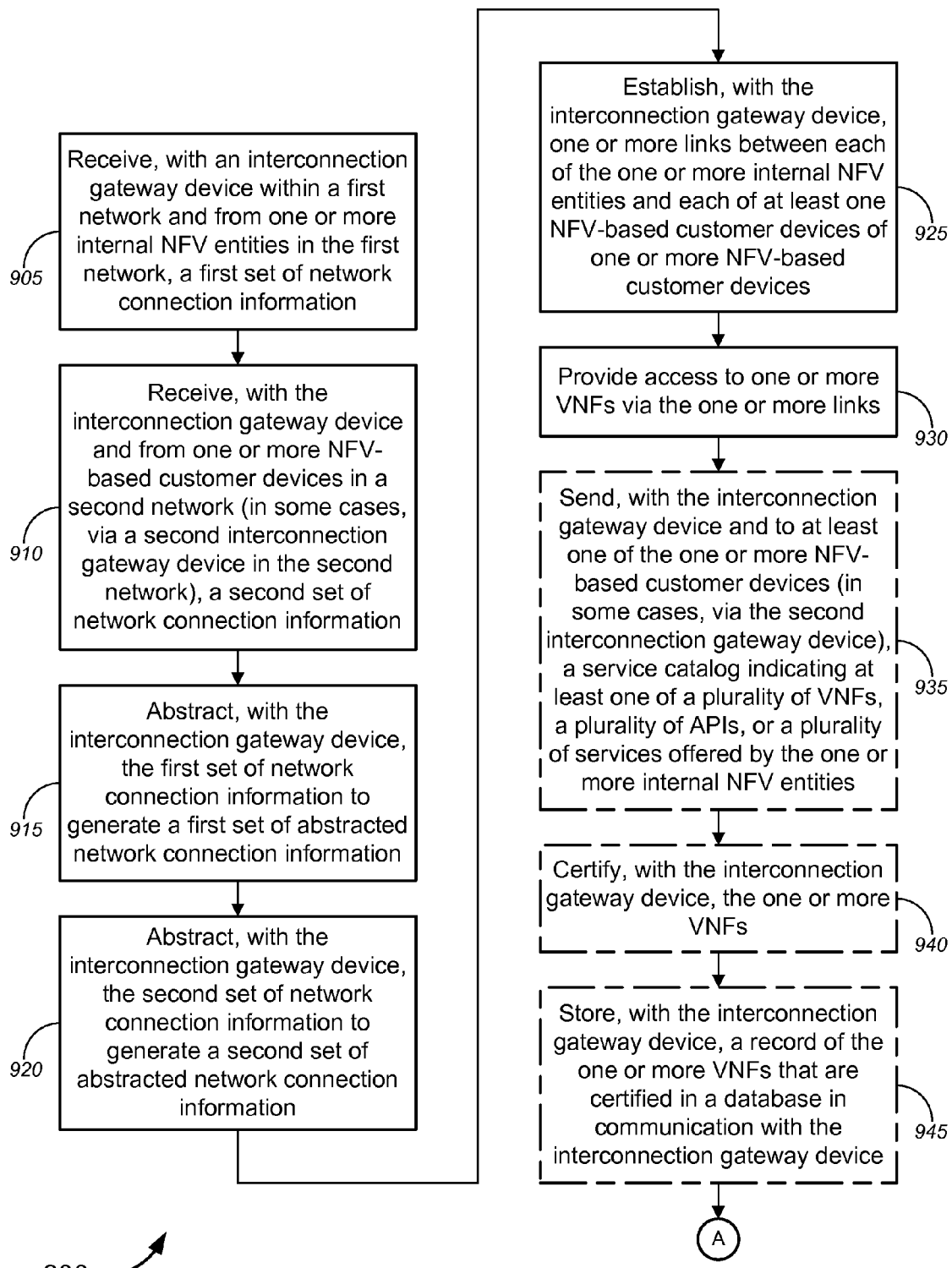
FIGS. 9A-9C are flow diagrams illustrating a method for implementing interconnection gateway functionality between a set of NFV entities in a first network and one or more NFV-based customer devices in a second network, in accordance with various embodiments.
Figure 9B:
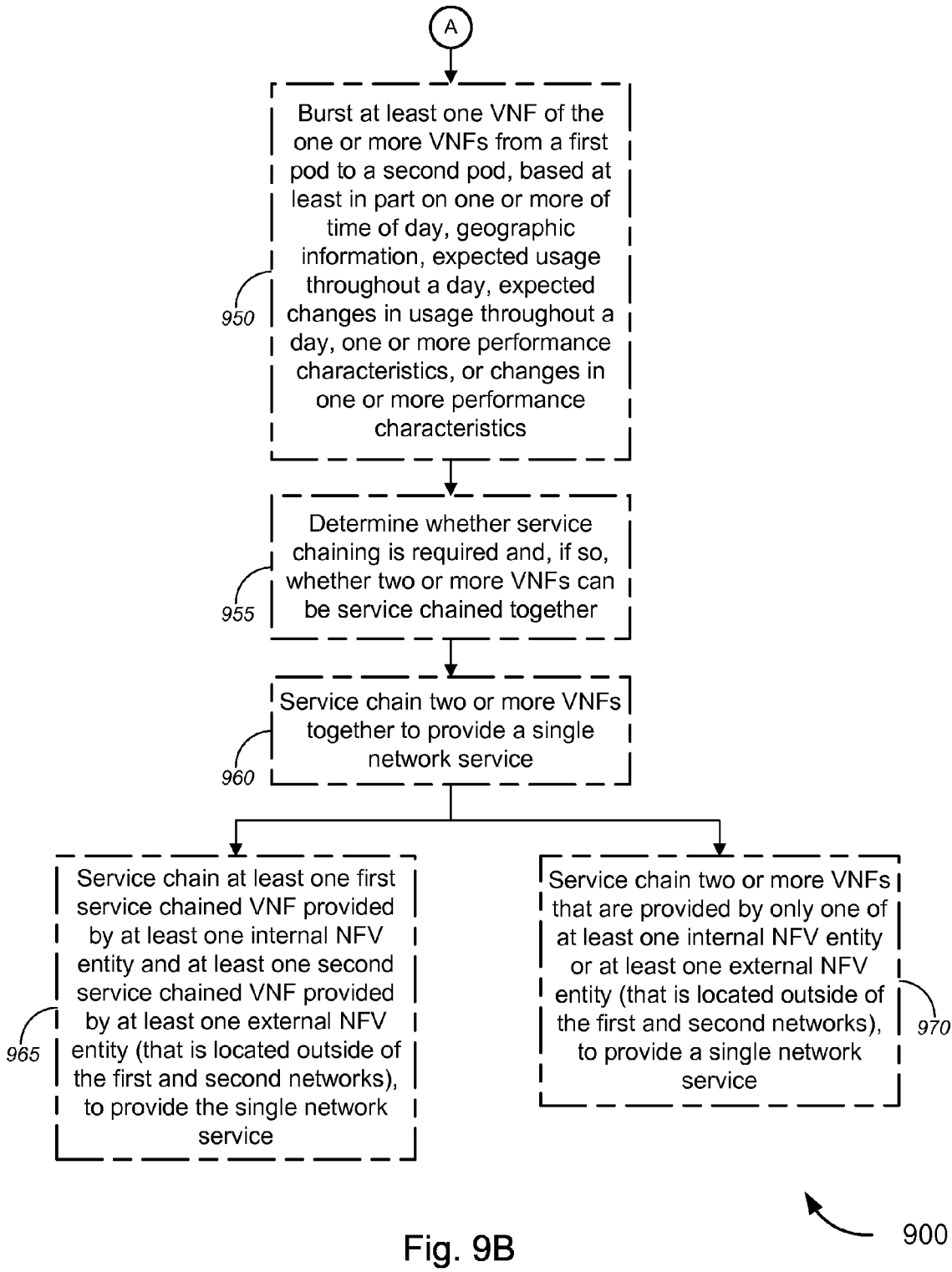
Figure 9C:
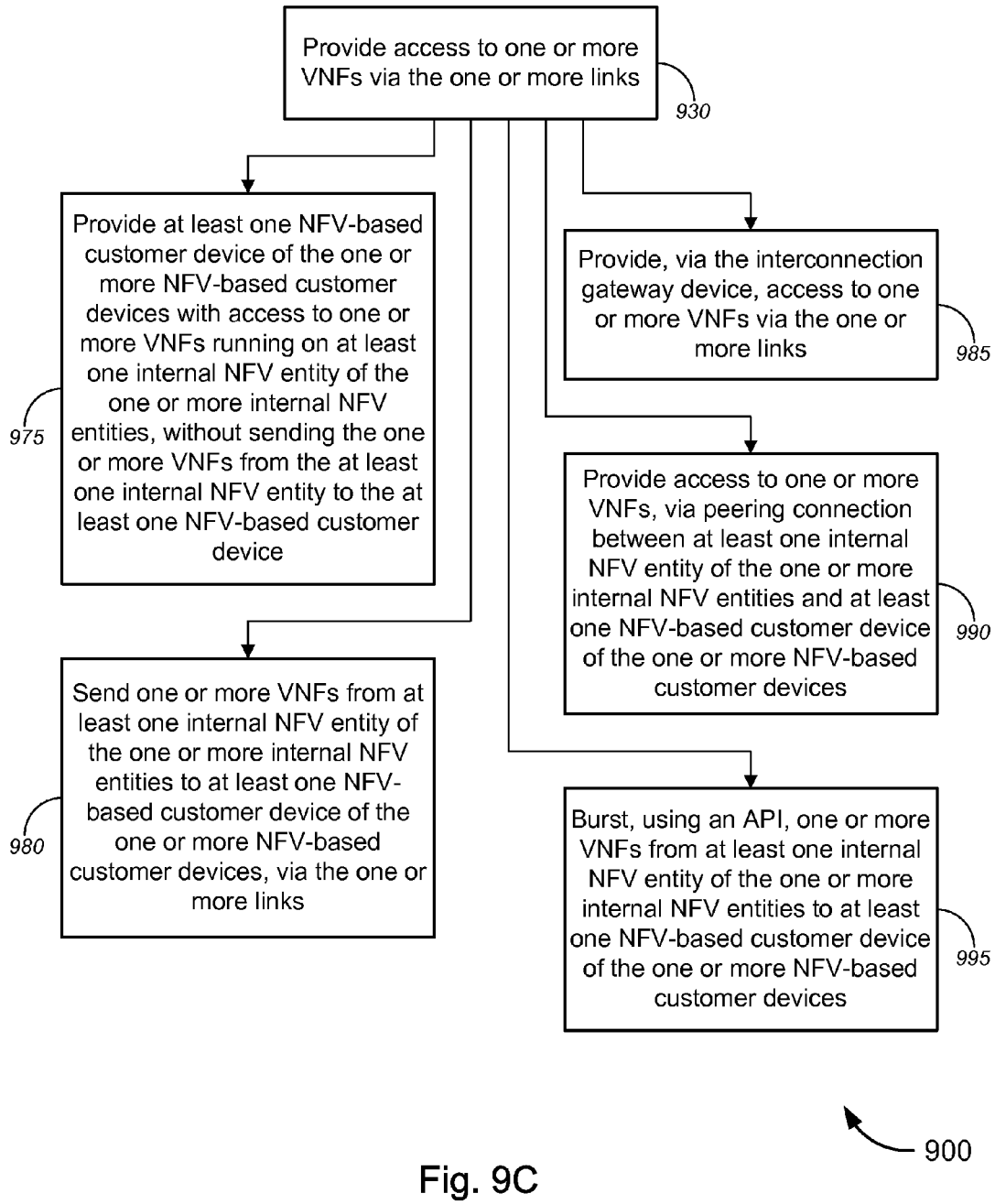

FIGS. 9A-9C (collectively, "FIG. 9") are flow diagrams illustrating a method for implementing interconnection gateway functionality between a set of NFV entities in a first network and one or more NFV-based customer devices in a second network, in accordance with various embodiments. The embodiments as represented in FIG. 9 are merely illustrative and are not intended to limit the scope of the various embodiments. With reference to FIG. 9, method 900 in FIG. 9A continues onto FIG. 9B, linked by circular markers denoted by "A." FIG. 9C illustrates alternative embodiments for providing access to one or more VNFs in block 930 of FIG. 9A.

While the techniques and procedures are depicted and/or described in a certain order for purposes of illustration, it should be appreciated that certain procedures may be reordered and/or omitted within the scope of various embodiments. Moreover, while the method illustrated by FIG. 9 can be implemented by or with (and, in some cases, are described below with respect to) the systems 100-400 of FIGS. 1-4, respectively (or components thereof), such methods may also be implemented using any suitable hardware implementation. Similarly, while each of the systems 100-400 (and/or components thereof) of FIGS. 1-4, respectively, can operate according to the method illustrated by FIG. 9 (e.g., by executing instructions embodied on a computer readable medium), the systems 100-400 can each also operate according to other modes of operation and/or perform other suitable procedures.

In the embodiment of FIG. 9, method 900, at block 905, might comprise receiving, with an interconnection gateway device within a first network and from one or more internal network functions virtualization ("NFV") entities, a first set of network connection information. Each of the one or more internal NFV entities might be located within the first network. At block 910, method 900 might comprise receiving, with the interconnection gateway device and from one or more NFV-based customer devices in a second network (in some cases, via a second interconnection gateway device in the second network), a second set of network connection information. According to some embodiments, the first network might be associated with a service provider, and the second network might be associated with a customer environment separate from the service provider. The customer environment might include, without limitation, at least one of a customer residential premises, a multi-dwelling unit, a short-term lodging facility, a customer commercial premises, a customer business premises, a health-care facility, an industrial manufacturing facility, an industrial processing facility, a warehouse, a vehicle, a public safety answering point ("PSAP") facility, and/or the like, which are described in detail above (along with descriptions of NFV-based customer devices associated with such customer environments) with respect to FIG. 4.

In some cases, the first set of network connection information and/or the second set of network connection information might each comprise information regarding at least one of latency, jitter, bandwidth, packet loss, nodal connectivity, compute resources, storage resources, memory capacity, routing, operations support systems ("OSS"), or business support systems ("BSS"), additional services (e.g., firewall, security, parental control functionality, etc.), and/or the like. In some instances, the first set of network connection information and/or the second set of network connection information might each, alternatively or additionally, comprise information regarding at least one of fault, configuration, accounting, performance, or security ("FCAPS"), which might include, without limitation, fault isolation/zoning/trouble ticketing, service ordering/information organization/information hiding, billing/accounting, QoS/other performance characteristics (jitter, latency, bandwidth, etc.)/performance in view of service level agreements ("SLAs")/reporting, or authentication/authorization/accounting ("AAA"), respectively.

In some embodiments, method 900 might further comprise abstracting, with the interconnection gateway device, the first set of network connection information to generate a first set of abstracted network connection information (block 915) and abstracting, with the interconnection gateway device, the second set of network connection information to generate a second set of abstracted network connection information (block 920). In some cases, each of the first set of abstracted network connection information and the second set of abstracted network connection information might be abstracted to be independent of any particular NFV entity or any particular NFV-based customer device in any network. In other words, the abstracted network connection information is abstracted so as to be readable or understandable by any computing system or network component, and is not information that is only readable or understandable (i.e., does not use proprietary information formats or the like) by particular kinds, by particular brands of NFV entities/NFV-based customer devices, by particular products made by a particular manufacturer, by particular products operated or maintained by a particular service provider, or by particular products operated or maintained at a particular customer environment, or the like. In this manner, universal communication and/or interconnection may be achieved between different NFV entities (i.e., NFV entities manufactured, operated, and/or maintained by particular parties, or the like) and/or NFV-based customer devices (i.e., NFV-based customer devices manufactured, operated, and/or maintained by particular parties, or the like).

At block 925, method 900 might comprise establishing, with the interconnection gateway device, one or more links between each of the one or more internal NFV entities and each of at least one NFV-based customer device of the one or more NFV-based customer devices, in some cases, based at least in part on one or more of the first set of abstracted network connection information or the second set of abstracted network connection information. Method 900 might further comprise, at block 930, providing access to one or more virtualized network functions ("VNFs") via the one or more links, different embodiments of which are described below with respect to FIG. 9C.

Merely by way of example, in some aspects, method 900 might further comprise, at optional block 935, sending, with the interconnection gateway device and to at least one of the one or more NFV-based customer devices (in some cases, via the second interconnection gateway device), a service catalog indicating at least one of a plurality of VNFs, a plurality of application programming interfaces ("APIs"), or a plurality of services offered by the one or more internal NFV entities. In some embodiments, the service catalog may be stored or may reside in one or more of data storage device 210 or 230 and/or a separate database that is located in the local network (not shown) that are associated with the owning service provider (i.e., the service provider owning, managing, or controlling the VNF(s)). In some cases, the data storage device 210 or 230 associated with the service provider that is associated with the internal NFV entities might store the service catalog. In some instances, the service catalog might be stored or may reside in data storage device 230 associated with the NFV resource manager 120 or the like. In some cases, the first set of abstracted network connection information might include fine-grained information that is hidden from the one or more NFV-based customer devices, while the second set of abstracted network connection information include coarse-grained information that is public information (or that may be made public). The method 900 might further comprise certifying, with the interconnection gateway device, the one or more VNFs (optional block 940) and storing, with the interconnection gateway device, a record of the one or more VNFs that are certified in a database in communication with the interconnection gateway device (optional block 945). In some embodiments, certifying VNFs might include determining whether a particular VNF is actually a VNF that performs functions as ordered by a customer or as required by a service provider. In some instances, certifying VNFs might include determining whether a particular VNF is a rogue VNF (e.g., a surveillance VNF, spybot VNF, etc.) or an application or other virtual function that is disguised as the desired VNF; such certification processes might be part of security audits, which might be performed routinely or periodically. In some cases, certifying VNFs might include determining whether a legitimate VNF is the correct VNF for performing a desired function. In the event that the VNF being certified is not the desired or correct VNF for performing the desired function(s), the interconnection gateway device might request, locate, access, move, or provide access to another VNF, and might perform the certification process to determine whether the another VNF is the desired and correct VNF, prior to storing the VNF (at optional block 945). The process subsequently continues to optional block 950 in FIG. 9B, linked by circular marker denoted by "A."

At optional block 950, method 900 might comprise bursting at least one VNF of the one or more VNFs from a first pod to a second pod, based at least in part on one or more of time of day, geographic information, expected usage throughout a day, expected changes in usage throughout a day, one or more performance characteristics, changes in one or more performance characteristics, and/or the like. In some instances, each of the first pod and the second pod might comprise physical hardware resources that are part of one or more of at least one internal NFV entity of the one or more internal NFV entities or at least one external NFV entity of one or more external NFV entities that are located in an external network that is separate from the first or second networks. In some cases, each of the first pod and the second pod might comprise physical hardware resources that are only part of the at least one internal NFV entity of the one or more internal NFV entities (i.e., the NFV entities associated with the service provider that is providing the service; such as the first NFVI) or only part of the at least one external NFV entity of one or more external NFV entities. This allows the service provider to shift resources based on demand, time of day, expected usage, etc.

In some embodiments, method 900 might further comprise, at optional block 955, determining whether service chaining is required (e.g., if only one VNF is required, no service chaining is necessary) and, if so, determining whether it is possible to service chain two or more VNFs together to provide a single network service—including, without limitation, identifying and locating each individual VNF to provide sub-functionalities of the desired network service, managing the VNFs so that they can be service chained together, and/or the like. Based on a determination that service chaining is required and that two or more VNFs can be service chained together to provide a single network service, the method, at optional block 960, might comprise service chaining two or more VNFs together to provide a single network service, either by service chaining at least one first service chained VNF provided by at least one internal NFV entity and at least one second service chained VNF provided by at least one external NFV entity (that is located outside of the first and second networks), to provide the single network service (optional block 965) or by service chaining two or more VNFs that are provided by only one of at least one internal NFV entity or at least one external NFV entity (that is located outside of the first and second networks), to provide the single network service (optional block 970). In one non-limiting example, four or five VNFs (regardless of which NFV entity each VNF is provided from) might be service chained together to perform the functions of a network router. In similar fashion, any number of VNFs (from any combination of NFV entities) may be service chained to perform any desired or ordered function. Service chaining and the processes outlined above related to service chaining may, in some cases, be performed by a NFV interconnection gateway or the like.

With reference to FIG. 9C, the process of providing access to the one or more VNFs (at block 930) might include one or more of the following. In some embodiments, providing access to the one or more VNFs might comprise providing at least one NFV-based customer device of the one or more NFV-based customer devices with access to one or more VNFs running on at least one internal NFV entity of the one or more internal NFV entities (and/or on at least one external NFV entity that is located outside of the first and second networks), without sending the one or more VNFs from the at least one internal NFV entity (and/or from the at least one external NFV entity that is located outside of the first and second networks) to the at least one NFV-based customer device (block 975). Alternatively, providing access to the one or more VNFs might comprise sending one or more VNFs from at least one internal NFV entity of the one or more internal NFV entities (and/or from at least one external NFV entity that is located outside of the first and second networks) to at least one NFV-based customer device of the one or more NFV-based customer devices, via the one or more links (block 980). In some cases, providing access to the one or more VNFs might comprise providing, via the interconnection gateway device, access to one or more VNFs via the one or more links (block 985). In some instances, providing access to the one or more VNFs might comprise providing access to one or more VNFs, via peering connection between at least one internal NFV entity of the one or more internal NFV entities (and/or at least one external NFV entity that is located outside of the first and second networks) and at least one NFV-based customer device of one or more NFV-based customer devices (block 990). Alternatively or additionally, providing access to the one or more VNFs might comprise bursting, using an API, one or more VNFs from at least one internal NFV entity of the one or more internal NFV entities (and/or from at least one external NFV entity that is located outside of the first and second networks) to at least one NFV-based customer device of the one or more NFV-based customer devices (block 995).

Figure 10A:
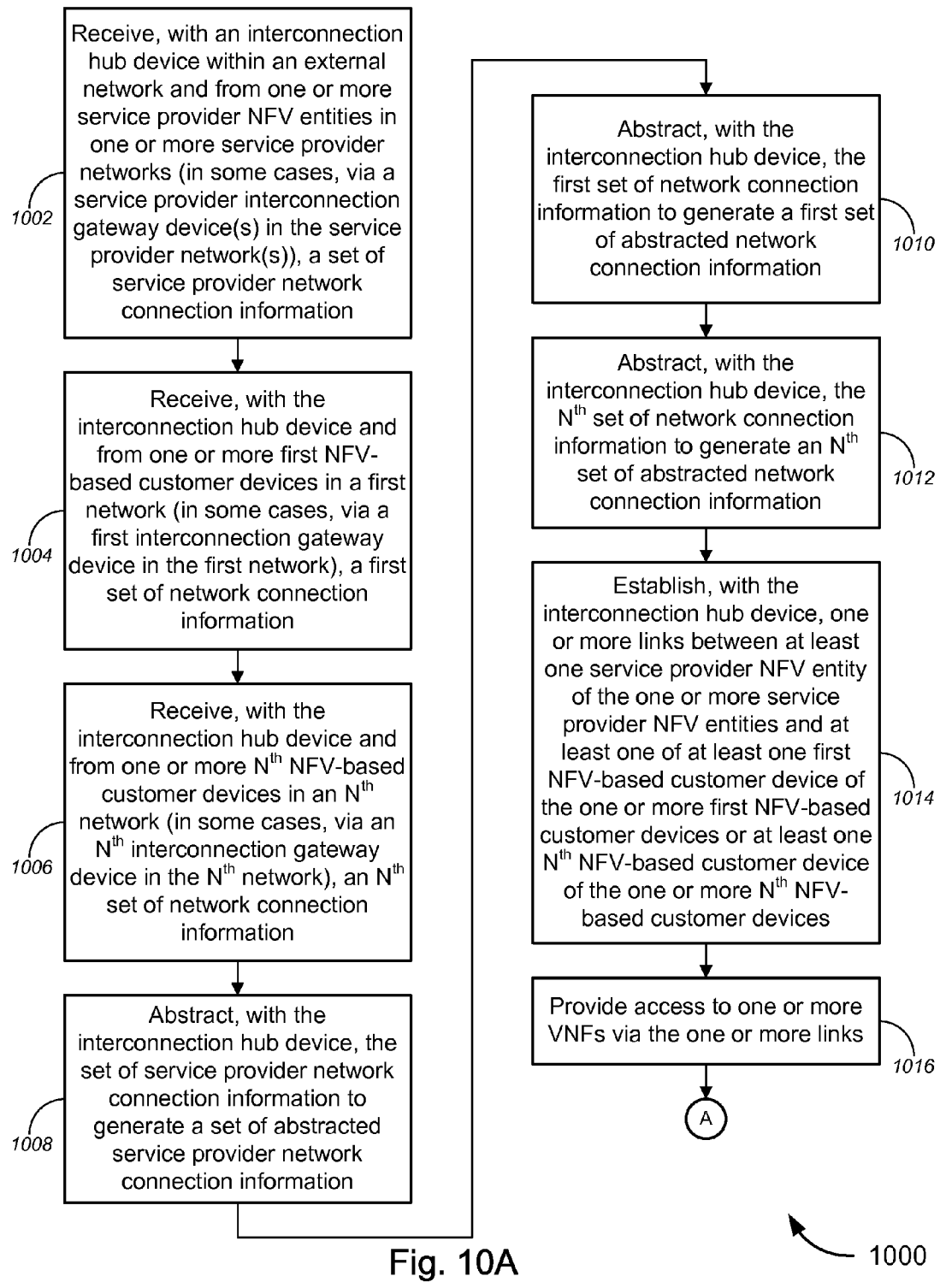
FIGS. 10A-10E are flow diagrams illustrating a method for implementing interconnection hub functionality among one or more service provider NFV entities in one or more service provider networks and a first set of NFV-based customer devices in a first network through an $N^{th}$ set of NFV-based customer devices in an $N^{th}$ network or for implementing hub-to-hub interconnection among a first interconnection hub in a first external network, a second interconnection hub in a second external network, through an $N^{th}$ interconnection hub in an $N^{th}$ external network, in accordance with various embodiments.
Figure 10B:
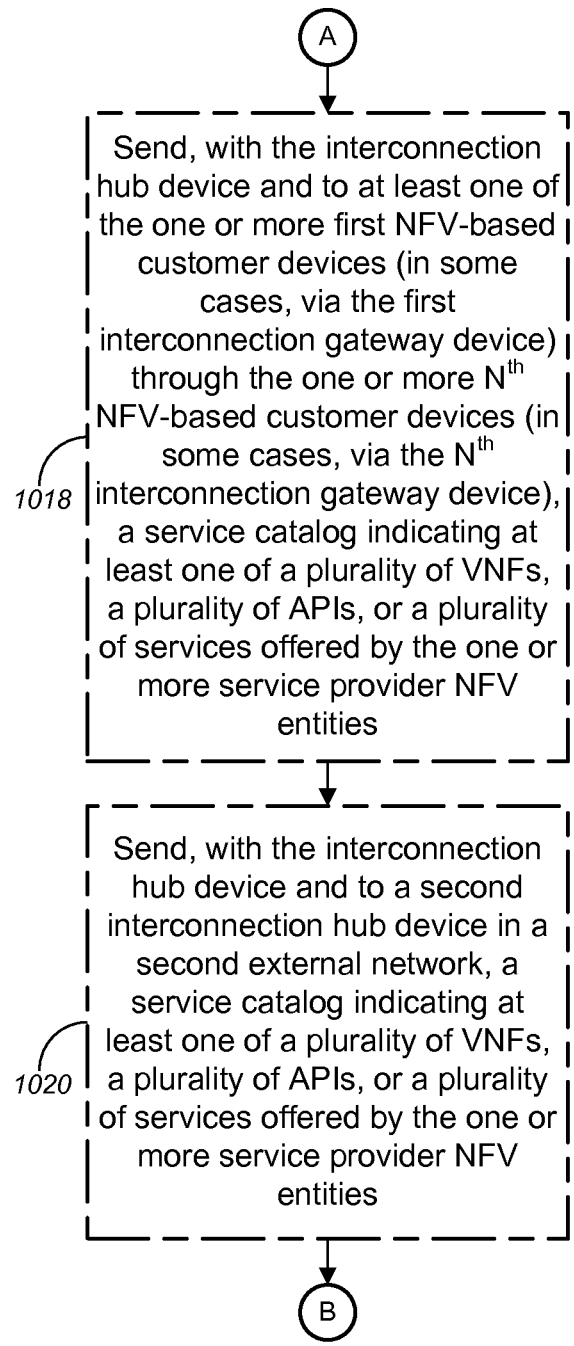
Figure 10C:
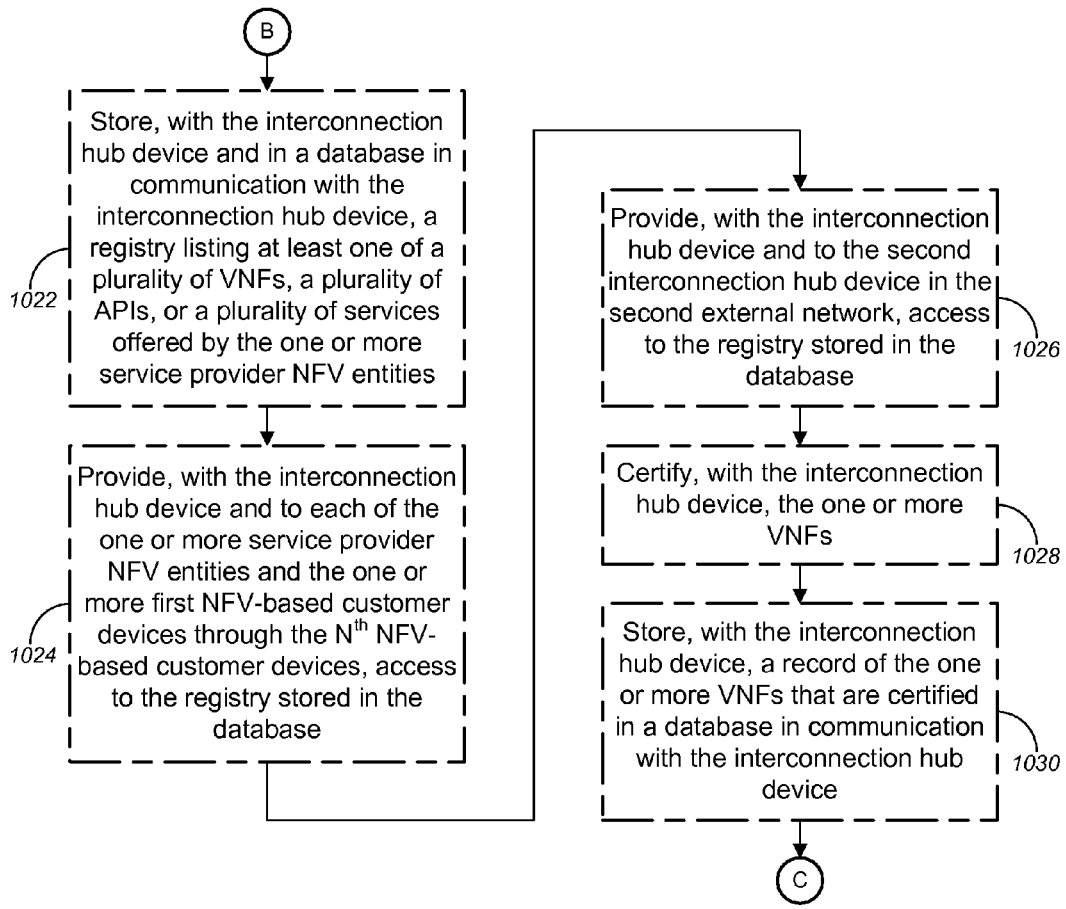
Figure 10D:
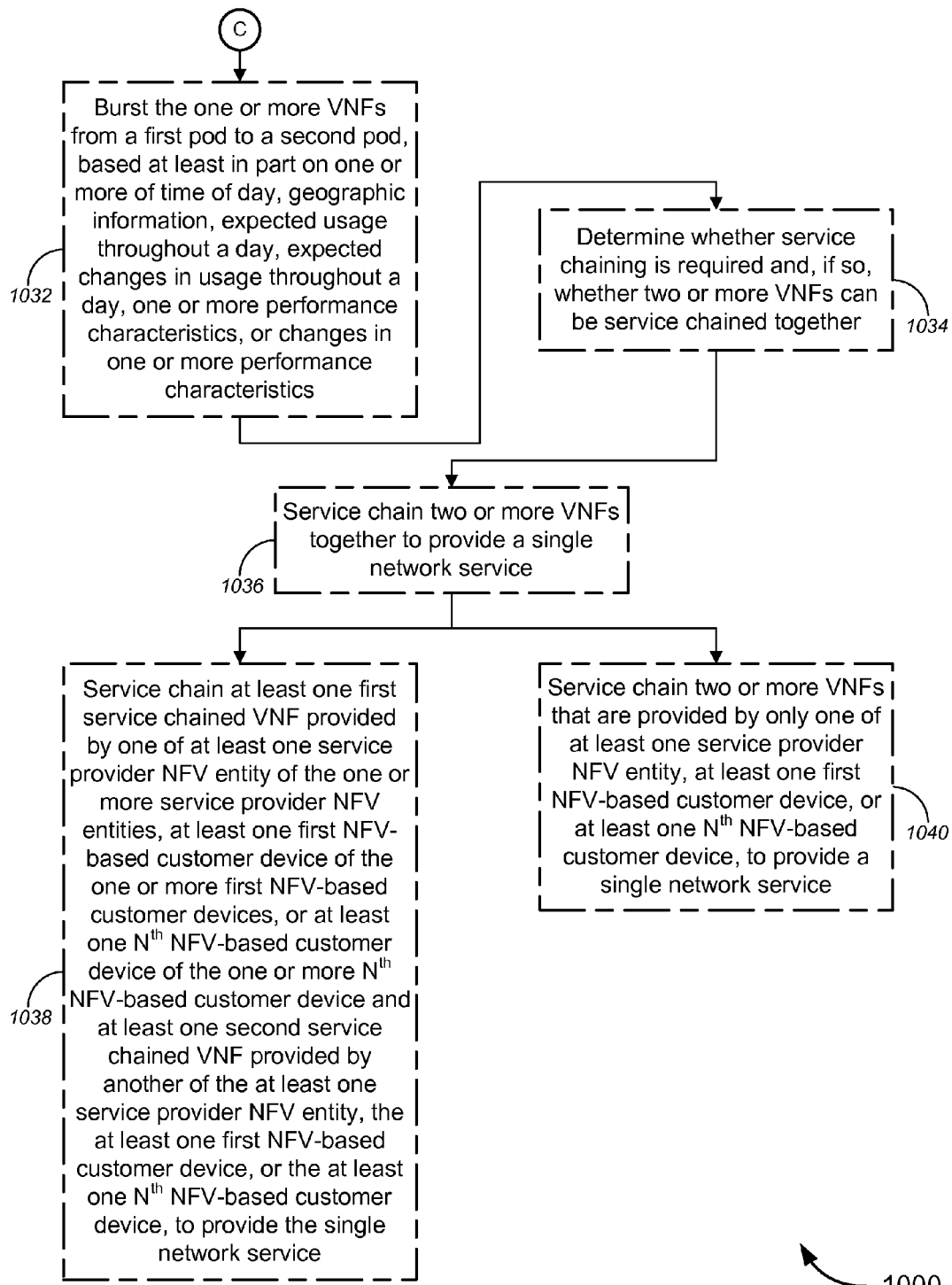
Figure 10E:
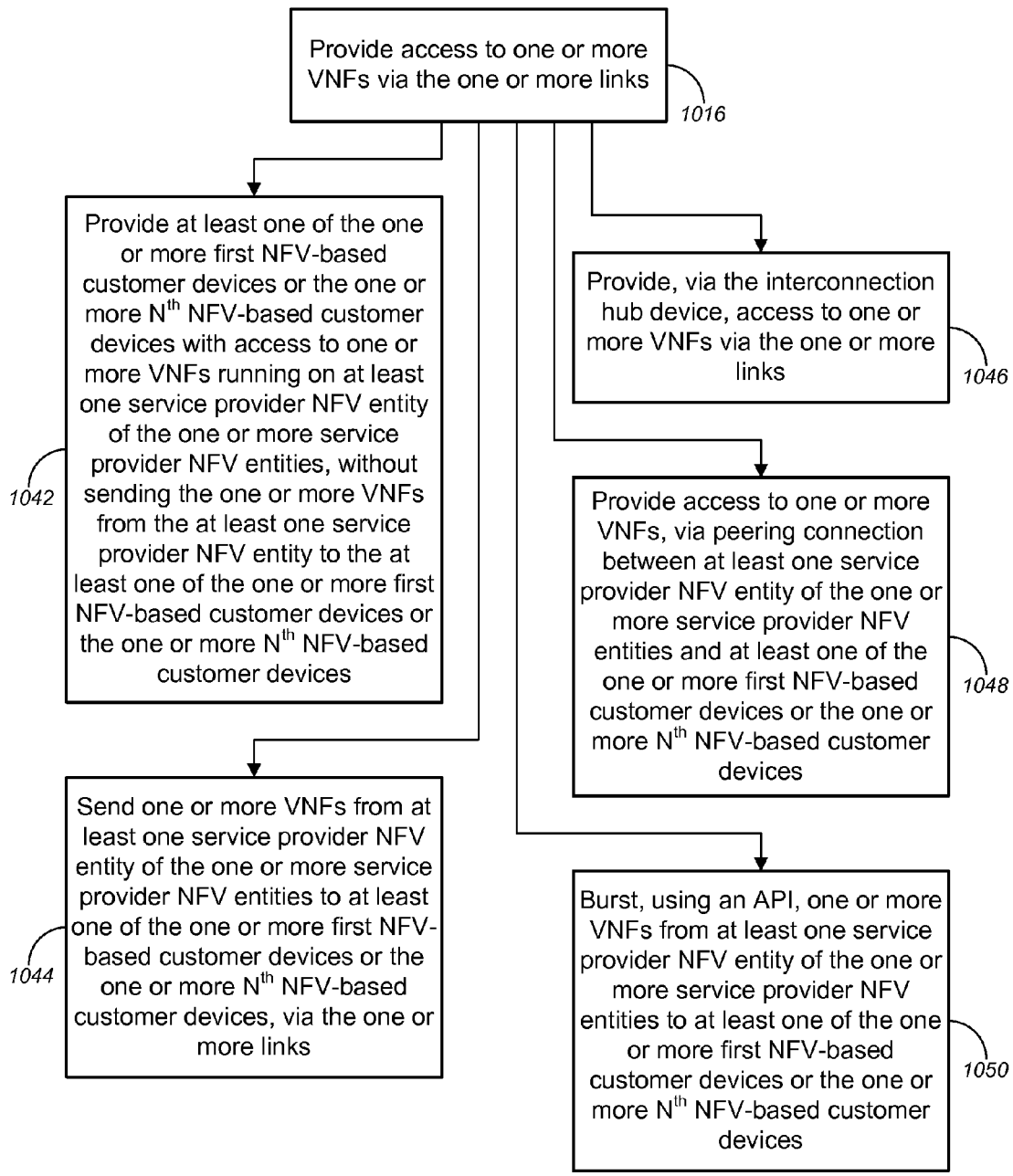

FIGS. 10A-10E (collectively, "FIG. 10") are flow diagrams illustrating a method for implementing interconnection hub functionality among one or more service provider NFV entities in one or more service provider networks and a first set of NFV-based customer devices in a first network through an $N^{th}$ set of NFV-based customer devices in an $N^{th}$ network or for implementing hub-to-hub interconnection among a first interconnection hub in a first external network, a second interconnection hub in a second external network, through an $N^{th}$ interconnection hub in an $N^{th}$ external network, in accordance with various embodiments. The embodiments as represented in FIG. 10 are merely illustrative and are not intended to limit the scope of the various embodiments. With reference to FIG. 10, method 1000 in FIG. 10A continues onto FIG. 10B, linked by circular markers denoted by "A," continues from FIG. 10B to FIG. 10C, linked by circular marker denoted by "B," and continues from FIG. 10C to FIG. 10D, linked by circular marker denoted by "C." FIG. 10E illustrates alternative embodiments for providing access to one or more VNFs in block 1016 of FIG. 10A.

While the techniques and procedures are depicted and/or described in a certain order for purposes of illustration, it should be appreciated that certain procedures may be reordered and/or omitted within the scope of various embodiments. Moreover, while the method illustrated by FIG. 10 can be implemented by or with (and, in some cases, are described below with respect to) the systems 500-800 of FIGS. 5-8, respectively (or components thereof), such methods may also be implemented using any suitable hardware implementation. Similarly, while each of the systems 500-800 (and/or components thereof) of FIGS. 5-8, respectively, can operate according to the method illustrated by FIG. 10 (e.g., by executing instructions embodied on a computer readable medium), the systems 500-800 can each also operate according to other modes of operation and/or perform other suitable procedures.

In the embodiment of FIG. 10, method 1000, at block 1002, might comprise receiving, with an interconnection hub device within an external network and from one or more service provider network functions virtualization ("NFV") entities in a service provider network (in some cases, via a service provider interconnection gateway device in the service provider network), a set of service provider network connection information. At block 1004, method 1000 might comprise receiving, with the interconnection hub device and from one or more first NFV-based customer devices in a first network (in some cases, via a first interconnection gateway device in the first network), a first set of network connection information. Method 1000 might further comprise, at block 1006, receiving, with the interconnection hub device and from one or more $N^{th}$ NFV-based customer devices in an $N^{th}$ network (in some cases, via an $N^{th}$ interconnection gateway device in the $N^{th}$ network), an $N^{th}$ set of network connection information. Each of the service provider network, first through $N^{th}$ networks, and the external network might be separate from others of the service provider network, first through $N^{th}$ networks, and the external network. According to some embodiments, the service provider network might be associated with a service provider, each of the first through $N^{th}$ networks might be associated with corresponding first through $N^{th}$ customer environments (such as customer environments 110b, 405, 415, 425, 435, 445, 455, and/or the like) that are separate from each other, and the external network might be associated with a hub service provider separate from each of the service provider and each of the first through $N^{th}$ customer environments.

In some cases, the set of service provider network connection information might comprise information regarding at least one of latency, jitter, bandwidth, packet loss, nodal connectivity, compute resources, storage resources, memory capacity, routing, operations support systems ("OSS"), or business support systems ("BSS"), additional services (e.g., firewall, security, parental control functionality, etc.), and/or the like. Similarly, the first through $N^{th}$ sets of network connection information might each comprise information regarding at least one of latency, jitter, bandwidth, packet loss, nodal connectivity, compute resources, storage resources, memory capacity, routing, OSS, or BSS, additional services (e.g., firewall, security, parental control functionality, etc.), and/or the like. In some instances, the set of service provider network connection information and/or the first through $N^{th}$ sets of network connection information might each, alternatively or additionally, comprise information regarding at least one of fault, configuration, accounting, performance, or security ("FCAPS"), which might include, without limitation, fault isolation/zoning/trouble ticketing, service ordering/information organization/information hiding, billing/accounting, QoS/other performance characteristics (jitter, latency, bandwidth, etc.)/performance in view of service level agreements ("SLAs")/reporting, or authentication/authorization/accounting ("AAA"), respectively.

In some embodiments, method 1000 might further comprise abstracting, with the interconnection hub device, the set of service provider network connection information to generate a set of abstracted service provider network connection information (block 1008), abstracting, with the interconnection hub device, the first set of network connection information to generate a first set of abstracted network connection information (block 1010), and abstracting, with the interconnection hub device, the $N^{th}$ set of network connection information to generate an $N^{th}$ set of abstracted network connection information (block 1012). In some cases, each of the set of abstracted service provider network connection information and the first through $N^{th}$ sets of abstracted network connection information might be abstracted to be independent of any particular NFV entity or any particular NFV-based customer device in any network. In other words, the abstracted network connection information is abstracted so as to be readable or understandable by any computing system or network component, and is not information that is only readable or understandable (i.e., does not use proprietary information formats or the like) by particular kinds, by particular brands of NFV entities/NFV-based customer devices, by particular products made by a particular manufacturer, by particular products operated or maintained by a particular service provider, or by particular products operated or maintained at a particular customer environment, or the like. In this manner, universal communication and/or interconnection may be achieved between different NFV entities (i.e., NFV entities manufactured, operated, and/or maintained by particular parties, or the like) and/or NFV-based customer devices (i.e., NFV-based customer devices manufactured, operated, and/or maintained by particular parties, or the like).

At block 1014, method 1000 might comprise establishing, with the interconnection hub device, one or more links between or among at least one service provider NFV entity of the one or more service provider NFV entities and one or more of at least one first NFV entity of the one or more first NFV-based customer devices through at least one $N^{th}$ NFV entity of the one or more $N^{th}$ NFV-based customer devices, based at least in part on one or more of the set of abstracted service provider network connection information and/or one or more of the first through $N^{th}$ sets of abstracted network connection information. Method 1000 might further comprise, at block 1016, providing access to one or more virtualized network functions ("VNFs") via the one or more links, different embodiments of which are described below with respect to FIG. 10E.

In some cases, the one or more links might be established between at least one of the service provider or at least one of the first through $N^{th}$ customer environment and corresponding at least one other of the service provider or at least one of the first through $N^{th}$ customer environment, via the interconnection hub device. The process subsequently continues to optional block 1018 in FIG. 10B, linked by circular marker denoted by "A."

At optional block 1018, in some aspects, method 1000 might further comprise sending, with the interconnection hub device and to at least one of the one or more first NFV-based customer devices (in some cases, via the first interconnection gateway device) through the one or more $N^{th}$ NFV-based customer devices (in some cases, via the $N^{th}$ interconnection gateway device), a service catalog indicating at least one of a plurality of VNFs, a plurality of application programming interfaces ("APIs"), or a plurality of services offered by the one or more service provider NFV entities. In some embodiments, one or more service catalogs might indicate at least one of a plurality of VNFs, a plurality of APIs, or a plurality of services offered by each of the first through $N^{th}$ NFV-based customer devices, and such one or more service catalogs might be sent by the interconnection hub device to at least one of the service provider NFV entities and/or to at least one other of the first through $N^{th}$ NFV-based customer devices.

Method 1000, at optional block 1020, might sending, with the interconnection hub device and to a second interconnection hub device in a second external network, a service catalog indicating at least one of the plurality of VNFs, the plurality of APIs, or the plurality of services offered by the one or more service provider NFV entities. According to some embodiments, the interconnection hub device might additionally send, to the second interconnection hub device in the second external network, the one or more service catalogs that indicate at least one of a plurality of VNFs, a plurality of APIs, or a plurality of services offered by each of the first through $N^{th}$ NFV-based customer devices. In some embodiments, the respective service catalog may be stored or may reside in one or more of data storage device 610, data storage device 625' or 640', and/or a separate database that is located in the external network or a corresponding service provider network (not shown) that are associated with the owning service provider (i.e., the service provider owning, managing, or controlling the VNF(s)). In some cases, the data storage device 625' or 640' associated with the service provider that is associated with the particular or local NFV entities might store the service catalog. In some instances, the service catalog might be stored or may reside in data storage device 640' associated with a NFV resource manager (such as NFV resource manager 120 or the like that may be one of the NFV entities 535), which might be associated with the NFV interconnection hub 525 or with one of the NFV interconnection gateways 530'. The process subsequently continues to optional block 1022 in FIG. 10C, linked by circular marker denoted by "B."

At optional block 1022, according to some embodiments, method 1000 might comprise storing, with the interconnection hub device and in a database in communication with the interconnection hub device, a registry listing at least one of a plurality of VNFs, a plurality of APIs, or a plurality of services offered by the one or more service provider NFV entities. In some embodiment, the registry might also list at least one of a plurality of VNFs, a plurality of APIs, or a plurality of services offered by each of the first through $N^{th}$ NFV-based customer devices. The method 1000 might further comprise providing, with the interconnection hub device and to each of the one or more service provider NFV entities and to each of the one or more first NFV-based customer devices through the one or more $N^{th}$ NFV-based customer devices, access to the registry stored in the database (optional block 1024).

Method 1000, at optional block 1026, might comprise providing, with the interconnection hub device and to the second interconnection hub device in the second external network, access to the registry stored in the database. The method 1000 might further comprise certifying, with the interconnection hub device, the one or more VNFs (optional block 1028) and storing, with the interconnection hub device, a record of the one or more VNFs that are certified in a database in communication with the interconnection hub device (optional block 1030). In some embodiments, certifying VNFs might include determining whether a particular VNF is actually a VNF that performs functions as ordered by a customer or as required by a service provider. In some instances, certifying VNFs might include determining whether a particular VNF is a rogue VNF (e.g., a surveillance VNF, spybot VNF, etc.) or an application or other virtual function that is disguised as the desired VNF; such certification processes might be part of security audits, which might be performed routinely or periodically. In some cases, certifying VNFs might include determining whether a legitimate VNF is the correct VNF for performing a desired function. In the event that the VNF being certified is not the desired or correct VNF for performing the desired function (s), the interconnection hub device might request, locate, access, move, or provide access to another VNF, and might perform the certification process to determine whether the another VNF is the desired and correct VNF, prior to storing the VNF (at optional block 1030). The process subsequently continues to optional block 1032 in FIG. 10D, linked by circular marker denoted by "C."

At optional block 1032, method 1000 might comprise bursting the one or more VNFs from a first pod/pseudo-pods to a second pod/pseudo-pods, based at least in part on one or more of time of day, geographic information, expected usage throughout a day, expected changes in usage throughout a day, one or more performance characteristics, changes in one or more performance characteristics, and/or the like. In some instances, each of the first pod/pseudo-pods and the second pod/pseudo-pods comprises physical hardware resources that are part of one or more of at least one service provider NFV entity of the one or more service provider NFV entities and/or at least one first NFV-based customer device of the one or more first NFV-based customer devices through at least one $N^{th}$ NFV-based customer device of the one or more $N^{th}$ NFV-based customer device. In some cases, each of the first pod/pseudo-pods and the second pod/pseudo-pods might comprise physical hardware resources that are only part of one of at least one service provider NFV entity of the one or more service provider NFV entities and/or at least one first NFV-based customer device of the one or more first NFV-based customer devices through at least one $N^{th}$ NFV-based customer device of the one or more $N^{th}$ NFV-based customer device. This allows the particular service provider and/or particular customer environment (i.e., the service provider(s) and/or the first through $N^{th}$ customer environment) to shift resources based on demand, time of day, expected usage, etc.

In some embodiments, method 1000 might further comprise, at optional block 1034, determining whether service chaining is required (e.g., if only one VNF is required, no service chaining is necessary) and, if so, determining whether it is possible to service chain two or more VNFs together to provide a single network service—including, without limitation, identifying and locating each individual VNF to provide sub-functionalities of the desired network service, managing the VNFs so that they can be service chained together, and/or the like. Based on a determination that service chaining is required and that two or more VNFs can be service chained together to provide a single network service, the method, at optional block 1036, might comprise service chaining two or more VNFs together to provide a single network service, either by service chaining at least one first service chained VNF provided by one of at least one service provider NFV entity of the one or more service provider NFV entities and/or at least one first NFV-based customer device of the one or more first NFV-based customer devices through at least one $N^{th}$ NFV-based customer device of the one or more $N^{th}$ NFV-based customer device and at least one second service chained VNF provided by another of the at least one service provider NFV entity and/or the at least one first NFV-based customer device through the at least one $N^{th}$ NFV-based customer device, to provide the single network service (optional block 1038) or by service chaining two or more VNFs that are provided by only one of at least one service provider NFV entity of the one or more service provider NFV entities and/or at least one first NFV-based customer device of the one or more first NFV-based customer devices through at least one $N^{th}$ NFV-based customer device of the one or more $N^{th}$ NFV-based customer device, to provide the single network service (optional block 1040). In one non-limiting example, four or five VNFs (regardless of which NFV entity each VNF is provided from) might be service chained together to perform the functions of a network router. In similar fashion, any number of VNFs (from any combination of NFV entities) may be service chained to perform any desired or ordered function. Service chaining and the processes outlined above related to service chaining may, in some cases, be performed by a NFV interconnection gateway, a NFV interconnection hub, and/or the like.

With reference to FIG. 10E, the process of providing access to the one or more VNFs (at block 1016) might include one or more of the following. In some embodiments, providing access to the one or more VNFs might comprise providing at least one of the one or more first NFV-based customer devices through the one or more $N^{th}$ NFV-based customer devices with access to one or more VNFs running on at least one service provider NFV entity of the one or more service provider NFV entities, without sending the one or more VNFs from the at least one service provider NFV entity to the at least one of the one or more first NFV-based customer devices through the one or more $N^{th}$ NFV-based customer devices (block 1042). Alternatively, providing access to the one or more VNFs might comprise sending one or more VNFs from at least one service provider NFV entity of the one or more service provider NFV entities to at least one of the one or more first NFV-based customer devices through the one or more $N^{th}$ NFV-based customer devices, via the one or more links (block 1044).

In some cases, providing access to the one or more VNFs might comprise providing access to the one or more VNFs via the one or more links comprises providing, via the interconnection hub device, access to one or more VNFs via the one or more links (block 1046). In some instances, providing access to the one or more VNFs might comprise providing access to one or more VNFs, via peering connection between at least one service provider NFV entity of the one or more service provider NFV entities and at least one of the one or more first NFV-based customer devices through the one or more $N^{th}$ NFV-based customer devices (block 1048). Alternatively or additionally, providing access to the one or more VNFs might comprise bursting, using an API, one or more VNFs from at least one service provider NFV entity of the one or more service provider NFV entities to at least one of the one or more first NFV-based customer devices through the one or more $N^{th}$ NFV-based customer devices (block 1050).

Exemplary System and Hardware Implementation

FIG. 11 is a block diagram illustrating an exemplary computer or system hardware architecture, in accordance with various embodiments. FIG. 11 provides a schematic illustration of one embodiment of a computer system 1100 of the service provider system hardware that can perform the methods provided by various other embodiments, as described herein, and/or can perform the functions of interconnection gateway devices 115 and/or 530, interconnection hub devices 525, NFV entities 120-150, 220, 535, and/or 810, NFV-based customer devices 155, 410, 420, 430, 440, 450, 460, 540, and/or 810, hardware pods/pseudo-pods 305, 310, and/or 705-715, user devices or computing systems in communication with any of these network devices, or the like, as described above. It should be noted that FIG. 11 is meant only to provide a generalized illustration of various components, of which one or more (or none) of each may be utilized as appropriate. FIG. 11, therefore, broadly illustrates how individual system elements may be implemented in a relatively separated or relatively more integrated manner.

The computer or hardware system 1100—which might represent an embodiment of the interconnection gateway devices 115 and/or 530, interconnection hub devices 525, NFV entities 120-150, 220, 535, and/or 810, NFV-based customer devices 155, 410, 420, 430, 440, 450, 460, 540, and/or 810, hardware pods/pseudo-pods 305, 310, and/or 705-715, user devices or computing systems in communication with any of these network devices, or of any other device, as described above with respect to FIGS. 1-10—is shown comprising hardware elements that can be electrically coupled via a bus 1105 (or may otherwise be in communication, as appropriate). The hardware elements may include one or more processors 1110, including, without limitation, one or more general-purpose processors and/or one or more special-purpose processors (such as digital signal processing chips, graphics acceleration processors, and/or the like); one or more input devices 1115, which can include, without limitation, a mouse, a keyboard and/or the like; and one or more output devices 1120, which can include, without limitation, a display device, a printer, and/or the like.

The computer or hardware system 1100 may further include (and/or be in communication with) one or more storage devices 1125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 1100 might also include a communications subsystem 1130, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1130 may permit data to be exchanged with a network (such as the network described below, to name one example), with other computer or hardware systems, and/or with any other devices described herein. In many embodiments, the computer or hardware system 1100 will further comprise a working memory 1135, which can include a RAM or ROM device, as described above.

The computer or hardware system 1100 also may comprise software elements, shown as being currently located within the working memory 1135, including an operating system 1140, device drivers, executable libraries, and/or other code, such as one or more application programs 1145, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1125 described above. In some cases, the storage medium might be incorporated within a computer system, such as the system 1100. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 1100 and/or might take the form of source and/or installable code, which, upon compilation and/or installation on the computer or hardware system 1100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1100) to perform methods in accordance with various embodiments of the invention. According to a set of embodiments, some or all of the procedures of such methods are performed by the computer or hardware system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer readable medium, such as one or more of the storage device(s) 1125. Merely by way of example, execution of the sequences of instructions contained in the working memory 1135 might cause the processor(s) 1110 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1100, various computer readable media might be involved in providing instructions/code to processor(s) 1110 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 1125. Volatile media includes, without limitation, dynamic memory, such as the working memory 1135. Transmission media includes, without limitation, coaxial cables, copper wire and fiber optics, including the wires that comprise the bus 1105, as well as the various components of the communication subsystem 1130 (and/or the media by which the communications subsystem 1130 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1100. These signals, which might be in the form of electromagnetic signals, acoustic signals, optical signals, and/or the like, are all examples of carrier waves on which instructions can be encoded, in accordance with various embodiments of the invention.

The communications subsystem 1130 (and/or components thereof) generally will receive the signals, and the bus 1105 then might carry the signals (and/or the data, instructions, etc. carried by the signals) to the working memory 1135, from which the processor(s) 1105 retrieves and executes the instructions. The instructions received by the working memory 1135 may optionally be stored on a storage device 1125 either before or after execution by the processor(s) 1110.

As noted above, a set of embodiments comprises methods and systems for implementing interconnection gateway and/or hub functionalities between or among at least one network functions virtualization ("NFV") entity and at least one NFV-based customer device that are located in corresponding different networks. FIG. 12 illustrates a schematic diagram of a system 1200 that can be used in accordance with one set of embodiments. The system 1200 can include one or more user computers or user devices 1205. A user computer or user device 1205 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer or user device 1205 can also have any of a variety of applications, including one or more applications configured to perform methods provided by various embodiments (as described above, for example), as well as one or more office applications, database client and/or server applications, and/or web browser applications. Alternatively, a user computer or user device 1205 can be any other electronic device, such as a thin-client computer, Internet-enabled mobile telephone, and/or personal digital assistant, capable of communicating via a network (e.g., the network(s) 1210 described below) and/or of displaying and navigating web pages or other types of electronic documents. Although the exemplary system 1200 is shown with three user computers or user devices 1205, any number of user computers or user devices can be supported.

Certain embodiments operate in a networked environment, which can include a network(s) 1210. The network(s) 1210 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1210 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1215. Each of the server computers 1215 may be configured with an operating system, including, without limitation, any of those discussed above, as well as any commercially (or freely) available server operating systems. Each of the servers 1215 may also be running one or more applications, which can be configured to provide services to one or more clients 1205 and/or other servers 1215.

Merely by way of example, one of the servers 1215 might be a data server, a web server, a cloud computing device(s), or the like, as described above. The data server might include (or be in communication with) a web server, which can be used, merely by way of example, to process requests for web pages or other electronic documents from user computers 1205. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1205 to perform methods of the invention.

The server computers 1215, in some embodiments, might include one or more application servers, which can be configured with one or more applications accessible by a client running on one or more of the client computers 1205 and/or other servers 1215. Merely by way of example, the server(s) 1215 can be one or more general purpose computers capable of executing programs or scripts in response to the user computers 1205 and/or other servers 1215, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer or user device 1205 and/or another server 1215. In some embodiments, an application server can perform one or more of the processes for implementing NFV interconnection gateway and/or hub functionalities, or the like, as described in detail above. Data provided by an application server may be formatted as one or more web pages (comprising HTML, JavaScript, etc., for example) and/or may be forwarded to a user computer 1205 via a web server (as described above, for example). Similarly, a web server might receive web page requests and/or input data from a user computer 1205 and/or forward the web page requests and/or input data to an application server. In some cases, a web server may be integrated with an application server.

In accordance with further embodiments, one or more servers 1215 can function as a file server and/or can include one or more of the files (e.g., application code, data files, etc.) necessary to implement various disclosed methods, incorporated by an application running on a user computer 1205 and/or another server 1215. Alternatively, as those skilled in the art will appreciate, a file server can include all necessary files, allowing such an application to be invoked remotely by a user computer or user device 1205 and/or server 1215.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1220. The location of the database(s) 1220 is discretionary: merely by way of example, a database 1220a might reside on a storage medium local to (and/or resident in) a server 1215a (and/or a user computer or user device 1205). Alternatively, a database 1220b can be remote from any or all of the computers 1205, 1215, so long as it can be in communication (e.g., via the network 1210) with one or more of these. In a particular set of embodiments, a database 1220 can reside in a storage-area network ("SAN") familiar to those skilled in the art. (Likewise, any necessary files for performing the functions attributed to the computers 1205, 1215 can be stored locally on the respective computer and/or remotely, as appropriate.) In one set of embodiments, the database 1220 can be a relational database, such as an Oracle database, that is adapted to store, update, and retrieve data in response to SQL-formatted commands. The database might be controlled and/or maintained by a database server, as described above, for example.

According to some embodiments, system 1200 might further comprise one or more NFV interconnection gateway device(s) 1225 and/or one or more NFV interconnection hub device(s) 1230, as well as one or more NFV-based customer devices 1235, as described in detail above with respect to FIGS. 1-10. In some embodiments, one or more of the user device 1205a, the user device 1205b, the server 1215a, the server 1215b, the database 1220a, and/or the database 1220b might be in the same network 1210 as one of the NFV interconnection gateway device(s) 1225, the NFV interconnection hub device(s) 1230, or the NFV-based customer device(s) 1235. In alternative or additional embodiments, one or more of the user device 1205a, the user device 1205b, the server 1215a, the server 1215b, the database 1220a, and/or the database 1220b might be in a first network 1210 that is different from another network(s) 1210 in which each of the NFV interconnection gateway device(s) 1225, the NFV interconnection hub device(s) 1230, or the NFV-based customer device(s) 1235 is located.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with an interconnection gateway device within a first network and from one or more internal network functions virtualization ("NFV") entities, a first set of network connection information, each of the one or more internal NFV entities being located within the first network;
receiving, with the interconnection gateway device and from one or more NFV-based customer devices, a second set of network connection information, each of the one or more NFV-based customer devices being located within a second network external to the first network;
abstracting, with the interconnection gateway device, the first set of network connection information to generate a first set of abstracted network connection information;
abstracting, with the interconnection gateway device, the second set of network connection information to generate a second set of abstracted network connection information, wherein each of the first set of abstracted network connection information and the second set of abstracted network connection information is abstracted to be independent of any particular NFV entity or any particular NFV-based customer device in any network;
establishing, with the interconnection gateway device, one or more links between each of the one or more internal NFV entities and each of at least one NFV-based customer devices of the one or more NFV-based customer devices, based at least in part on one or more of the first set of abstracted network connection information or the second set of abstracted network connection information; and providing access to one or more virtualized network functions ("VNFs"), via the one or more links.

2. The method of claim 1, wherein the first network is associated with a service provider, and the second network is associated with an Internet of things ("IOT") environment, a customer environment, the customer environment comprising at least one of a customer residential premises, a multi-dwelling unit, a short-term lodging facility, a customer commercial premises, a customer business premises, a health-care facility, an industrial manufacturing facility, an industrial processing facility, a warehouse, a vehicle, or a public safety answering point ("PSAP") facility.

3. The method of claim 1, wherein providing access to the one or more VNFs via the one or more links comprises sending one or more VNFs from at least one internal NFV entity of the one or more internal NFV entities to at least one NFV-based customer device of the one or more NFV-based customer devices, via the one or more links.

4. The method of claim 1, wherein providing access to the one or more VNFs via the one or more links comprises providing at least one NFV-based customer device of the one or more NFV-based customer devices with access to one or more VNFs running on at least one internal NFV entity of the one or more internal NFV entities, without sending the one or more VNFs from the at least one internal NFV entity to the at least one NFV-based customer device.

5. The method of claim 1, wherein each of the one or more internal NFV entities comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

6. The method of claim 1, wherein each of the one or more NFV-based customer devices comprises a device that is configured to request execution of VNFs and to access the VNFs being executed on at least one of the one or more internal NFV entities, without at least one of capacity or capability to locally execute the VNFs.

7. The method of claim 1, wherein the interconnection gateway device comprises a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, or an external network-to-network interface ("E-NNI") device.

8. The method of claim 1, wherein the first set of network connection information comprises information regarding at least one of latency, jitter, bandwidth, packet loss, nodal connectivity, compute resources, storage resources, memory capacity, routing, operations support systems ("OSS"), or business support systems ("BSS"), and wherein the second set of network connection information comprises information regarding at least one of latency, jitter, bandwidth, packet loss, nodal connectivity, compute resources, storage resources, memory capacity, routing, OSS, or BSS.

9. The method of claim 1, wherein the first set of network connection information comprises information regarding at least one of fault, configuration, accounting, performance, or security ("FCAPS"), and wherein the second set of network connection information comprises information regarding at least one of fault, configuration, accounting, performance, or security ("FCAPS").

10. The method of claim 1, wherein the second network is associated with at least one of an Internet of things ("IOT") environment, a customer residential premises, a multi-dwelling unit, or a short-term lodging facility, and wherein each of the one or more NFV-based customer devices comprises at least one of a residential gateway device, a residential network device, a video recording device, a video playback device, a set-top box, an audio recording device, an audio playback device, an external speaker, a game console, a tablet computer, a laptop computer, a desktop computer, a smart phone, a mobile phone, a portable gaming device, an image capture device, a printer, a scanner, a data storage device, a television, a kitchen appliance, a thermostat, a sensing device, a home security control device, or a lighting system.

11. The method of claim 1, wherein the second network is associated with at least one of an Internet of things ("IOT") environment, a customer commercial premises, or a customer business premises, and wherein each of the one or more NFV-based customer devices comprises at least one of a commercial gateway device, a commercial network device, a video recording device, a video playback device, an image projection device, a set-top box, an audio recording device, an audio playback device, an external speaker, a tablet computer, a laptop computer, a desktop computer, a smart phone, a mobile phone, a personal digital assistant, an image capture device, a printer, a scanner, a data storage device, a television, a telephone system, a local server system, a kitchen appliance, a thermostat, a sensing device, a commercial security control system, a doorway locking system, or a lighting system.

12. The method of claim 1, wherein the second network is associated with at least one of an Internet of things ("IOT") environment or a health-care facility, and wherein each of the one or more NFV-based customer devices comprises at least one of a commercial gateway device, a commercial network device, a video recording device, a video playback device, a set-top box, an audio recording device, an audio playback device, an external speaker, a tablet computer, a laptop computer, a desktop computer, a smart phone, a mobile phone, a game console, a portable gaming device, an image capture device, an image projection device, a printer, a scanner, a data storage device, a television, a telephone system, a kitchen appliance, a thermostat, a sensing device, a commercial security control system, a doorway locking system, a lighting system, a health monitoring device, a diagnostic device, a medical device, a power generation system, or a medical vehicle dispatch control system.

13. The method of claim 1, wherein the second network is associated with at least one of an Internet of things ("IOT") environment, an industrial manufacturing facility, an industrial processing facility, or a warehouse, and wherein each of the one or more NFV-based customer devices comprises at least one of a commercial gateway device, a commercial network device, a video recording device, a video playback device, a set-top box, an audio recording device, an audio playback device, an external speaker, a tablet computer, a laptop computer, a desktop computer, a smart phone, a mobile phone, an image capture device, a telephone system, a data storage device, a printer, a scanner, an image projection device, a television, a kitchen appliance, an industrial process monitoring system, a thermostat, a sensing device, a home security control device, a lighting system, an industrial manufacturing robot, industrial manufacturing machinery, an industrial processing robot, industrial processing machinery, an industrial warehouse item transporting robot, or industrial warehouse item transporting machinery.

14. The method of claim 1, wherein the second network is associated with at least one of an Internet of things ("IOT") environment or a vehicle, the vehicle comprising at least one of a bicycle, a motorbike, a car, an all-terrain vehicle, a snowmobile, a minivan, a truck, a van, a bus, a transport vehicle, an industrial vehicle, a government vehicle, a commercial vehicle, a recreational vehicle, a personal watercraft, a boat, a ship, an airplane, a helicopter, a personal aircraft, a space vehicle, a satellite, a probe, a drone, or a space station, and wherein each of the one or more NFV-based customer devices comprises at least one of a vehicle control computer system, a vehicle-based navigation system, a vehicle-based gateway device, a vehicle-based network device, a vehicle-based audio system, a vehicle-based media recording and playback device, a vehicle lighting system, vehicle door opening/closing devices, a tablet computer, a laptop computer, a smart phone, a mobile phone, a portable gaming device, a data storage device, a vehicle climate control system, a sensing device, or an image capture device.

15. The method of claim 1, wherein the second network is associated with at least one of an Internet of things ("IOT") environment or a public safety answering point ("PSAP") facility, and wherein each of the one or more NFV-based customer devices comprises at least one of a PSAP gateway device, a PSAP network device, a computer system, a data storage device, or a communications device.

16. The method of claim 1, wherein providing access to the one or more VNFs via the one or more links comprises providing, via the interconnection gateway device, access to one or more VNFs via the one or more links.

17. The method of claim 1, wherein providing access to the one or more VNFs via the one or more links comprises providing access to one or more VNFs, via peering connection between at least one internal NFV entity of the one or more internal NFV entities and at least one NFV-based customer device of one or more NFV-based customer devices.

18. The method of claim 1, wherein providing access to the one or more VNFs via the one or more links comprises bursting, using an application programming interface ("API"), one or more VNFs from at least one internal NFV entity of the one or more internal NFV entities to at least one NFV-based customer device of the one or more NFV-based customer devices.

19. The method of claim 1, further comprising:
bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics, wherein each of the first pod and the second pod comprises physical hardware resources that are part of an internal NFV entity of the one or more internal NFV entities.

20. The method of claim 1, further comprising:
service chaining two or more VNFs together to provide a single network service.

21. The method of claim 20, wherein the two or more VNFs comprise at least one first service chained VNF provided by at least one internal NFV entity of the one or more internal NFV entities and at least one second service chained VNF provided by at least one external NFV entity that is located outside of each of the first network and the second network, wherein service chaining two or more VNFs together to provide a single network service comprises service chaining the at least one first service chained VNF and the at least one second service chained VNF together to provide the single network service.

22. The method of claim 20, wherein the two or more VNFs comprise two or more service chained VNFs provided by only one of at least one internal NFV entity of the one or more internal NFV entities or at least one external NFV entity of one or more external NFV entities that are located outside of each of the first network and the second network.

23. The method of claim 1, further comprising:
sending, with the interconnection gateway device and to at least one of the one or more NFV-based customer devices, a service catalog indicating at least one of a plurality of VNFs, a plurality of application programming interfaces ("APIs"), or a plurality of services offered by the one or more internal NFV entities.

24. The method of claim 1, wherein receiving the second set of network connection information comprises receiving, with the interconnection gateway device, the second set of network connection information from the one or more NFV-based customer devices via a second interconnection gateway device located within the second network.

25. The method of claim 24, further comprising:
sending, with the interconnection gateway device and to at least one of the one or more NFV-based customer devices via the second interconnection gateway device, a service catalog indicating at least one of a plurality of VNFs, a plurality of application programming interfaces ("APIs"), or a plurality of services offered by the one or more internal NFV entities.

26. The method of claim 1, wherein receiving the second set of network connection information comprises receiving, with the interconnection gateway device, the second set of network connection information from the one or more NFV-based customer devices via an interconnection hub device located within an external network separate from each of the first network and the second network.

27. The method of claim 1, wherein the first set of abstracted network connection information include fine-grained information that is hidden from the one or more NFV-based customer devices, and wherein the second set of abstracted network connection information include coarse-grained information that is public information.

28. The method of claim 1, further comprising:
certifying, with the interconnection gateway device, the one or more VNFs;
storing, with the interconnection gateway device, a record of the one or more VNFs that are certified in a database in communication with the interconnection gateway device.

29. A system, comprising:
an interconnection gateway device located within a first network, the interconnection gateway device comprising:
at least one first processor;
at least one first data storage device in communication with the at least one first processor, the at least one first data storage device having data stored thereon;
at least one first non-transitory computer readable medium in communication with the at least one first processor and with the at least one first data storage device, the at least one first non-transitory computer readable medium having stored thereon computer software comprising a first set of instructions that, when executed by the at least one first processor, causes the interconnection gateway device to perform one or more functions;

one or more internal network functions virtualization ("NFV") entities located within the first network, each of the one or more internal NFV entities comprising:
at least one second processor;
at least one second data storage device in communication with the at least one second processor, the at least one second data storage device having data stored thereon;
at least one second non-transitory computer readable medium in communication with the at least one second processor and with the at least one second data storage device, the at least one second non-transitory computer readable medium having stored thereon computer software comprising a second set of instructions that, when executed by the at least one second processor, causes the internal NFV entity to perform one or more functions, the second set of instructions comprising:
instructions for sending a first set of network connection information to the interconnection gateway device;

one or more NFV-based customer devices located within a second network that is external to the first network, each of the one or more NFV-based customer devices comprising:
at least one third processor;
at least one third data storage device in communication with the at least one third processor, the at least one third data storage device having data stored thereon;
at least one third non-transitory computer readable medium in communication with the at least one third processor and with the at least one third data storage device, the at least one third non-transitory computer readable medium having stored thereon computer software comprising a third set of instructions that, when executed by the at least one third processor, causes the NFV-based customer device to perform one or more functions, the third set of instructions comprising:
instructions for sending a second set of network connection information to the interconnection gateway device;

wherein the first set of instructions comprises:
instructions for receiving, from the one or more internal NFV entities, the first set of network connection information;
instructions for receiving, from the one or more NFV-based customer devices, the second set of network connection information;
instructions for abstracting the first set of network connection information to generate a first set of abstracted network connection information;
instructions for abstracting the second set of network connection information to generate a second set of abstracted network connection information, wherein each of the first set of abstracted network connection information and the second set of abstracted network connection information is abstracted to be independent of any particular NFV entity or any particular NFV-based customer device in any network;
instructions for establishing one or more links between each of the one or more internal NFV entities and each of at least one NFV-based customer device of the one or more NFV-based customer devices, based at least in part on one or more of the first set of abstracted network connection information or the second set of abstracted network connection information; and
instructions for providing access to one or more virtualized network functions ("VNFs") via the one or more links;

wherein the second set of instructions further comprises:
instructions for providing access or sending the one or more VNFs via the one or more links;

wherein the third set of instructions further comprises:
instructions for accessing or receiving the one or more VNFs via the one or more links.

30. The system of claim 29, wherein the first network is associated with a first service provider, and the second network is associated with a customer environment, the customer environment comprising at least one of an Internet of things ("IOT") environment, a customer residential premises, a multi-dwelling unit, a short-term lodging facility, a customer commercial premises, a customer business premises, a health-care facility, an industrial manufacturing facility, an industrial processing facility, a warehouse, a vehicle, or a public safety answering point ("PSAP") facility.

31. The system of claim 29, wherein each of the one or more internal NFV entities comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

32. The system of claim 29, wherein the interconnection gateway device comprises a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, or an external network-to-network interface ("E-NNI") device.

33. The system of claim 29, wherein the first set of instructions further comprises:
instructions for bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics, wherein each of the first pod and the second pod comprises physical hardware resources that are part of an internal NFV entity of the one or more internal NFV entities.

34. The system of claim 29, wherein the first set of instructions further comprises:
instructions for service chaining two or more VNFs together to provide a single network service.

35. The system of claim 29, wherein the first set of instructions further comprises:
instructions for sending, to at least one of the one or more NFV-based customer devices, a service catalog indicating at least one of a plurality of VNFs, a plurality of application programming interfaces ("APIs"), or a plurality of services offered by the one or more internal NFV entities.

36. The system of claim 29, wherein the first set of instructions further comprises:
    instructions for certifying the one or more VNFs; and
    instructions for storing a record of the one or more VNFs that are certified in a database in communication with the interconnection gateway device.

37. An interconnection gateway device, comprising:
    at least one processor;
    at least one data storage device in communication with the at least one processor, the at least one data storage device having data stored thereon; and
    at least one non-transitory computer readable medium in communication with the at least one processor and the at least one data storage device, the at least one non-transitory computer readable medium having stored thereon computer software comprising a set of instructions that, when executed by the at least one processor, causes the interconnection gateway device to perform one or more functions, the set of instructions comprising:
        instructions for receiving, from one or more internal network functions virtualization ("NFV") entities, a first set of network connection information, each of the one or more internal NFV entities being located within the first network in which the interconnection gateway device is located;
        instructions for receiving, from one or more NFV-based customer devices, a second set of network connection information, each of the one or more NFV-based customer devices being located within a second network external to the first network;
        instructions for abstracting the first set of network connection information to generate a first set of abstracted network connection information;
        instructions for abstracting the second set of network connection information to generate a second set of abstracted network connection information, wherein each of the first set of abstracted network connection information and the second set of abstracted network connection information is abstracted to be independent of any particular NFV entity or any particular NFV-based customer device in any network;
        instructions for establishing one or more links between each of the one or more internal NFV entities and each of the one or more NFV-based customer devices, based at least in part on one or more of the first set of abstracted network connection information or the second set of abstracted network connection information; and
        instructions for providing access to one or more virtualized network functions ("VNFs") via the one or more links.

38. The interconnection gateway device of claim 37, wherein each of the one or more internal NFV entities comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

39. The interconnection gateway device of claim 37, wherein the set of instructions further comprises:
    instructions for bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics, wherein each of the first pod and the second pod comprises physical hardware resources that are part of an internal NFV entity of the one or more internal NFV entities.

40. The interconnection gateway device of claim 37, wherein the set of instructions further comprises:
    instructions for service chaining two or more VNFs together to provide a single network service.

41. The interconnection gateway device of claim 37, wherein the set of instructions further comprises:
    instructions for sending, to at least one of the one or more NFV-based customer devices, a service catalog indicating at least one of a plurality of VNFs, a plurality of application programming interfaces ("APIs"), or a plurality of services offered by the one or more internal NFV entities.

42. The interconnection gateway device of claim 37, wherein the set of instructions further comprises:
    instructions for certifying the one or more VNFs; and
    instructions for storing a record of the one or more VNFs that are certified in a database in communication with the interconnection gateway device.

* * * * *